(12) United States Patent
Obunai

(10) Patent No.: US 7,174,271 B2
(45) Date of Patent: Feb. 6, 2007

(54) TIRE RADIAL FORCE VARIATION PREDICTION METHOD

(75) Inventor: Katsuo Obunai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 200 days.

(21) Appl. No.: 10/491,246

(22) PCT Filed: Oct. 11, 2002

(86) PCT No.: PCT/JP02/10617

§ 371 (c)(1),
(2), (4) Date: Mar. 30, 2004

(87) PCT Pub. No.: WO03/034023

PCT Pub. Date: Apr. 24, 2003

(65) Prior Publication Data

US 2005/0216224 A1    Sep. 29, 2005

(30) Foreign Application Priority Data

Oct. 11, 2001 (JP) .............................. 2002-314341
May 9, 2002 (JP) .............................. 2002-133793

(51) Int. Cl.
G01P 3/00      (2006.01)
G01B 5/08      (2006.01)
(52) U.S. Cl. ..................................... 702/157; 702/145
(58) Field of Classification Search ............... 702/145, 702/157
See application file for complete search history.

(56) References Cited

U.S. PATENT DOCUMENTS 3,724,137 A * 4/1973 Hofelt et al. ................ 451/254
4,435,982 A * 3/1984 Borner et al. .................. 73/462
4,479,381 A   10/1984 Kounkel et al.

4,958,290 A * 9/1990 Kendall et al. ................ 73/460

(Continued)

FOREIGN PATENT DOCUMENTS

JP        62-232507 A     10/1987

(Continued)

OTHER PUBLICATIONS

Hideo Sakai, "Tire Engineering", May 11, 2001, Kabushiki-Kaisha Grand Prix Publishing, pp. 299-305.

(Continued)

*Primary Examiner*—John Barlow
*Assistant Examiner*—Jonathan Moffat
(74) *Attorney, Agent, or Firm*—Sughrue Mion, PLLC

(57) ABSTRACT

It is possible to significantly reduce a prediction error of the high-speed RFV and the high-speed TFV in a tire having a large PRO growth amount at high speed. Three or more sample tires are extracted from each lot. The PRO and RFV are measured and the least-square method is used to predict (100) the upper and lower and front and back natural angle frequency, attenuation ratio, upper and lower spring constant, and rolling radius coefficient. By using the PRO measurement apparatus, the PRO during idling is measured. By using an AAV measurement apparatus, an actual measurement value $AAV_L$ of the angle acceleration fluctuation at a low speed is measured (102). The PRO and AAV at a high speed are predicted (104) and the actual measurement value and prediction value are used to predict the high-speed RFV and TFV.

6 Claims, 30 Drawing Sheets

U.S. PATENT DOCUMENTS

| | | | | |
|---|---|---|---|---|
| 5,396,438 A | * | 3/1995 | Oblizajek | 702/84 |
| 5,826,207 A | * | 10/1998 | Ohashi et al. | 701/36 |
| 6,065,331 A | | 5/2000 | Fukasawa | |

FOREIGN PATENT DOCUMENTS

| | | |
|---|---|---|
| JP | 63-60937 U | 4/1988 |
| JP | 1-314935 A | 12/1989 |
| JP | 7-243947 A | 9/1995 |
| JP | 8-122220 A | 5/1996 |
| JP | 2001-124666 A | 5/2001 |
| JP | 2001-141615 A | 5/2001 |
| JP | 2001-228058 A | 8/2001 |
| WO | WO 98/08070 A | 2/1998 |

OTHER PUBLICATIONS

"Advanced Technology for Improvement of Motion and Safety of Tire-Automobile System"; No. 9803 JSAE Symposium, edited by Tire Motion Characteristics Expert Committee and Active Safety Assessment Technology Expert Committee, Mar. 15, 1998, Japan Automobile Engineers Society, pp. 30-35.

* cited by examiner

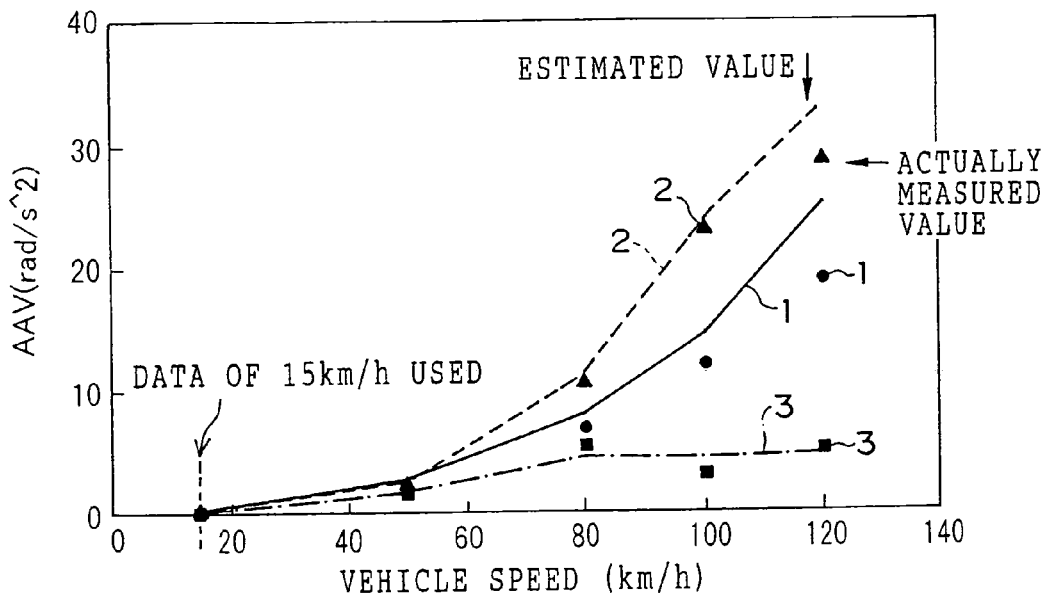
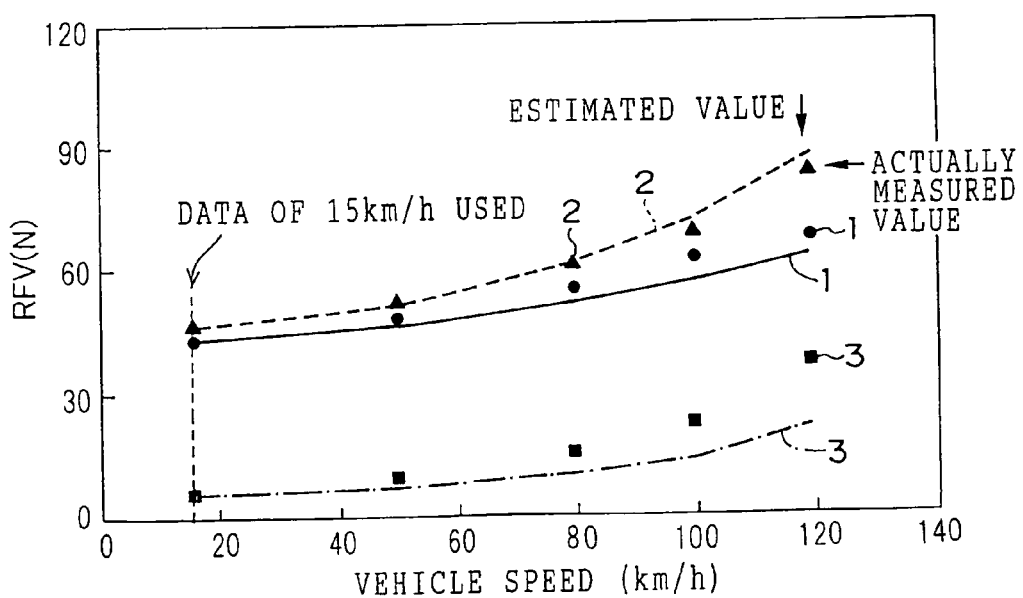

F I G . 13
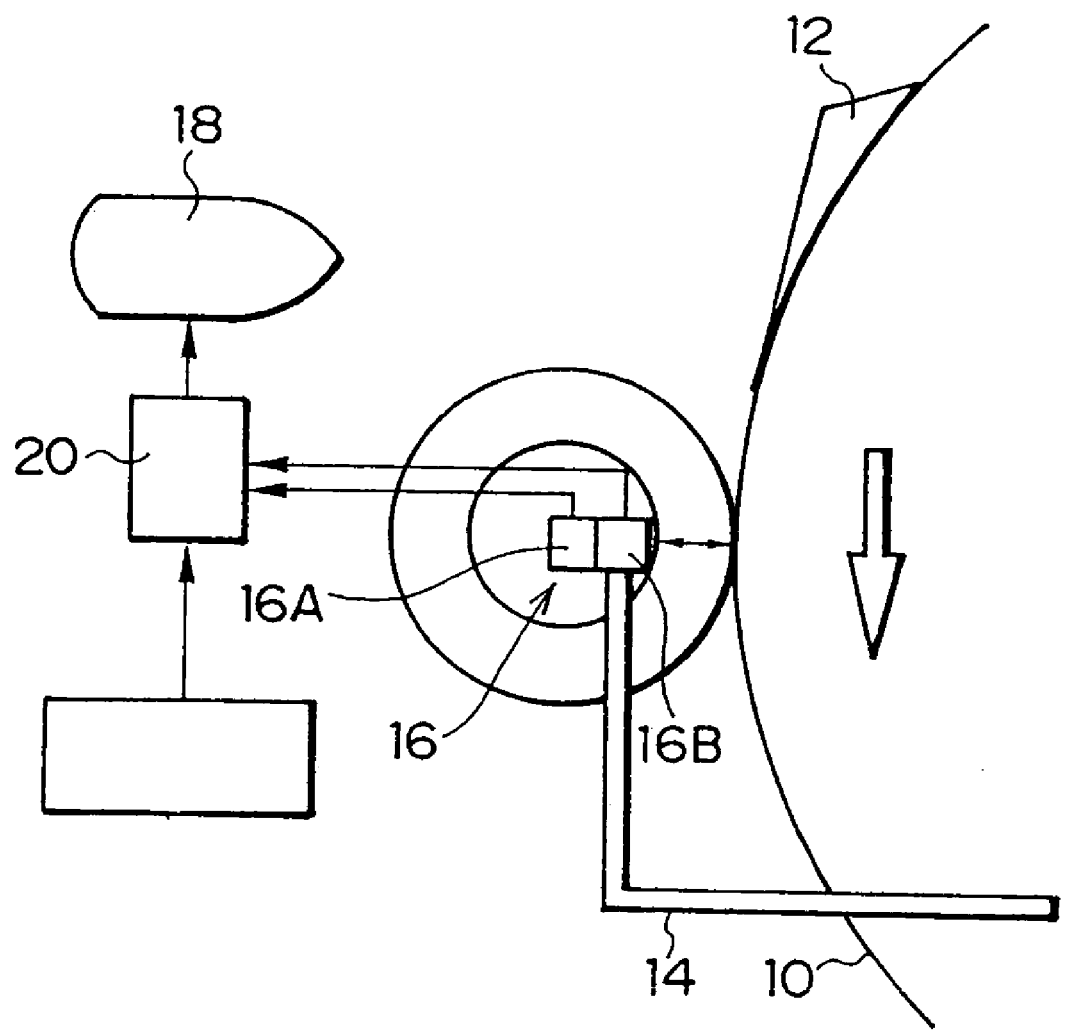

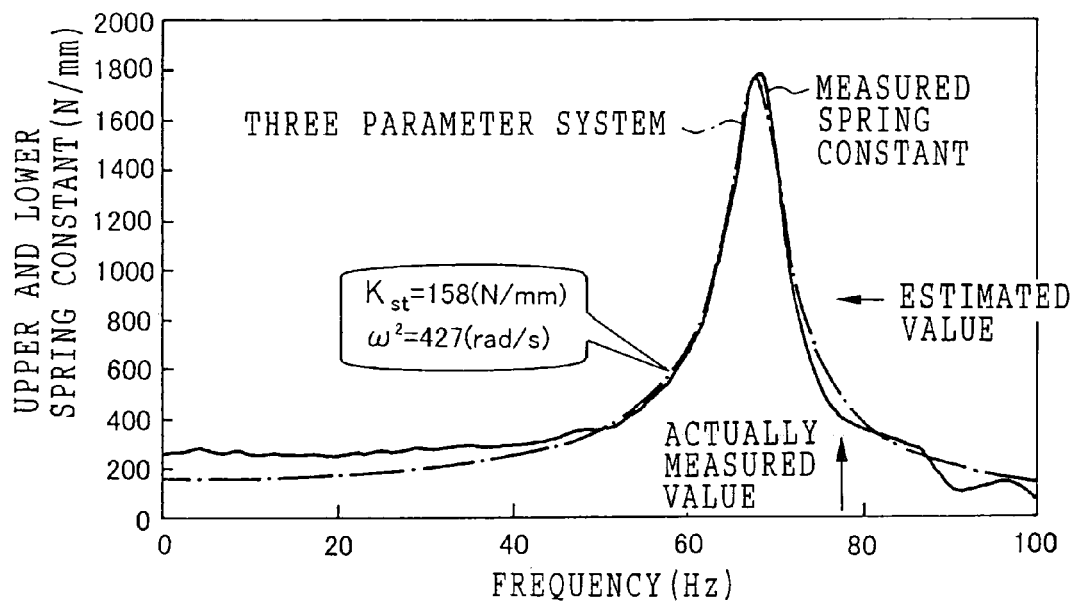
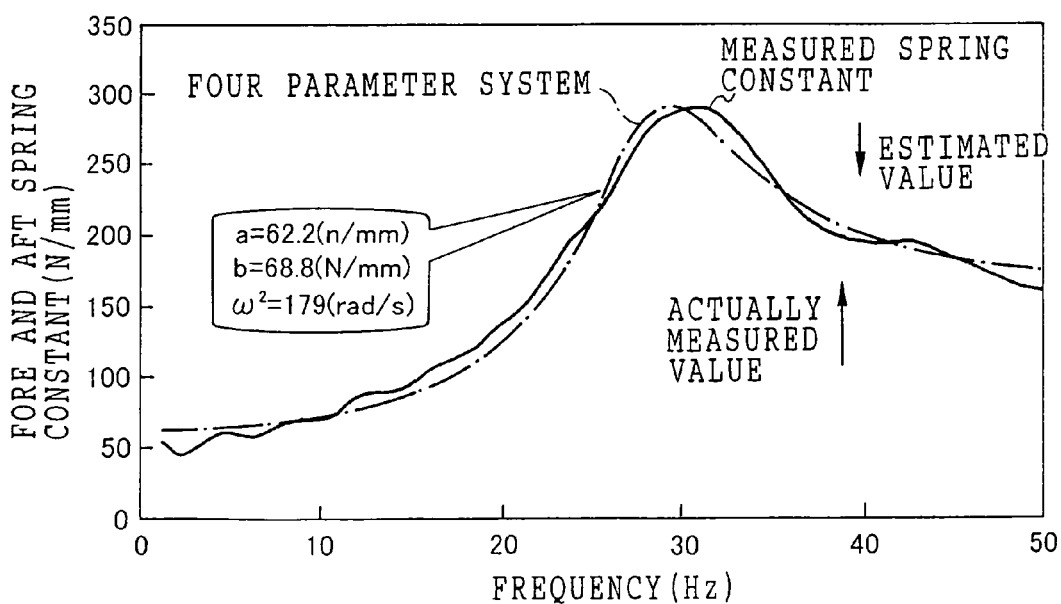

F I G . 16
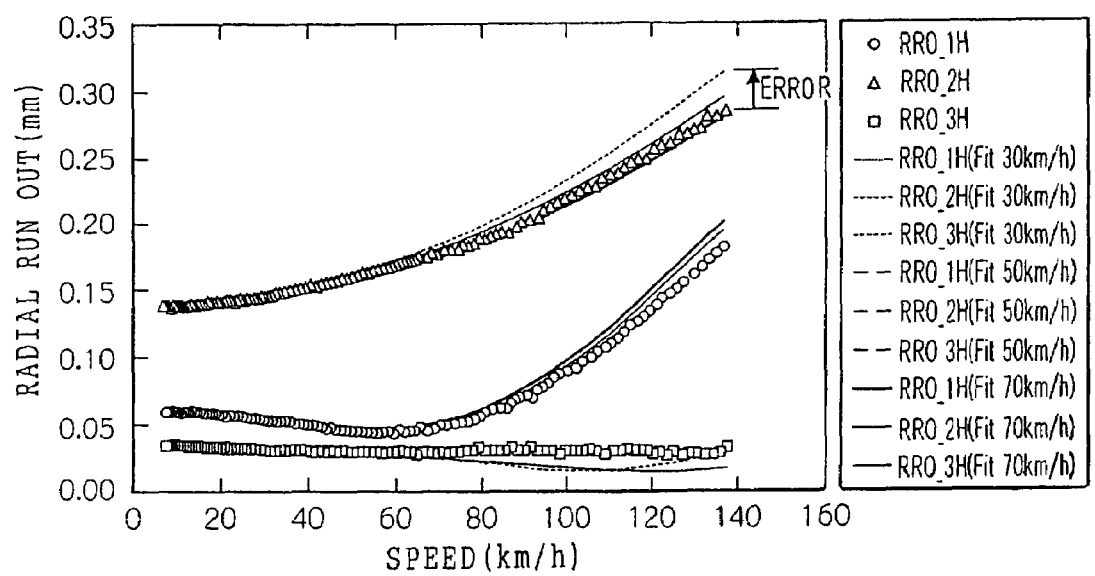

ZERO OFFSET

ZERO OFFSET

PRIMARY RRO OF TREAD PORTION

PRIMARY RRO OF CONCENTRIC CIRCLE PORTION OF RIM

PRIMARY RRO OF TIRE SINGLE UNIT

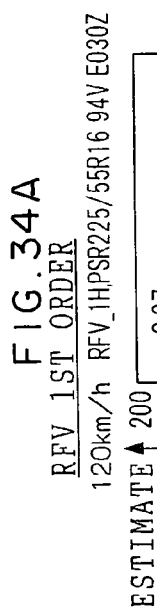
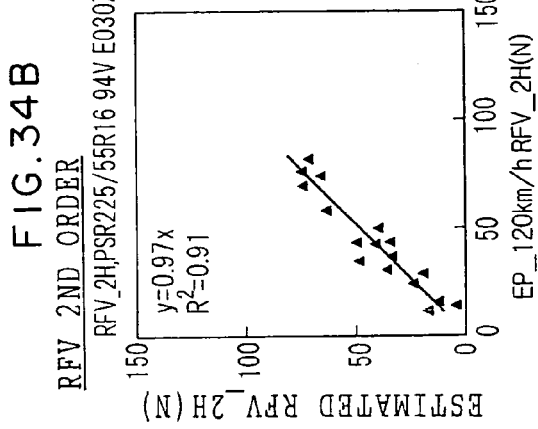
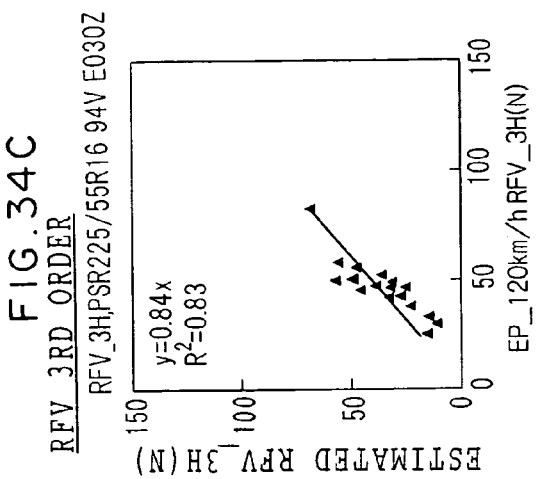
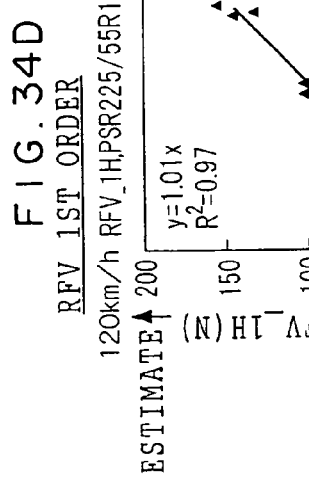
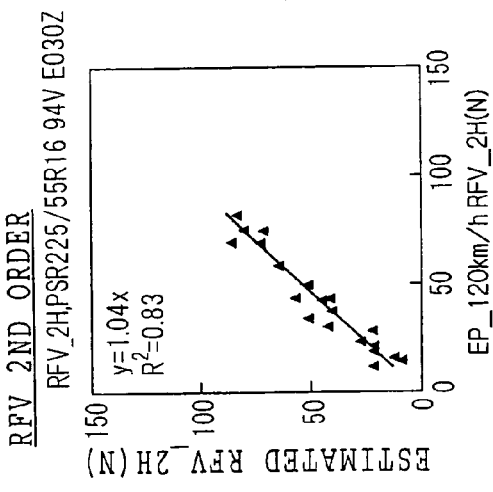
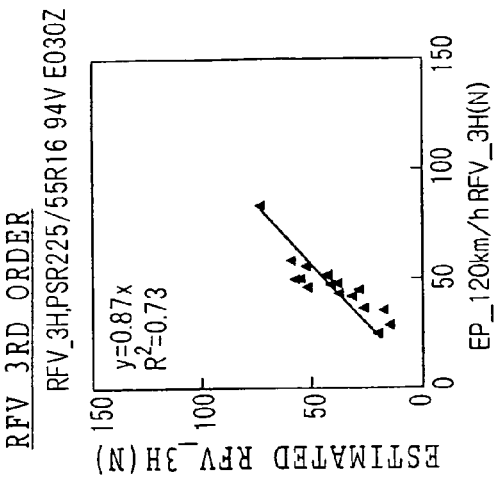

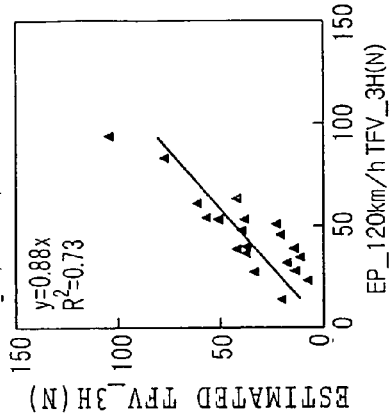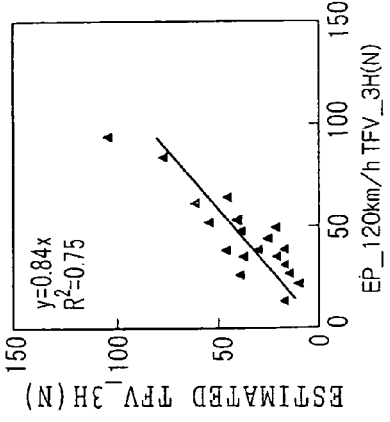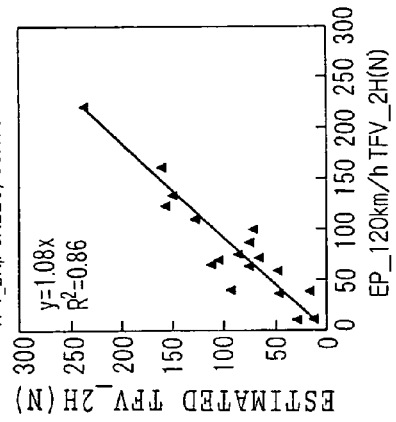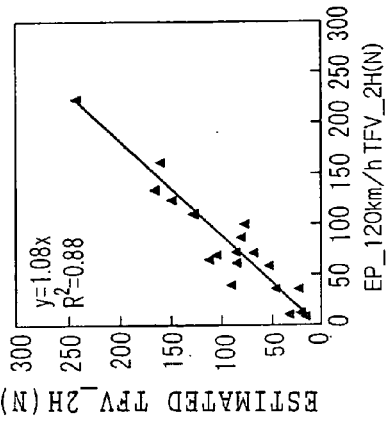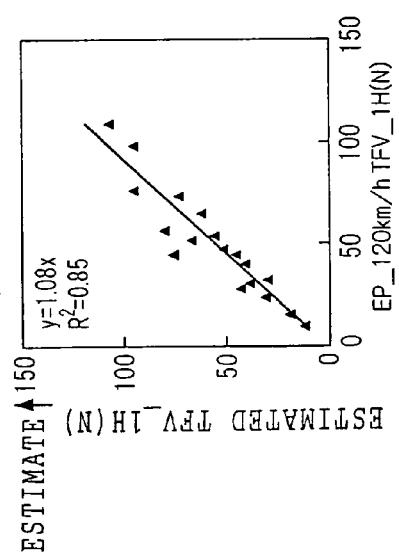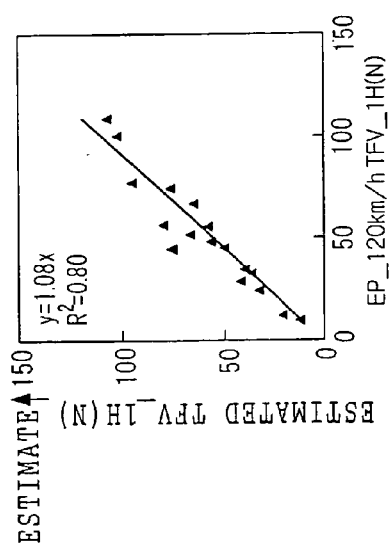

FIG. 39A
FIG. 39B
AT THE TIME OF LOW SPEED
AT THE TIME OF HIGH SPEED
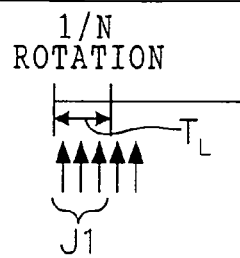
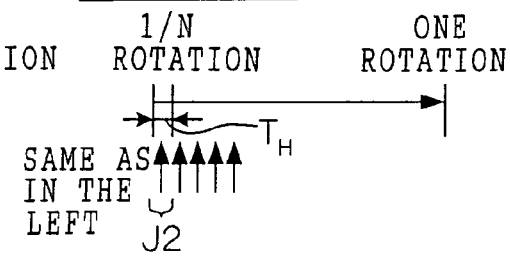

TIRE RADIAL FORCE VARIATION PREDICTION METHOD

TECHNICAL FIELD

The present invention relates to a radial force variation prediction method, a tangential force variation prediction method, a radial run out prediction method, and an angular acceleration fluctuation measurement method, and particularly to a radial run out prediction method, a radial force variation prediction method, a tangential force variation prediction method, and an angular acceleration fluctuation prediction method, in which radial force variation or tangential force variation can be accurately predicted by taking a radial run out (RRO) growth at high speed into consideration.

RELATED ART

The number of cases in which higher-order components of high speed uniformity of a tire generate noise due to vibration to thereby cause a problem has recently increased. For this reason, Japanese Patent Application Laid-Open (JP-A) No. 11-352024 discloses a method for predicting a higher-order component of high speed uniformity of a tire, in which based on low speed uniformity at the time a tire rolls at a low speed, a higher-order component (for example, a component of the second order or higher) of high speed uniformity at the time a tire rolls at a high speed is predicted. In this method, by measuring the upper and lower transfer characteristic and fore and aft transfer characteristic of a tire using a drum having a mound-like cleat, a radial force variation (RFV) at a high speed, and a tangential force variation (TFV) at a high speed are predicted.

PROBLEMS TO BE SOLVED BY THE INVENTION

However, the above-described method has a drawback in that a prediction error of high-speed RFV may become large since an RRO growth at a high speed is not taken into consideration.

Further, the above-described method also has a drawback in that a prediction error may become larger since measurement data at a low speed where TFV is small is used to predict high-speed RFV.

Moreover, in order to comprehend the upper and lower transfer characteristic and fore and aft transfer characteristic of a tire, a mound-like cleat must be mounted on a drum.

A conventional RRO measurement apparatus includes a light irradiation section which is provided so that emitted light is made to contact an outer periphery of a tire disposed in a rotatable manner, and a light receiving section which receives light irradiated from the light irradiation section 30. However, if the light irradiation section and the light receiving section shake along with rotation of the tire, a measured value of RRO to be obtained is affected thereby.

Further, when radial run out is measured in the above-described RRO measurement apparatus, mass non-uniformity (unbalance) of a tire caused by the presence of a portion having a relatively large mass in the tire, or fluctuation of rigidity of a tire caused by, for example, the presence of a portion having a relatively high rigidity is not taken into consideration. These factors affect the measured value of RRO.

Still further, necessary information such as RRO or a rotational speed of a tire is measured while rotating the tire. When the tire is rotated with driving force from a tire driving motor being constantly applied to a tire axis and rotating force from the tire driving motor to the tire axis becomes ununiform, unevenness is caused in the rotational speed of the tire. The obtained value is affected by the rotational unevenness.

Additionally, an amount of non-uniformity of a tire size is sampled in accordance with a pulse of a rotary encoder disposed on a tire axis. Since the sampling is thus effected in accordance with the pulse of the rotary encoder, if the tire speed changes, setting of frequency of a low pass filter for reducing noise must be sequentially changed.

DISCLOSURE OF THE INVENTION

The present invention has been achieved to solve the above-described problems, and an object thereof is to provide a radial force variation prediction method in which a prediction error of high-speed RFV in a tire having a large RRO growth amount at a high speed can be significantly reduced.

Another object of the present invention is to provide a tangential force variation prediction method in which a prediction error of high speed TFV can be significantly reduced.

Still another object of the present invention is to provide a radial run out prediction method in which a radial run out can be simply predicted, and an angular acceleration fluctuation prediction method in which angular acceleration fluctuation can be simply predicted.

A further object of the present invention is to provide an RFV prediction method in which, by using an actually measured value of RFV at a low speed and an actually measured value of RRO of a concentric-circle portion of a rim at the time of measuring an RFV at a low speed, a prediction error of high-speed RFV in a tire having a large RRO growth amount at a high speed can be significantly reduced.

A still further object of the present invention is to provide a tangential force variation prediction method in which, by using an actually measured value of angular acceleration fluctuation (AAV) and an actually measured value of RRO of a concentric-circle portion of a rim at the time of measuring an AAV, a prediction error of high-speed TFV can be significantly reduced.

Additionally, the present invention has been achieved in view of the above-described circumstances, and an object of the present invention is to provide a radial run out measurement apparatus in which a radial run out can be accurately measured.

Further, the present invention has been achieved in view of the above-described circumstances, and an object of the present invention is to provide a radial run out prediction method in which a radial run out can be accurately predicted.

Moreover, the present invention has been achieved in view of the above-described circumstances, and an object of the present invention is to provide an information acquisition method in which necessary information can be accurately acquired.

Additionally, the present invention has been achieved in view of the above-described circumstances, and an object of the present invention is to provide an apparatus for calculating a peripheral surface condition of a tire, which includes one kind of noise-reducing low pass filter which corresponds to speed change of a tire.

In order to achieve the above-described objects, a first invention is a radial force variation prediction method comprises the steps of: obtaining the relationship between a speed and a radial run out in each tire and obtaining an upper and lower spring constant (i.e., vertical spring constant), a vertical natural angular frequency, and an attenuation ratio (i.e., damping ratio) in each type of tire; measuring a radial run out at a low speed of each tire; calculating a radial run out at a target speed from the measured radial run out at a low speed and said relationship corresponding to the type of tire whose radial run out is measured; and based on the radial run out at the target speed, the upper and lower spring constant, the vertical natural angular frequency, and the attenuation ratio, predicting radial force variation at the target speed.

The relationship between speed and radial run out is given by the following expression (1), assuming that angular speeds of a tire each at two speed levels (a high speed H and a low speed L) at the time of idling or rotating at a predetermined load (for example, 500N) or less are represented by $\omega_H$, $\omega_L$, respectively, and the radial run out each at the angular speeds is represented by $RRO_H$, $RRO_L$, respectively.

$$RRO_0 = RRO_L + (RRO_H - RRO_L) \cdot \frac{\omega_0^2 - \omega_L^2}{\omega_H^2 - \omega_L^2} \quad (1)$$

wherein $\omega = V/Re$ (V is a rotational speed of the tire and Re is a rolling radius of the tire). $\omega_0 = V_0/Re$ and $V_0$ is a target speed.

Accordingly, the relationship between speed and radial run out in each tire is obtained by measuring the angular speeds $\omega_H$, $\omega_L$ of the tire and the radial run out $RRO_H$, $RRO_L$, and radial run out at a low speed of each tire is measured. The radial run out RROo at the target speed $V_0$ can be calculated from the measured radial run out at a low speed and also from the above-described relational expression corresponding to the type of the tire whose radial run out was measured.

Further, the relationship between speed and radial run out in each tire is obtained by measuring radial run out at an angular speed of a tire at the speed level of N+1 or more at the time of idling or rotating at a predetermined load (for example, 500N) or less, and radial run out at a low speed of each tire is measured. Based on the measured radial run out at a low speed and the above-described relation corresponding to the type of the measured tire, the radial run out at the target speed can be predicted in accordance with a regression equation of the N-th degree.

The upper and lower spring constant Kst, the vertical natural angular frequency $\omega nz$, and the attenuation ratio $\zeta_z$ are each obtained for each tire.

The vertical natural angular frequency $\omega nz$ and the attenuation ratio $\zeta_z$ may also be calculated using the following two methods in place of actual measurement.

The first method is a method in which the vertical natural angular frequency and the attenuation ratio are predicted so that a sum of squares of the difference between the predicted result of vertical transfer characteristic and transfer characteristic $kz(\omega)$ obtained by the following expression (2) becomes a minimum.

$$k_{z(\omega)} = K_{st} \cdot \sqrt{\frac{1 + \{2\zeta_Z(\omega/\omega_{nz})\}^2}{\{1 - (\omega/\omega_{nz})^2\}^2 + \{2\zeta_Z(\omega/\omega_{nz})\}^2}} \quad (2)$$

wherein a term having a root on the right side represents displacement transfer ratio of a primary attenuation system.

The second method is a method in which three or more sample tires are extracted from a same lot, and radial run out and radial force variation of each tire each at speeds of three levels or more (1 to M) are measured. The natural angular frequency and the attenuation ratio are predicted so that a sum of squares of the difference between each of the first-order to N-th order components $RFV_1$ to $RFV_N$ of radial force variation obtained by Fourier transformation, and each of the first-order to N-th order components $RFV_1$ to $RFV_N$ of radial force variation calculated from the following expression (3) becomes a minimum.

$$RFV_M = \{RFV_1/T_{1Z} + K_{st}(RRO_M - RRO_1)\}T_{MZ} \quad (3)$$

wherein M=1, 2, 3, . . . N, and $T_{1Z}$, $T_{MZ}$ are transfer ratios of displacement represented by the following expressions, respectively:

$$T_{1Z} = \sqrt{\frac{1 + \{2\zeta_Z(nV_1/R_e\omega_{nz})\}^2}{\{1 - (nV_1/R_e\omega_{nz})^2\}^2 + \{2\zeta_Z(nV_1/R_e\omega_{nz})\}^2}}$$

$$T_{MZ} = \sqrt{\frac{1 + \{2\zeta_Z(nV_M/R_e\omega_{nz})\}^2}{\{1 - (nV_M/R_e\omega_{nz})^2\}^2 + \{2\zeta_Z(nV_M/R_e\omega_{nz})\}^2}}$$

In order to predict $RFV_0$ of each tire at the target speed, based on the radial run out $RRO_0$ at the target speed $V_0$, the actually measured or calculated upper and lower spring constant Kst, the vertical natural angular frequency $\omega nz$, and the attenuation ratio $\zeta_z$, which are obtained by the above-described expressions, the radial force variation $RFV_0$ at the target speed is predicted in accordance with the following expression (4):

$$RFV_0 = K_{st} \cdot RRO_0 \cdot T_{0Z} \quad (4)$$

$T_{0Z}$, which represents the transfer ratio of displacement, can be given by the following expression:

$$T_{0Z} = \sqrt{\frac{1 + \{2\zeta_Z(nV_0/R_e\omega_{nz})\}^2}{\{1 - (nV_0/R_e\omega_{nz})^2\}^2 + \{2\zeta_Z(nV_0/R_e\omega_{nz})\}^2}}$$

wherein n is an order of Fourier transformation, and Re is a rolling radius of the tire.

Namely, the radial force variation is produced by transfer of force generated by deformation of the tire resulting from radial force (ground contact load). The transfer ratio of force, that is, transfer ratio of displacement at a low speed is 1, but the transfer ratio at a high speed varies depending on an input frequency, as described above. Accordingly, the target speed $RFV_0$ is, as shown in the above-described expression, represented by a product of the upper and lower spring constant, the radial run out RROo at the target speed $V_0$, and the transfer ratio of displacement.

Further, the low speed $RFV_L$ and the target speed $RFV_0$ are more properly represented by the following expressions, respectively.

$$RFV_L=(RRO_L \cdot K_{st}+RSV \cdot d) \cdot T_{LZ}$$

$$RFV_0=(RRO_0 \cdot K_{st}+RSV \cdot d) \cdot T_{0Z}$$

wherein RSV is a rigidity variation component, and d is an amount of deformation of a tire. When RSV·d is deleted from the above-described two expressions, the following expression (5) is obtained.

$$RFV_0=\{RFV_L/T_{LZ}+K_{st}(RRO_0-RRO_L)\}T_{0Z} \quad (5)$$

$T_{LZ}$, $T_{0Z}$ can be represented by the following expression, respectively.

$$T_{LZ} = \sqrt{\frac{1+\{2\zeta_Z(nV_L/R_e\omega_{nz})\}^2}{\{1-(nV_L/R_e\omega_{nz})^2\}^2+\{2\zeta_Z(nV_1/R_e\omega_{nz})\}^2}}$$

$$T_{0Z} = \sqrt{\frac{1+\{2\zeta_Z(nV_0/R_e\omega_{nz})\}^2}{\{1-(nV_0/R_e\omega_{nz})^2\}^2+\{2\zeta_Z(nV_0/R_e\omega_{nz})\}^2}}$$

Accordingly, the second invention is a radial force variation prediction method comprising the steps of: obtaining the relationship between a speed and a radial run out in each tire and obtaining an upper and lower spring constant, a vertical natural angular frequency, and an attenuation ratio in each type of tire; measuring radial run out and radial force variation at a low speed of each tire; calculating a radial run out at a target speed from the measured radial run out at a low speed and said relationship corresponding to the type of tire whose radial run out is measured; and based on the upper and lower spring constant, the vertical natural angular frequency, the attenuation ratio, the measured radial run out and radial force variation at a low speed, and the radial run out at the target speed, predicting radial force variation at the target speed.

In the second invention, based on the actually measured radial run out $RRO_L$ at a low speed, the actually measured radial force variation $RFV_L$ at a low speed, the radial run out RROo at the target speed $V_0$ predicted as described in the first invention, the upper and lower spring constant Kst actually measured or calculated by transformation from a measured result, the transfer ratio $T_{LZ}$ of displacement of a primary attenuation system at a low speed, which is represented by a function including the vertical natural angular frequency ωnz and the attenuation ratio $\zeta_z$, and the transfer ratio $T_{0Z}$ of displacement of the primary attenuation system at the target speed, the radial force variation $RFV_0$ at the target speed is predicted in accordance with the above-described expression (5).

The radial run out RROo at the target speed $V_0$ may be obtained by actual measurement for each tire, not by prediction.

$$TFV_0=(AAV \cdot I/R) \cdot T_{0X}$$

A term not including the transfer ratio of displacement on the right side of the above-described expression is represented by the following expression.

$$Fx(t)=(I \times RRV \times nV^2/R^4) \times \cos(2\pi nft - \pi/2)$$

wherein $RRV=C_{RRO} \times RRO$
$1/R=C_{TFV} \times$(moment of inertia)/rolling radius $$Fx(t) = \frac{T(t)}{R(t)}$$

-continued $$= \frac{I\frac{d}{dt}\left(\frac{V}{R(t)}\right)}{R(t)}$$

$$= \frac{I\frac{d}{dt}\left(\frac{V}{R+RRV\cos(2\pi nft)}\right)}{R+RRV\cos(2\pi nft)}$$

$$= \frac{I\frac{V}{RRV}\frac{d}{dt}\left[\frac{1}{\frac{R}{RRV}+\cos(2\pi nft)}\right]}{R+RRV\cos(2\pi nft)}$$

$$= \frac{I\frac{V}{RRV}\left\{-\frac{2\pi nf\cos(2\pi nft+\frac{\pi}{2})}{[R/RRV+\cos(2\pi nft)]^2}\right\}}{R+RRV\cos(2\pi nft)}$$

$$= \frac{I \times V \times RRV\left\{-\frac{2\pi nf\cos(2\pi nft+\frac{\pi}{2})}{[R/RRV+\cos(2\pi nft)]^2}\right\}}{R+RRV\cos(2\pi nft)}$$

$$= \frac{I \times 2\pi f \times R \times RRV \times 2\pi nf\cos(2\pi nft - \frac{\pi}{2})}{[R+RRV\cos(2\pi nft)]^3}$$

$$= \frac{I \times RRV \times n(2\pi f)^2 \cos(2\pi nft - \frac{\pi}{2})}{R^2}$$

Accordingly, the third invention is a tangential force variation prediction method comprising the steps of: obtaining, in each type of tire, an fore and aft natural angular frequency, an attenuation ratio, a coefficient of radial run out, and a coefficient of tangential force variation or a product of the coefficient of tangential force variation and moment of inertia; measuring radial run out at a low speed of each tire and angular acceleration fluctuation at a low speed of each tire; obtaining radial run out at a target speed of each tire; and based on the fore and aft natural angular frequency, the attenuation ratio, the coefficient of radial run out, the coefficient of tangential force variation or a product of the coefficient of tangential force variation and moment of inertia, and the radial run out at the target speed, predicting tangential force variation at the target speed.

Namely, in the third invention, based on the actually measured or predicted radial run out RROo at the target speed $V_0$, the transfer ratio $T_{0X}$ of displacement of a primary attenuation system at the target speed, which is represented by a function including the fore and aft natural angular frequency ωnx actually, which is actually measured or calculated by transformation from a measured result, and the attenuation ratio $\zeta_x$, the coefficient $C_{RRO}$ of radial run out, and a product of coefficient $C_{TFV}$ of the predicted tangential force variation and moment of inertia Iy, the tangential force variation TFVo at the target speed can be predicted in accordance with the following expression (6).

$$TVF_0 = C_{TFV} \cdot I_y \frac{nV^2 C_{RRO} \cdot RRO_0}{R_e^4} \cdot T_{ox} \quad (6)$$

$T_{ox}$ in the above-described expression can be represented by the following expression $$T_{ox} = \sqrt{\frac{1 + \{2\zeta_x(nV_0/R_e\omega_{nx})\}^2}{\{1 - (nV_0/R_e\omega_{nx})^2\}^2 \{2\zeta_x(nV_0/R_e\omega_{nx})\}^2}}$$

The above-described fore and aft natural angular frequency and attenuation ratio can be predicted so that a sum of squares of the difference between a predicted result of longitudinal transfer characteristic and longitudinal transfer characteristic $kx(\omega)$ calculated by the following expression becomes a minimum.

$$k_{x(\omega)} = a + b(\omega/\omega_{nx})^2 \sqrt{\frac{1 + \{2\zeta_x(\omega/\omega_{nx})\}^2}{\{1 - (\omega/\omega_{nx})^2\}^2 + \{2\zeta_x(\omega/\omega_{nx})\}^2}}$$

wherein a and b each represents a coefficient.

Further, the coefficient $C_{RRO}$ of radial run out can be predicted in such a manner that: three or more sample tires are extracted from the same lot; radial run out and angular acceleration fluctuation at a low speed are measured for each of the sample tires; and a sum of squares of the difference between each of the first-order to N-th order components $AAV_1$ to $AAV_N$ of angular acceleration fluctuation obtained by Fourier transformation and each of the first-order to N-th order components $AAV_1$ to $AAV_N$ of angular acceleration fluctuation calculated from the following expression are minimized.

$$AAV = \frac{nV^2}{R_e^2}\left\{-\frac{C_{RRO} \cdot RRO}{R_e + C_{RRO} \cdot RRO}\right\}$$
$$= -\frac{nV^2}{R_e^3}\{C_{RRO} \cdot RRO\}$$

wherein V is a speed, n is an order of Fourier transformation, Re is a rolling radius, and $C_{RRO}$ is a coefficient of RRO.

When the coefficient of radial run out is predicted, the first-order to third-order components at the speed of 30 km/h or less, which are less affected by longitudinal resonance, may be preferably used.

Further, the fore and aft natural angular frequency, the attenuation ratio, and the coefficient $C_{RRO}$ of RRO each may be predicted in such a manner as described below. That is, the coefficient $C_{RRO}$ of radial run out, the fore and aft natural angular frequency $\omega nx$, and the attenuation ratio $\zeta x$ are predicted in such a manner that: three or more sample tires are extracted from the same lot; and radial run out and angular acceleration fluctuation of each tire, each at speeds of three speed levels (1 to M) or more, are measured; and a sum of squares of the difference between each of the first-order to N-th order components $AAV_1$ to $AAV_N$ of angular acceleration fluctuation obtained by Fourier transformation, and each of the first-order to N-th order components $AAV_1$ to $AAV_N$ of angular acceleration fluctuation calculated from the following expression is minimized.

$$AAV_M = \frac{nV_M^2}{R_e^2}\left\{\frac{AAV_1/T_{1X}}{nV_1^2/R_e^2} - \frac{C_{RRO}(RRO_M - RRO_1)}{R_e}\right\}T_{MX}$$

wherein M=1, 2, 3, ... N, and $T_{1X}$, $T_{MX}$ are given by the following expressions, respectively.

$$T_{1X} = \sqrt{\frac{1 + \{2\zeta_x(nV_1/R_e\omega_{nx})\}^2}{\{1 - (nV_1/R_e\omega_{nx})^2\}^2 + \{2\zeta_x(nV_1/R_e\omega_{nx})\}^2}}$$

$$T_{MX} = \sqrt{\frac{1 + \{2\zeta_x(nV_M/R_e\omega_{nx})\}^2}{\{1 - (nV_M/R_e\omega_{nx})^2\}^2 + \{2\zeta_z(nV_M/R_e\omega_{nx})\}^2}}$$

The coefficient $C_{TFV}$ of tangential force variation, or a product of the coefficient $C_{TFV}$ of tangential force variation and moment of inertia can be predicted in such a manner as described below. Three or more sample tires are extracted from the same lot, and angular acceleration fluctuation and tangential force variation of each tire at a high peed are measured, and the coefficient of tangential force variation or a product of the coefficient of tangential force variation and moment of inertia is predicted so that a sum of squares of the difference between each of the first-order to N-th order components $TFV_1$ to $TFV_N$ of tangential force variation obtained by Fourier transformation and each of the first-order to N-th order components $TFV_1$ to $TFV_N$ of tangential force variation calculated from the following expression becomes a minimum.

$$TFV = C_{TFV}\frac{I_y \cdot AAV}{R_e}$$

The angular acceleration fluctuation used to predict the product of the coefficient $C_{RRO}$ of radial run out and moment of inertia or the product of the coefficient $C_{TFV}$ of tangential force variation and moment of inertia can be measured by: mounting, on a tire axis, a rotary encoder or a device which generates a signal corresponding to a rotation angle of a tire to thereby generate a signal corresponding to the rotation angle of a tire; extracting, from the signal, frequency variation rate $FVR_R$ at the time of idling of a tire and frequency variation rate $FVR_N$ at the time of loading using an FM modulator (or a device which detects rotational irregularity); and after Fourier transformation, calculating angular acceleration fluctuation (AAV) based on the following expression.

$$AAV = \frac{nV^2}{R_e^2}(FVR_N - FVR_R)$$

All of terms having roots in the above-described expression each represent the transfer ratio of displacement of a primary attenuation system, and the transfer ratio of displacement may also be given by other general expression or approximate expression.

The fourth invention is a tangential force variation prediction method comprising the steps of: obtaining, in each type of tire, a coefficient of tangential force variation, or a product of the coefficient of tangential force variation and moment of inertia; obtaining angular acceleration fluctuation at a target speed of each tire; and based on the coefficient of tangential force variation or a product of the coefficient of tangential force variation and moment of inertia, and the angular acceleration fluctuation at the target speed, predicting tangential force variation at the target speed.

In the fourth invention, based on the actually measured or predicted angular acceleration fluctuation AAVo at the target speed $V_0$, and a product of the predicted coefficient $C_{TFV}$ of tangential force variation and moment of inertia Iy, the tangential force variation TFVo at the target speed can be predicted in accordance with the following expression (7):

$$TFV_0 = C_{TFV} \cdot \frac{I_y \cdot AAV_0}{R_e} \qquad (7)$$

The product of the coefficient $C_{TFV}$ of tangential force variation and moment of inertia Iy, and the angular acceleration fluctuation at the target speed are each obtained in such a manner as in the third invention.

In the third and fourth inventions, in place of the product of the coefficient $C_{TFV}$ of tangential force variation and moment of inertia Iy, the coefficient $C_{TFV}$ of tangential force variation may also be used.

In the radial run out prediction method according to the fifth invention, radial run out is predicted using the following two methods.

The first method is a method in which radial run out $RRO_H$, $RRO_L$ at tire angular speeds $\omega_H$, $\omega_L$ of the two speed levels (the high speed H and the low speed L) at the time of idling or rotating at a predetermined load (for example, 500 N) or less are measured, and based on the above-described expression (1), the radial run out RRO0 at the target speed is predicted.

The second method is a method in which radial run out at a tire angular speed of the speed level N+1 or more at the time of idling or rotating at a predetermined load (for example, 500 N) or less is measured, and the radial run out at the target speed is predicted using a regression equation of the N-th degree.

A tire angular acceleration fluctuation (AAV) prediction method according to the sixth invention comprises the steps of: obtaining, in each type of tire, a fore and aft natural angular frequency, an attenuation ratio, and a coefficient of radial run out based on angular acceleration fluctuation; measuring radial run out at a low speed of each tire; obtaining radial run out at a target speed of each tire; and based on the fore and aft natural angular frequency, the attenuation ratio, the coefficient of radial run out, and the radial run out at the target speed, predicting angular acceleration fluctuation at the target speed.

In the sixth invention, based on the radial run out RRO0 at the target speed $V_0$ predicted as described above, and also based on the fore and aft natural angular frequency $\omega_{nx}$, attenuation ratio, and the coefficient of radial run out, which are actually measured or calculated by transformation from measured results as described above, the angular acceleration fluctuation $AAV_0$ at the target speed is predicted in accordance with the following expression (8):

$$AAV_0 = \qquad (8)$$
$$\frac{nV_0^2}{R_e^2}\left(\frac{C_{RRO} \cdot RRO_0}{R_e}\right)\sqrt{\frac{1 + \{2\zeta_Z(nV_0/R_e\omega_{nx})\}^2}{\{1 - (nV_0/R_e\omega_{nx})^2\}^2 + \{2\zeta_x(nV_0/R_e\omega_{nx})\}^2}}$$

A tire angular acceleration fluctuation prediction method according to the seventh invention is an angular acceleration fluctuation prediction method comprising the steps of: obtaining, in each type of tire, a fore and aft natural angular frequency, an attenuation ratio, and a coefficient of radial run out; measuring radial run out at a low speed of each tire and angular acceleration fluctuation at the low speed; obtaining radial run out at a target speed of each tire; and based on the fore and aft natural angular frequency, the attenuation ratio, the coefficient of radial run out, the radial run out at the target speed, and the angular acceleration fluctuation at the low speed, predicting angular acceleration fluctuation at the target speed.

In the seventh invention, based on actually measured values $RRO_L$, $AAV_L$ of radial run out and angular acceleration fluctuation at a low speed, and the radial run out RRO0 at the target speed $V_0$ predicted as described above, and also based on the natural angular frequency $\omega_{nx}$, the attenuation ratio $\zeta x$, and the coefficient of radial run out, the angular acceleration fluctuation at the target speed is predicted in accordance with the following expression:

$$AAV_0 = \frac{nV_0^2}{R_e^2}\left\{\frac{AAV_L/T_{Lx}}{nV_L^2/R_e^2} - \frac{C_{RRO} \cdot (RRO_0 - RRO_L)}{R_e}\right\}T_{ox}$$

wherein $T_{OX}$, $T_{LX}$ are the transfer ratios of displacement of a primary attenuation system each at a target speed and at a low speed, and are represented by the following expressions, respectively.

$$T_{ox} = \sqrt{\frac{1 + \{2\zeta_x(nV_0/R_e\omega_{nx})\}^2}{\{1 - (nV_0/R_e\omega_{nx})^2\}^2 + \{2\zeta_x(nV_0/R_e\omega_{nx})\}^2}}$$

$$T_{LX} = \sqrt{\frac{1 + \{2\zeta_x(nV_L/R_e\omega_{nx})\}^2}{\{1 - (nV_L/R_e\omega_{nx})^2\}^2 + \{2\zeta_x(nV_L/R_e\omega_{nx})\}^2}}$$

Data obtained for each type of tire in each of the above-described inventions is preferably stored in a storage device and organized as a database. Due to the data being organized as the database, the radial force variation, the tangential force variation or the angular acceleration fluctuation of each type of tire can be efficiently predicted.

In order to achieve the above-described objects, the eighth invention is a radial force variation prediction method comprising the steps of: obtaining, in each type of rim-fitted tire, an upper and lower spring constant, a vertical natural angular frequency, and a coefficient including an attenuation ratio; measuring radial force variation at a low speed of a rim-fitted tire and radial run out of a concentric circle portion of a rim at the same time, and also measuring each radial run out of a tire tread and the concentric circle portion of the rim at a low speed and at a high speed; and predicting radial force variation of a tire single unit at a target speed based on the measured radial force variation at a low speed, radial run out of a tire single unit at the target speed, which is obtained from the respective radial run out of the tire tread and the concentric circle portion of the rim at a low speed and at a high speed, radial run out of the tire tread at the time of measuring radial force variation which is obtained from radial run out of the tire single unit at a low speed and also from radial run out of the concentric circle portion of the rim at the time of measuring radial force variation, and said coefficient corresponding to the type of rim-fitted tire to be measured.

In the above-described step in which radial force variation and radial run out of a concentric circle portion of a rim at a low speed of a rim-fitted tire are measured at the same time, and respective radial run out of a tire tread and the concentric circle portion of the rim each at a low speed and at a high speed is measured, the low speed when the radial force variation and the radial run out of the concentric circle portion of the rim at a low speed of a rim-fitted tire are measured at the same time, and the low speed when respective radial run out of the tire tread and the concentric circle portion of the rim each at a low speed and at a high speed is measured, may be the same or may be different from each other. The above-described radial force variation $RFV_0$ can be represented by the following expression:

$$RFV_0 = \left\{ K_{st}(RRO_0 - RRO_M) + \frac{RFV_L}{T_{LZ}} \right\} T_{OZ} \quad (9)$$

The radial run out $RRO_o$ of a tire single unit at the target speed in the above-described expression (9) can be calculated by measuring tire angular speeds $\omega_H$, $\omega_L$ each at a high speed and at a low speed at the time of idling or rotating at a predetermined load or less, radial run out $TreRRO_H$, $TreRRO_L$ of a tread each at these angular speeds, and radial run out $RimRRO_H$, $RimRRO_L$ of the rim and also based on the following expression:

$$RRO_0 = RRO_L + (RRO_H - RRO_L) \times \left( \frac{\omega_0^2 - \omega_L^2}{\omega_H^2 - \omega_L^2} \right) \quad (10)$$

wherein $RRO_L = TreRRO_L - RimRRO_L$ $RRO_H = TreRRO_H - RimRRO_H \quad (11)$

The radial run out $RRO_M$ of the tire tread at the time of measuring radial force variation in the above-described expression (9) can be a value given by the following expression in which the radial run out $RimRRO_M$ of the concentric circle portion of the rim measured at the time of measuring radial force variation is added to the radial run out $RRO_L$ of a tire single unit at a low speed, which is obtained by subtracting the radial run out $RimRRO_L$ of the concentric circle portion of the rim measured at the same time from the radial run out $TreRRO_L$ of the tire tread at a low speed.

$RRO_M = RRO_L + RimRRO_M \quad (12)$ wherein $RRO_L = TreRRO_L - RimRRO_L \quad (13)$ Further, radial run out $DramRRO_M$ of a drum which is made to contact the tire at the time of measuring radial run out is further measured, and when it is added to radial run out $RRO_M$ of the tire tread at the time of measuring radial force variation, which radial run out is represented by the above-described expression (12), radial force variation can be predicted more precisely.

Moreover, the vertical transfer ratio $T_{LZ}$ at a low speed and the vertical transfer ratio $T_{OZ}$ at the target speed in the above-described expression (9) can be calculated by the following expressions, respectively.

$$T_{LZ} = \sqrt{\frac{1 + \left\{ 2\zeta_z \left( \frac{nV_L}{R_e \omega_{nz}} \right) \right\}^2}{\left\{ 1 - \left( \frac{nV_L}{R_e \omega_{nz}} \right)^2 \right\}^2 + \left\{ 2\zeta_z \left( \frac{nV_L}{R_e \omega_{nz}} \right) \right\}^2}} \quad (14)$$

$$T_{OZ} = \sqrt{\frac{1 + \left\{ 2\zeta_z \left( \frac{nV_0}{R_e \omega_{nz}} \right) \right\}^2}{\left\{ 1 - \left( \frac{nV_0}{R_e \omega_{nz}} \right)^2 \right\}^2 + \left\{ 2\zeta_z \left( \frac{nV_0}{R_e \omega_{nz}} \right) \right\}^2}} \quad (15)$$

Wherein V is a speed (a road-surface speed with respect to $\omega$), n is an order, $\omega nz$ is natural angular frequency, Re is a rolling radius, Kst is an upper and lower spring constant, and $\zeta z$ is an attenuation ratio.

The ninth invention comprises the steps of: obtaining, in each type of rim-fitted tire, radial run out, angular acceleration fluctuation, moment of inertia, a fore and aft natural angular frequency, and a coefficient including an attenuation ratio at plural portions corresponding to a tire speed; measuring angular acceleration fluctuation at a low speed of a rim-fitted tire and radial run out of a concentric circle portion of a rim at the same time, and also measuring each radial run out of a tire tread and the concentric circle portion of the rim each at a low speed and at a high speed; and predicting tangential force variation of a tire single unit at a target speed based on the measured angular acceleration fluctuation at a low speed, radial run out of a tire single unit at a target speed, which is obtained from the respective radial run out of the tire tread and the concentric circle portion of the rim each at a low speed and at a high speed, radial run out of the tire tread at the time of measuring angular acceleration fluctuation, which is obtained from the radial run out of a tire single unit at a low speed and the radial run out of the concentric circle portion of the rim at the time of measuring angular acceleration fluctuation, and said coefficient corresponding to the type of rim-fitted tire to be measured.

In the above-described step in which angular acceleration fluctuation and radial run out of the concentric circle portion of the rim at a low speed of a rim-fitted tire are measured at the same time, and respective radial run out of a tire tread and the concentric circle portion of the rim each at a low speed and at a high speed is measured, the low speed when angular acceleration fluctuation and radial run out of the concentric circle portion of the rim at a low speed of a rim-fitted tire are measured at the same time, and the low speed when respective radial run out of the tire tread and the concentric circle portion of the rim each at a low speed and at a high speed is measured, may be the same or different from each other.

The tangential force variation $TFV_0$ in the ninth invention is represented by the following expression.

$$TFV_0 = I_Y \left\{ \frac{RRO_0 - RRO_M}{R_e} - \frac{AAV_L}{T_{LX}} \right\} T_{OX} \quad (16)$$

The radial run out $RRO_o$ of a tire single unit at the target speed is obtained as in the above-described expression (1). The radial run out $RRO_M$ of the tire tread at the time of measuring angular acceleration fluctuation can be calculated as in the above-described expression (12) by adding the radial run out of the concentric circle portion of the rim measured at the time of measuring angular acceleration fluctuation, to the radial run out of a tire single unit at a low speed, which radial run out is obtained by subtracting the radial run out of the concentric circle portion of the rim at a low speed from the radial run out of the tire tread at a low speed.

In this invention as well, radial run out of a drum which is made to contact the tire at the time of measuring radial run out, or the like, is further measured, and is added to the radial run out of the tire tread at the time of measuring angular acceleration fluctuation at a low speed, thereby allowing tangential force variation to be more accurately predicted.

In this case, it is considered that angular acceleration fluctuation which is a main factor of tangential force variation produced at a high speed may result from rotational irregularity caused by a rim-fitted tire being accelerated or decelerated via driving stiffness from the road surface. Consequently, preferably, a term obtained from a solid tire model having one degree of freedom shown in FIG. 1 with driving stiffness taken into consideration is added to the fore and aft transfer ratio, and the fore and aft transfer ratio $T_{LX}$ and the fore and aft transfer ratio $T_{OX}$ at the target speed are calculated as shown in the following expressions. In this manner, by adding coefficient Kx of driving stiffness each to the fore and aft transfer ratio $T_{LX}$ at a low speed and to the fore and aft transfer ratio $T_{OX}$ at the target speed, angular acceleration fluctuation resulting from the driving stiffness can be corrected to allow accurate prediction of high-speed TFV.

$$T_{LX} = \frac{\frac{nV_L^2}{R_e^2}}{\sqrt{1+\left(\frac{nI_Y V_L}{K_x R_e}\right)^2}} \sqrt{\frac{1+\left\{2\zeta_x\left(\frac{nV_L}{R_e \omega_{nx}}\right)\right\}^2}{\left\{1-\left(\frac{nV_L}{R_e \omega_{nx}}\right)^2\right\}^2 + \left\{2\zeta_x\left(\frac{nV_L}{R_e \omega_{nx}}\right)\right\}^2}} \quad (17)$$

$$T_{OX} = \frac{\frac{nV_0^2}{R_e^2}}{\sqrt{1+\left(\frac{nI_Y V_0}{K_x R_e}\right)^2}} \sqrt{\frac{1+\left\{2\zeta_x\left(\frac{nV_0}{R_e \omega_{nx}}\right)\right\}^2}{\left\{1-\left(\frac{nV_0}{R_e \omega_{nx}}\right)^2\right\}^2 + \left\{2\zeta_x\left(\frac{nV_0}{R_e \omega_{nx}}\right)\right\}^2}} \quad (18)$$

wherein V is a speed, n is an order, $\omega_{nx}$ is a natural angular frequency, Kx is driving stiffness, Re is a rolling radius, Iy is moment of inertia, and $\zeta x$ is an attenuation ratio.

Next, a description will be given of the term obtained from the solid tire model having one degree of freedom. In FIG. 17, inertial force I and longitudinal moment applied from the road surface via a slip ratio $Sa(\theta)$ are balanced with each other around the point O. Therefore, the following expression is obtained.

$$I \times \ddot{\theta} = r(\theta) \times \int (\theta) \quad (19)$$
$$= r(\theta) \times K_x \times s_a(\theta)$$

In the above-described expression, the slip ratio $Sa(\theta)$ is represented as shown below using average values and amounts of variation of rolling radius $r(\theta)$ and angular speed.

$$I \times \ddot{\theta} = r(\theta) \times \int (\theta) \quad (20)$$
$$= r(\theta) \times K_x \times \frac{r(\theta) \times \dot{\theta} - V}{V}$$

$$I \times \frac{d}{dt}[\dot{\Theta}_0 + \dot{\theta}_v] = [R_0 + r_v(\theta)] \times K_x \times$$
$$\frac{[R_0 + r_v(\theta)] \times [\dot{\Theta}_0 + \dot{\theta}_v] - R_0 \times \dot{\Theta}_0}{R_0 \times \dot{\Theta}_0}$$

$$I \times \frac{d}{dt}[\dot{\theta}_v] = K_x \left\{ R_0 \left[ \frac{r_v(\theta)\dot{\Theta}_0}{R_0 \dot{\Theta}_0} + \frac{R_0 \dot{\theta}_r}{R_0 \dot{\Theta}_0} + \frac{r_v(\theta)\dot{\theta}_v}{R_0 \dot{\Theta}_0} \right] + \right.$$
$$\left. r_v(\theta)\left[\frac{r_v(\theta)\dot{\Theta}_0}{R_0 \dot{\Theta}_0} + \frac{R_0 \dot{\theta}_r}{R_0 \dot{\Theta}_0} + \frac{r_v(\theta)\dot{\theta}_v}{R_0 \dot{\Theta}_0}\right] \right.$$
$$= K_x \left\{ r_v(\theta) + \frac{R_0}{\dot{\Theta}_0}\dot{\theta}_v + 2\frac{r_v(\theta)\dot{\theta}_v}{\dot{\Theta}_0} + \right.$$
$$\left. \frac{[r_v(\theta)]^2}{R_0} + \frac{[r_v(\theta)]^2 \dot{\theta}_v}{R_0 \dot{\Theta}_0} \right\}$$
$$\cong K_x \times r_v(\theta) + K_x \times \frac{R_0}{\dot{\Theta}_0}\dot{\theta}_v$$

A solution is assumed and substituted in the above-described expression as shown in the following expressions:

$$I \times \frac{d}{dt}[\dot{\theta}_v] = K_x \times r_v(\theta) + K_x \times \frac{R_0}{\dot{\Theta}_0}\dot{\theta}_v \quad (21)$$

$$I \times n\dot{\Theta}_0 \dot{\Theta}_v \cos(n\dot{\Theta}_0 t + \alpha) = K_x \times R_v \sin(n\dot{\Theta}_0 t) +$$
$$\frac{K_x R_0}{\dot{\Theta}_0} \times \dot{\Theta}_v \sin(n\dot{\Theta}_0 t + \alpha)$$

$$K_x \times R_v \sin(n\dot{\Theta}_0 t) = \dot{\Theta}_v \left[ I \times n\dot{\Theta}_0 \cos(n\dot{\Theta}_0 t + \alpha) - \frac{K_x R_0}{\dot{\Theta}_0} \times \right.$$
$$\left. \sin(n\dot{\Theta}_0 t + \alpha) \right]$$

$$K_x \times R_v \sin(n\dot{\Theta}_0 t) = \dot{\Theta}_v \sqrt{(I \times n\dot{\Theta}_0)^2 + \left(\frac{K_x R_0}{\dot{\Theta}_0}\right)^2} \times$$
$$\sin(n\dot{\Theta}_0 t + \beta)$$

wherein $\beta = \alpha - \text{ArcTan}\left(\frac{I \times n\dot{\Theta}_0}{K_x R_0}\right)$ Due to the nature of an identity, respective amplitudes and phases of both sides each must be the same. Therefore, the solution is obtained as shown below.

$$K_x \times R_v = \dot{\Theta}_v \sqrt{(I \times n\dot{\Theta}_0)^2 + \left(\frac{K_x R_0}{\dot{\Theta}_0}\right)^2} \quad (22)$$

$$\frac{\dot{\Theta}_v}{\dot{\Theta}_0} = \frac{R_v}{R_0} \frac{1}{\sqrt{1+\left(\frac{I \times n\dot{\Theta}_0^2}{K_x R_0}\right)^2}}$$

-continued $$0 = \alpha - \text{ArcTan}\left(\frac{l \times n\Theta_0^2}{K_x R_0}\right)$$

$$\alpha = \text{ArcTan}\left(\frac{l \times n\Theta_0^2}{K_x R_0}\right)$$

In each of the above-described inventions, as the radial run out of the concentric circle portion of the rim (preferably, a portion of the rim having a bead seat portion and the concentric circle), radial run out of a zero offset portion of the rim or radial run out of regions which are located symmetrical to each other with the zero offset portion interposed therebetween can be measured.

Data obtained for each type of rim-fitted tire in each of the above-described inventions is preferably stored in a storage device and organized as a database. Due to the data being organized as the database, radial force variation or tangential force variation of a tire single unit of each rim-fitted tire can be efficiently predicted.

A radial run out measurement apparatus according to a first aspect of the tenth invention includes: light emitting means which is disposed so that light emitted therefrom is made to contact an outer periphery of a tire located rotatably; and light receiving means which receives light emitted from the light emitting means, wherein radial run out is measured based on an amount of light received by the light receiving means, the apparatus comprising: interrupting means which is disposed fixedly between the light emitting means and the light receiving means, said interrupting means being provided so as to cut off a part of light emitted from the light emitting means.

Namely, the above-described invention is a measurement apparatus in which light emitting means located so as to contact an outer periphery of a tire disposed in a rotatable manner, and light receiving means which receives light emitted from the light emitting means are provided, and based on the amount of light received by the light receiving means, radial run out is measured.

If the light emitting means and the light receiving means swing, this swing produces an error and the error occurs in a measured value of radial run out.

Accordingly, the present invention provides interrupting means which is disposed fixedly between the light emitting means and the light receiving means to cut off a part of light emitted from the light emitting means.

In this manner, the interrupting means which cuts off a part of light emitted from the light emitting means is disposed fixedly between the light emitting means and the light receiving means. Therefore, even if the light emitting means and the light receiving means swing, the light receiving means receives light which has been interrupted by the interrupting means, and most fluctuation of the received light can be caused by RRO of the tire. As a result, the radial run out can be measured accurately.

As the second aspect, the interrupting means may be connected to the tire axis. Therefore, the swing of the interrupting means with respect to the tire axis can be corrected. This results in that radial run out can be measured more accurately than in the first aspect.

Further, as the third aspect, plural pairs of light emitting means and light receiving means may also be located around the tire. For this reason, RRO can be measured only by making less than one rotation of the tire. More specifically, for example, if N pairs (N is an integer of 2 or more) of light emitting means and light receiving means are located at regular intervals, RRO can be measured only by making 1/N rotation of the tire.

Moreover, as the fourth aspect, the above-described light emitting means and light receiving means may be located around the tire in a rotatable manner. When the light emitting means and the light receiving means are rotated in a direction opposite to a direction in which the tire rotates, the measuring time of RRO in a portion near a position at which the rotational speed of the tire is zero can be reduced.

Although the measuring time of RRO cannot be shortened, even when the light emitting means and the light receiving means are rotated in the same direction as the direction in which the tire rotates, RRO can be measured.

Further, even when the rotational speed of the tire is zero and the light emitting means and the light receiving means are rotated around the tire, unevenness in the circumferential direction of the tire can be measured.

The radial run out estimation method according to the eleventh invention comprises the steps of: measuring radial run out of a sample tire each at a low speed and at a target speed; obtaining mass unbalance RMV of the sample tire and rigidity variation RSV of the sample tire, and based on the measured radial run out of the sample tire at a low speed (low-speed RRO), the radial run out of the sample tire at a target speed, an estimated value of radial run out of the sample tire at the target speed which is obtained from the following expression (target-speed RRO estimate), and the following expression, identifying coefficient 1 and coefficient 2 in the following expression so that a sum of squares of a difference between the measured radial run out of the sample tire at the target speed and the estimated value of radial run out of the sample tire at the target speed which is obtained from the following expression becomes a minimum; obtaining mass unbalance RMV of a tire and rigidity variation RSV of the tire; measuring radial run out of the tire at a low speed; and estimating radial run out of the tire at the target speed based on the obtained mass unbalance RMV of the tire and rigidity variation RSV of the tire, the measured radial run out of the tire at a low speed, and the following expression in which the coefficient 1 and the coefficient 2 are identified.

Target speed *RRO* estimate=low-speed *RRO*+coefficient 1×*RMV*−coefficient 2×*RSV*

Namely, in the above-described invention, radial run out of a sample tire each at a low speed and at a target speed is measured.

Further, mass unbalance RMV of the above-described sample tire and rigidity variation RSV of the sample tire are obtained, and based on the measured radial run out of the sample tire at a low speed (low speed RRO), the measured radial run out of the sample tire at a target speed, an estimated value of the radial run out of the sample tire at the target speed which is obtained from the above-described expression (target-speed RRO estimate), and the above-described expression, coefficient 1 and coefficient 2 in the above-described expression are identified so that a sum of squares of the difference between the measured radial run out of the sample tire at the target speed and the estimated value of the radial run out of the sample tire at the target speed which is obtained from the above-described expression becomes a minimum.

Moreover, in the present invention, the mass unbalance RMV of a tire, and the rigidity variation RSV of the tire are obtained, and radial run out of the tire at a low speed is also measured.

And then, based on the mass unbalance RMV of the tire and the rigidity variation RSV of the tire obtained as described above, the measured radial run out of the tire at a low speed, and the above-described expression in which the coefficient 1 and the coefficient 2 are identified, the radial run out of the tire at the target speed is estimated.

In this manner, the present invention allows estimation of the radial run out at the target speed in which the mass unbalance of the tire and the rigidity variation of the tire are taken into consideration.

The radial run out prediction method according to the twelfth invention comprises the steps of: measuring angular speeds $\omega_{HS}$, $\omega_{LS}$ of a sample tire, each at a high speed and at a low speed, at the time of idling or rotating at a predetermined load or less, and radial run out $RRO_{HS}$, $RRO_{LS}$ of the sample tire each at the angular speeds, and identifying an index in the following expression so that a sum of squares of a difference between radial run out $RRO_{EST}$ of the sample tire at a predetermined speed, which is estimated based on the following expression, and actually measured radial run out RRO of the sample tire at the predetermined speed becomes a minimum; measuring angular speeds $\omega_{HS}$, $\omega_{LS}$ of a tire, each at a high speed and at a low speed, at the time of idling or rotating at a predetermined load or less, and radial run out $RRO_{HS}$, $RRO_{LS}$ of the tire each at the angular speeds; and estimating radial run out of the tire at a target speed from the measured radial run out $RRO_{HS}$, $RRO_{LS}$ of the tire each at the angular speeds, and the expression in which the index is identified.

$$RRO_{EST} = RRO_{LS} + (RRO_{HS} - RRO_{LS}) \times \left( \frac{\omega_{EST}^x - \omega_{LS}^x}{\omega_{HS}^x - \omega_{LS}^x} \right)$$

wherein $\omega=V/Re$ (V is a speed of the tire and Re is rolling radius of the tire).

In this manner, the index in the above-described expression is identified so that a sum of squares of the difference between the radial run out RRO at the predetermined speed, which radial run out is estimated based on the above-described expression, and the actually measured radial run out at the predetermined speed becomes a minimum, and the radial run out at the target speed is estimated from the measured radial run out each at a low speed and at a high speed, and also from the expression in which the index is specified. As a result, compared with a case in which the index is fixed at 2, the precision of estimation can be improved.

The information acquisition method according to the thirteenth invention comprises the steps of: rotating a tire in such a manner as to connecting rotating force from tire rotating means to a tire axis using connecting/disconnecting means; when the tire is rotating by rotating force from the tire rotating means, disconnecting the rotating force from the tire rotating means using the connecting/disconnecting means; and acquiring necessary information when the tire is rotating due to inertia after the rotating force from the tire rotating means is disconnected.

Namely, rotating force from the tire rotating means is connected to the tire axis using the connecting/disconnecting means such as an electromagnetic clutch. As a result, the tire is rotated. When the tire is rotating due to the rotating force from the tire rotating means being connected thereto, the rotating force from the tire rotating means is disconnected by the connecting/disconnecting means. After the rotating force from the tire rotating means is disconnected as described above, the tire rotates due to inertia. During the rotation of the tire due to inertia, necessary information is acquired. The necessary information includes at least one of the rotational speed, radial run out and radial force variation of the tire.

In this manner, the necessary information is acquired during the tire rotates due to inertia. Therefore, even when the rotating force from the tire rotating means becomes irregular, the acquired information can be prevented from being affected by the rotational irregularity.

The radial run out prediction method according to the fourteenth invention comprises the steps of: measuring radial run out each at plural positions of measurement in a transverse direction of a sample tire; identifying a weighted average coefficient fixed at each position of measurement so that a sum of squares of a difference between radial force variation of the sample tire at a predetermined speed, which is obtained from a weighted average value of radial run out given based on a weighted average coefficient fixed at each position of measurement, and actually measured radial force variation of the sample tire at a predetermined speed becomes a minimum; measuring, at each of the positions of measurement, angular speeds $\omega_H$, $\omega_L$ of a tire, each at a high speed and at a low speed, and radial run out $RRO_H$, $RRO^L$ of the tire each at the angular speeds; predicting radial run out RROo of the tire at a target speed at each position of measurement from the radial run out $RRO_H$, $RRO_L$ of the tire measured at the plural positions of measurement in the transverse direction of the tire, and also from the following expression; and calculating a weighted average value of radial run out from the radial run out RROo of the tire at the target speed predicted at each of the position of measurement, and the identified weighted average coefficient.

$$RRO_0 = RRO_L + (RRO_H - RRO_L) \cdot \frac{\omega_0^2 - \omega_L^2}{\omega_H^2 - \omega_L^2}$$

Namely, in the present invention, radial run out is measured at each of plural positions of measurement in the transverse direction of the sample tire.

Further, the coefficient of weighted average set at each position of measurement is identified so that a sum of squares of the difference between the radial force variation of the sample tire at a predetermined speed, which radial force variation is obtained from a weighted average value of radial run out obtained based on the coefficient of weighted average set at each position of measurement, and the actually measured radial force variation of the sample tire at the predetermined speed becomes a minimum.

Furthermore, in the present invention, angular speeds $\omega_H$, $\omega_L$ of the tire each at a high speed and at a low speed, and radial run out $RRO_H$, $RRO_L$ of the tire each at the angular speeds are measured at each of the positions of measurement.

Moreover, the radial run out RROo at the target speed is predicted at each position of measurement from the radial run out $RRO_H$, $RRO_L$ of the tire measured at the plural positions of measurement in the transverse direction of the tire, and also from the above-described expression.

As a result, the weighted average value of radial run out is calculated from the radial run out RROo of the tire at the target speed predicted at each position of measurement, and also from the identified coefficient of weighted average.

In the above-described invention, tangential force variation may be used in place of radial force variation.

In this manner, RFV or TFV is predicted from the weighted average value of RRO at the plural positions of measurement in the transverse direction of the tire, and therefore, accuracy of prediction can be improved.

The tire outer periphery condition calculation apparatus according to the fifteenth invention comprises: tire condition detecting means which detects a condition of an outer peripheral surface of a tire; signal generating means which generates a signal corresponding to a rotation angle of the rotating tire; and calculation means which calculates, across one rotation of the tire, an average of the condition of the outer peripheral surface of the tire, which condition is detected by said tire condition detecting means at certain time intervals, within an interval in which a signal is generated by said signal generating means together with rotation of the tire.

The condition detecting means detects the condition of the outer peripheral surface of the tire. The signal generating means generates a signal corresponding to the rotation angle of the tire at the time of rotating.

The calculating means calculates, across one rotation of the tire, an average of the outer periphery condition of the tire, which condition is detected by the condition detecting means at certain time intervals, within an interval in which the signal is generated by the signal generating means together with rotation of the tire.

In this manner, together with the rotation of the tire, the average of the outer periphery condition of the tire, which condition is detected at certain time intervals, within the interval in which the signal is generated in accordance with the rotation angle of the tire is calculated across one rotation of the tire. That is, the condition of the tire outer peripheral surface at each fixed rotation angle can be obtained from the average of the outer periphery condition of the tire, which condition is detected at certain time intervals.

Accordingly, in the present invention, the condition of the outer peripheral surface of the tire at each fixed rotation angle can be obtained without sequentially changing frequency setting of a low pass filter for reducing noise.

The condition of the outer peripheral surface of the tire includes, for example, an amount of non-uniformity on the outer peripheral surface of the tire.

BRIEF DESCRIPTION OF THE DRAWINGS

FIG. 8 is a diagram which shows actually measured values and predicted values of AAV.

FIG. 9 is a diagram which shows predicted values and actually measured values of the first-order, second-order and third-order components of the high RFV predicated from the actually measured values of RFV.

FIG. 13 is a schematic diagram of a protrusion run-over testing machine.

FIG. 14 is a diagram which shows actually measured values at the time of run-over of a cleat in the protrusion run-over testing machine, and natural vibration and attenuation ratio which are calculated from the actually measured values.

FIG. 15 is a diagram which shows natural vibration and attenuation ratio calculated from another expression.

FIG. 16 is a diagram which shows, by comparison, estimated results of the first-order, second-order and third-order components of RRO, and actually measured results of the first-order, second-order and third-order components of RRO.

FIG. 21(A) shows primary radial run out of a tire tread; FIG. 21(B) shows primary radial run out of a concentric-circle portion of a rim; and FIG. 21(C) shows primary radial run out of a tire single unit, which is obtained by subtracting the primary radial run out of a concentric-circle portion of a rim from the primary radial run out of a tire tread.

FIGS. 34(A), 34(B) and 34(C) are graphs each showing a relationship between each of the first-order, second-order and third-order RFV given from RRO obtained using a fixed index, and actually measured values of RFV; and FIGS. 34(D), 34(E) and 34(F) are graphs each showing a relationship between each of the first-order, second-order and third-order RFV given from RRO obtained using an identified index, and actually measured values of RFV.

FIGS. 35(A), 35(B) and 35(C) are graphs each showing a relationship between each of the first-order, second-order and third-order TFV given from RRO obtained using a fixed index fixed, and actually measured values of TFV; and FIGS. 35(D), 35(E) and 35(F) are graphs each showing a relationship between each of the first-order, second-order and third-order TFV given from RRO obtained using an identified index, and actually measured values of TFV.

FIG. 39(A) is a timing chart in which an amount of non-uniformity of a tire size at a low speed is measured; and FIG. 39(B) is a timing chart in which an amount of non-uniformity of a tire size at a low speed is measured.

BEST MODE FOR CARRYING OUT THE INVENTION

An embodiment of the present invention will be hereinafter described in detail with reference to the attached drawings. First, a measurement apparatus used in the present embodiment will be described.

Figure 1:
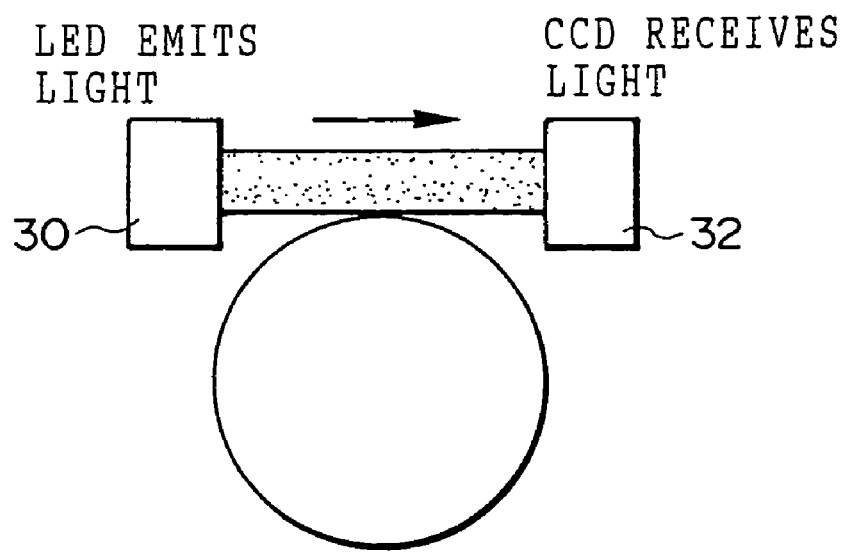
FIG. 1 is a schematic diagram of an RRO measurement apparatus.

In FIG. 1, an RRO measurement apparatus is shown in which radial run out (RRO) can be measured by reducing the influence of lug grooves. This RRO measurement apparatus is comprised of a light irradiation section 30 formed by a light emitting diode (LED) which irradiates light, and a light receiving section 32 formed by a charge coupled device (CCD) which receives light irradiated from the light irradiation section 30. The light irradiation section 30, the light receiving section 32, and a tire are arranged so that irradiated light rays are brought into contact with an outer periphery of a tire to be measured, and RRO is measured from a variation in the amount of light received by the light receiving section 32. As the RRO measurement apparatus, a sizer LS-7030 (trade name, manufactured by Keyence Corporation) can be used.

Figure 2:
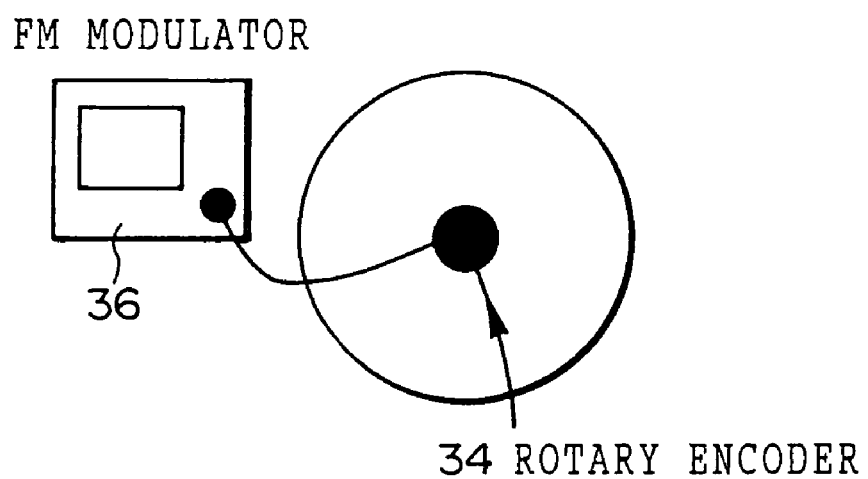
FIG. 2 is a schematic diagram of an AAV measurement apparatus.

In FIG. 2, a tire angle acceleration fluctuation (AAV) measurement apparatus is shown. This AAV measurement apparatus is comprised of a rotary encoder 34 mounted on a tire axis to generate a pulse signal in accordance with a rotation angle of a tire, and an FM modulator 36 which extracts, from the pulse signal, a frequency variation rate $FVR_R$ at the time of idling of a tire, and a frequency variation rate $FVR_N$ at the time of loading. As the rotary encoder, an encoder MEH-85-1024 (trade name, manufactured by Microtech Laboratory) can be used. As the FM modulator, a flutter analyzer Model 6110A (trade name, manufactured by ACT Electronics Corporation) can be used.

Figure 3:
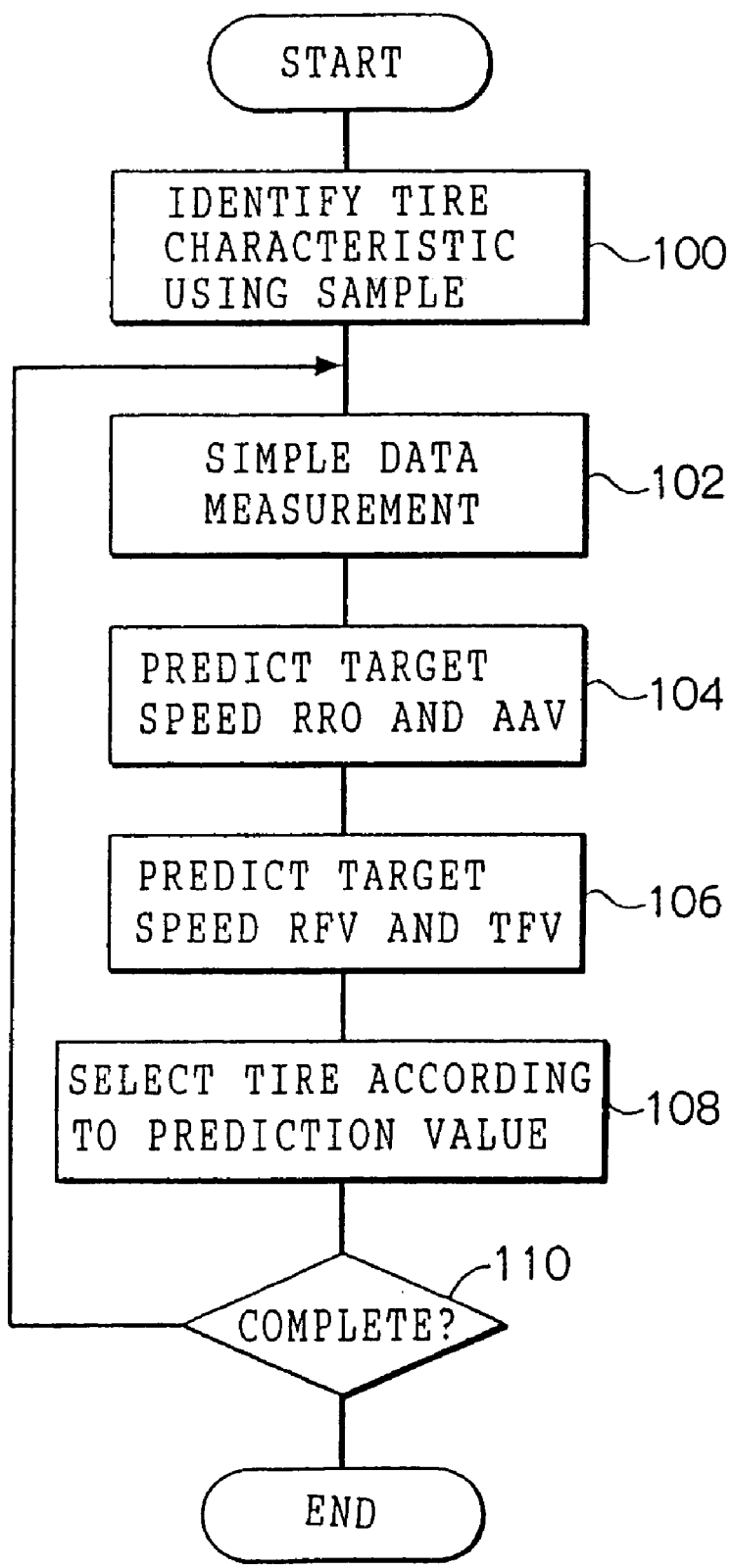
FIG. 3 is a flow chart of an embodiment of the present invention.

Next, a description will be given, with reference to the flow chart of FIG. 3, of an embodiment of a tire production method in which the high-speed RFV is predicted by applying the first invention, the high-speed TFV is predicted by applying the fourth invention, and manufactured tires are selected and separated based on predicted values of the high-speed RFV and the high-speed TFV, and RRO is corrected, if required, before the tires are shipped.

A natural angular frequency and an attenuation ratio of a tire each do not vary depending on each tire, and each depend on the type of a tire (size or specification). Therefore, in order to predict the high-speed RFV, the natural angular frequency and the attenuation ratio are predicted from characteristic values of a plurality of tires in the same lot and stored in a database. That is, in step 100, three or more sample tires are extracted from each lot. The RRO and RFV at the speed level of three or higher (1 to M) are measured, and a least-square method is used to predict the upper and lower and front and back natural angle frequency, attenuation ratio, upper and lower spring constant, and rolling radius coefficient so that a sum of squares of the first-order to N-th order components, $RFV_1$ to $RFV_N$, of RFV obtained from Fourier transformation, and the first-order to N-th order components, $RFV_1$ to $RFV_N$, of RFV calculated from the following expression becomes a minimum.

$$RFV_M = \{RFV_1/T_{1Z} + K_{st}(RRO_M - RRO_1)\}T_{MZ}$$

wherein M=1, 2, 3, . . . N, and $T_{1Z}$, $T_{MZ}$ are each represented by the following expressions.

$$T_{1Z} = \sqrt{\frac{1 + \{2\zeta_Z(nV_1/R_e\omega_{nz})\}^2}{\{1 - (nV_1/R_e\omega_{n2})^2\}^2 + \{2\zeta_z(nV_1/R_e\omega_{nz})\}^2}}$$

$$T_{MZ} = \sqrt{\frac{1 + \{2\zeta_Z(nV_M/R_e\omega_{nz})\}^2}{\{1 - \{nV_M/R_e\omega_{nz})^2\}^2 + \{2\zeta_z(nV_M/R_e\omega_{nz})\}^2}}$$

wherein V is speed, n is the order of Fourier transformation, ωnz is the natural angular frequency, Re is the rolling radius of a tire, Kst is the upper and lower spring constant, and ζz is the attenuation ratio.

Figure 4:
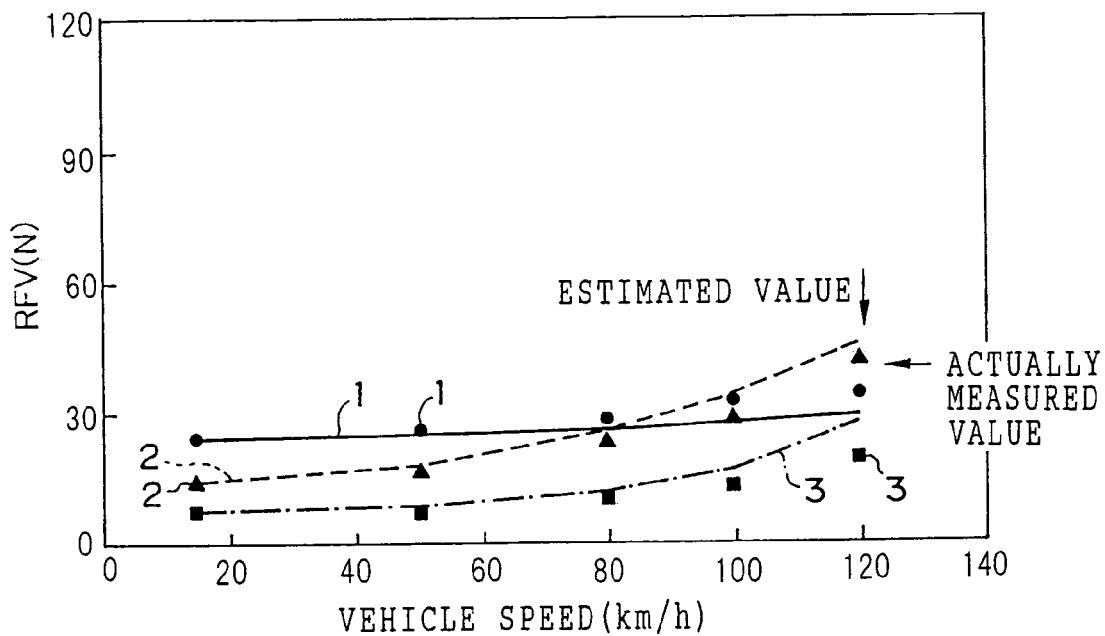
FIG. 4 is a diagram which shows actually measured values and predicted values of RFV.
Figure 5:
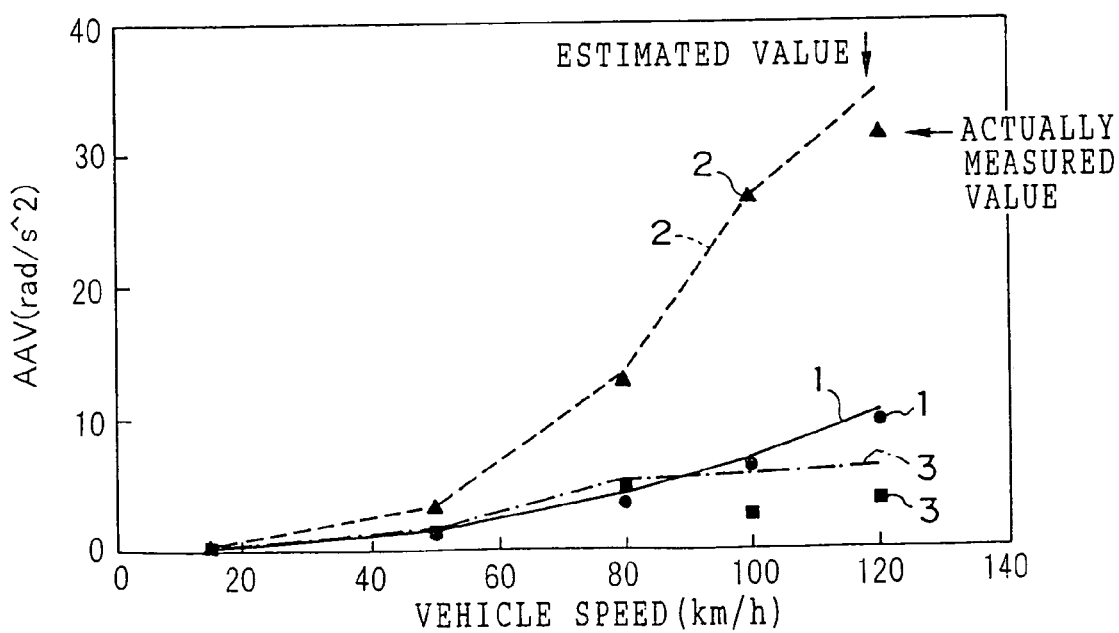
FIG. 5 is a diagram which shows actually measured values and predicted values of AAV.

FIG. 4 shows actually measured values and predicted values (estimated values) of RFV at the time when a tire of PSR205/65R15 used in the above-described least-square method is used. FIG. 5 shows actually measured values and predicted values (estimated values) of AAV used in the above-described least-square method at the time when the same tire as the one above is used.

Further, in order to predict the high-speed TFV, a product of coefficient $C_{TFV}$ and a moment of inertia of TFV, and the like are stored in the database. A product of coefficient $C_{TFV}$ and a moment of inertia of tangential force variation is predicted in such a manner that: three or more sample tires are extracted from each lot; an angular acceleration fluctuation and TFV at a high speed are measured; and the least-square method is used so that a sum of squares of the difference between the first-order to n-th order components of TFV obtained by Fourier transformation, and the first-order to n-th order components of TFV calculated from the following expression becomes a minimum.

$$TFV = C_{TFV} \frac{I_v \cdot AAV}{R_e}$$

Figure 6:
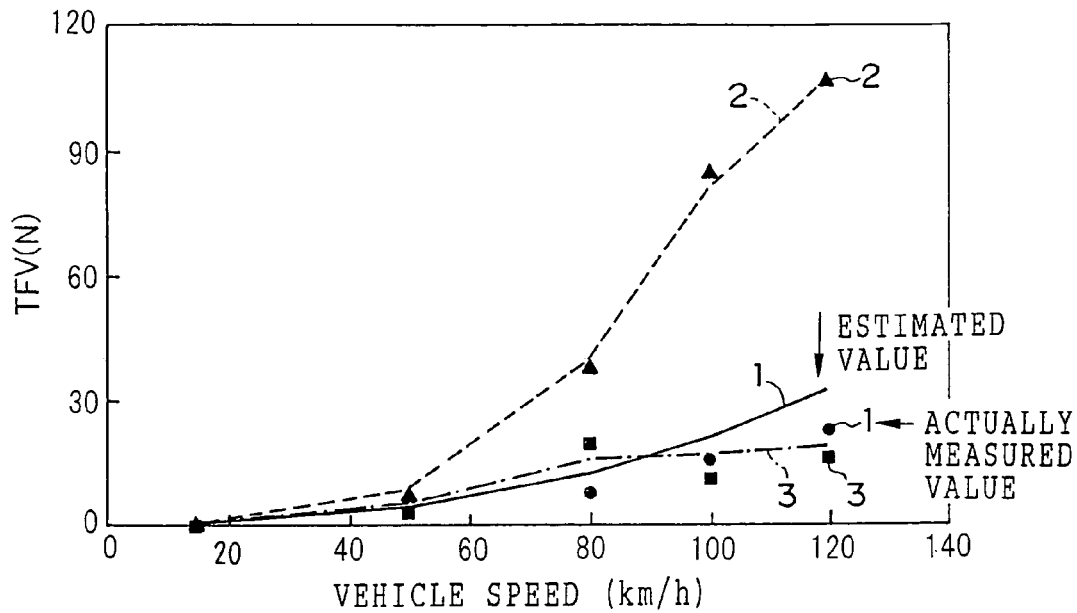
FIG. 6 is a diagram which shows actually measured values of TFV, and predicted values of TFV predicted from AAV.

FIG. 6 shows actually measured values of TFV used in the above-described least-square method, and predicted values (estimated values) of TFV predicted from AAV based on the above-described expression.

In step 102, radial run out $RRO_H$, $RRO_L$ at tire angular speed $\omega_H$, $\omega_L$ of two speed levels (high speed H and low speed L) at the time a tire is idling is measured using the RRO measurement apparatus shown in FIG. 1, and an actually measured value $AAV_L$ of angular acceleration fluctuation at a low speed is measured using the AAV measurement apparatus shown in FIG. 2.

In step 104, based on the actually measured values $RRO_H$, $RRO_L$ at a high speed and at a low speed, radial run out RROo at the target speed is predicted in accordance with the following expression. The radial run out RROo at the target speed may also be measured using the RRO measurement apparatus shown in FIG. 2.

$$RRO_0 = RRO_L + (RRO_H - RRO_L) \cdot \frac{\omega_0^2 - \omega_L^2}{\omega_H^2 - \omega_L^2}$$

wherein $\omega = V/R_e$.

The radial run out at the target speed may also be predicted by measuring radial run out at a tire angular speed of N+1 level or higher at the time the tire is idling or at the time the tire is rolling at a predetermined load (for example, 500 N) or less and using an N-order regression equation.

In step 104, based on the actually measured values $RRO_L$, $AAV_L$ of radial run out and angular acceleration fluctuation at a low speed, the radial run out RROo at the target speed Vo calculated as described above, the natural angular frequency $\omega nx$ measured as described above or transformed and calculated from a measurement result, the attenuation ratio $\zeta x$, and the coefficient of radial run out, angular acceleration fluctuation at the target speed is predicted in accordance with the following expression.

$$AAV_0 = \frac{nV_0^2}{R_e^2} \left[ \frac{AAV_L/T_{Lx}}{nV_L^2/R_e^2} - \frac{C_{RRO} \cdot (RRO_0 - RRO_L)}{R_e} \right] T_{OX}$$

wherein $T_{OX}$, $T_{LX}$ are transmission rates of displacement of a primary attenuation system at a target speed and at a low speed, respectively.

Figure 7:
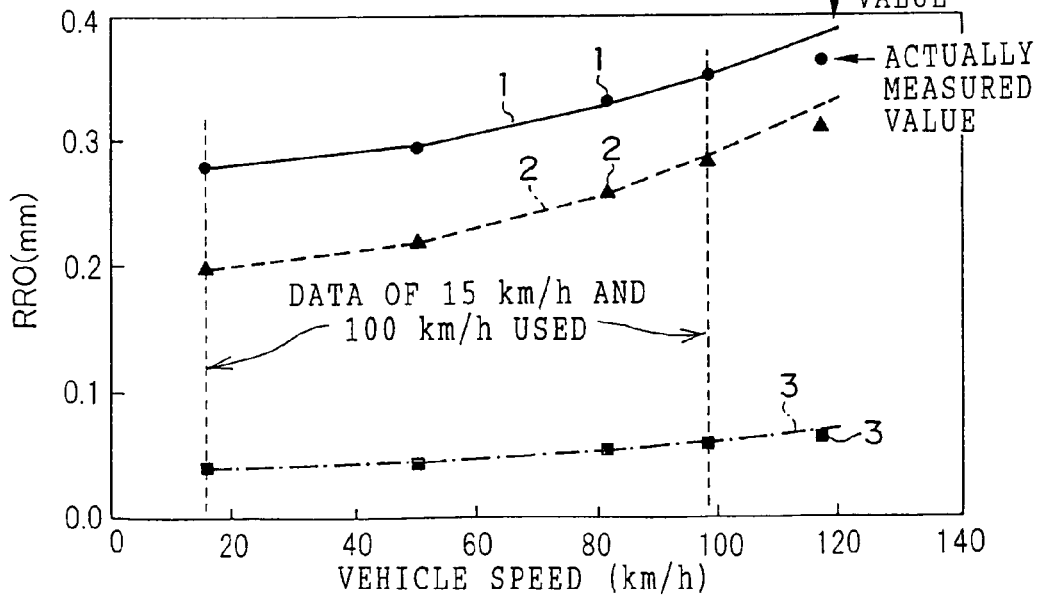
FIG. 7 is a diagram which shows actually measured values and predicted values of RRO.

FIG. 7 shows actually measured values $RRO_L$ and predicted values (estimated values) of RRO at a low speed (15 km/h) and at a high speed (100 km/h). FIG. 8 shows an actually measured value and a predicted value (estimated value) of AAV at a low speed (15 km/h).

In the same manner as in the above-described sixth invention, angular speed fluctuation at the target speed may also be predicted using the expression (8).

A uniformity value of a tire varies depending on each tire, even when the type of each tire is the same. Therefore, in step 106, the high-speed RFV and the low-speed RFV are predicted for each tire.

In the present embodiment, $RFV_O$ at the target speed is predicted in accordance with the following expression based on a result of Fourier transformation of radial run out $RRO_O$ at target speed $V_O$ predicted as described above, the upper and lower spring constant Kst measured or calculated by transformation from a measurement result, and the transmission rate $T_{OZ}$ of displacement of a primary attenuation system.

$$RFV_O = K_{st} \cdot RRO_O \cdot T_{OZ}$$

$RFV_O$ at the target speed may also be predicted based on the expression (5).

Further, when the high-speed TFV is to be predicted, based on the angular acceleration fluctuation $AAV_O$ at the target speed $V_O$ predicted as described above, and the product of coefficient $C_{TFV}$ stored in the database and moment of inertia Iy of TFV, TFV at the target speed and a predicted value TFVo are predicted in accordance with the following expression.

$$TFV_0 = C_{TFV} \cdot \frac{I_v \cdot AAV_0}{R_e}$$

Figure 10:
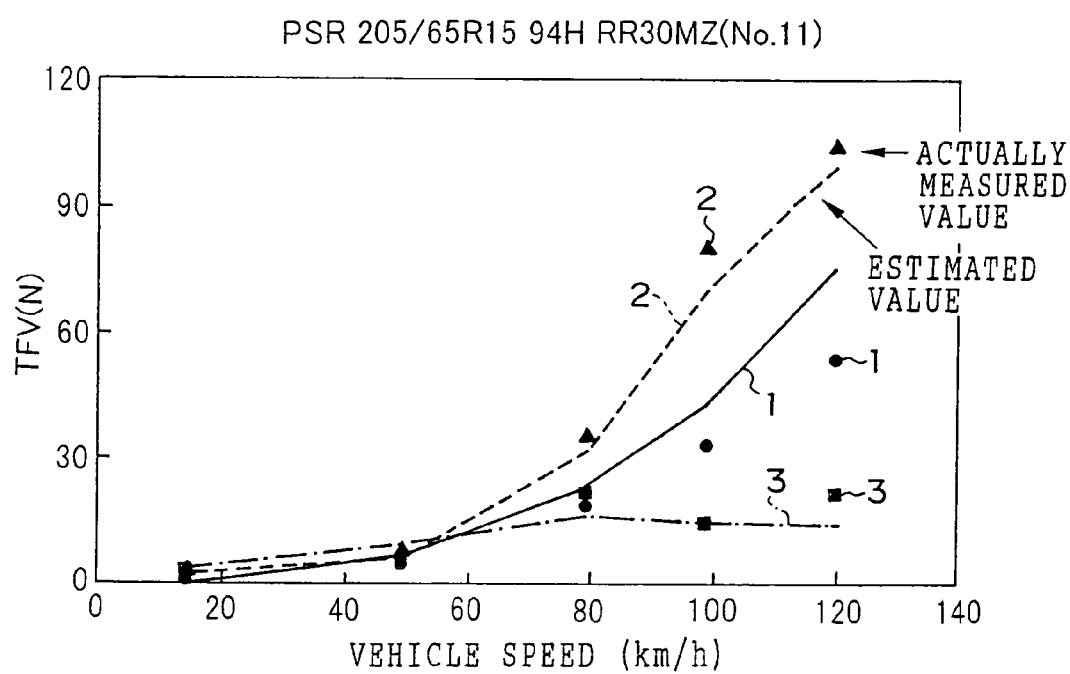
FIG. 10 is a diagram which shows predicted values and actually measured values of the first-order, second-order and third-order components of the predicted high-speed TFV.
Figure 11:
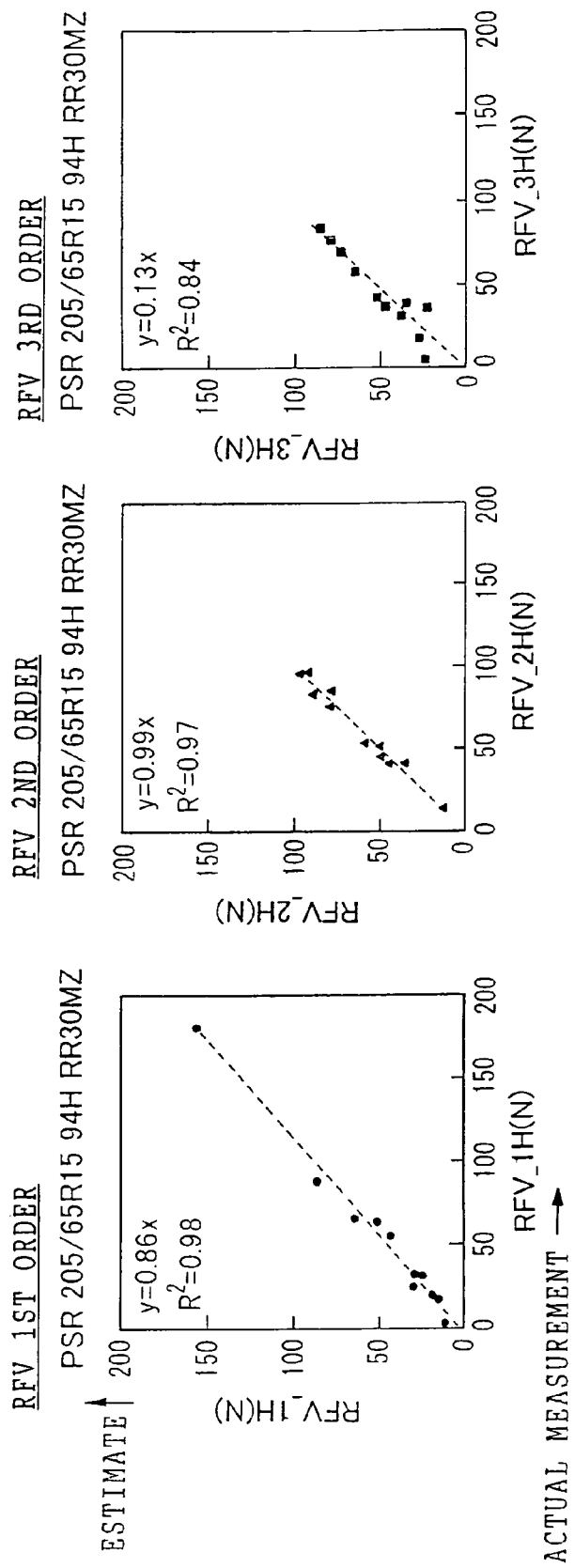
FIG. 11 is diagrams which each show a correlation between actually measured values and predicted values for each of the first-order, second-order and third-order components of RFV.
Figure 12:
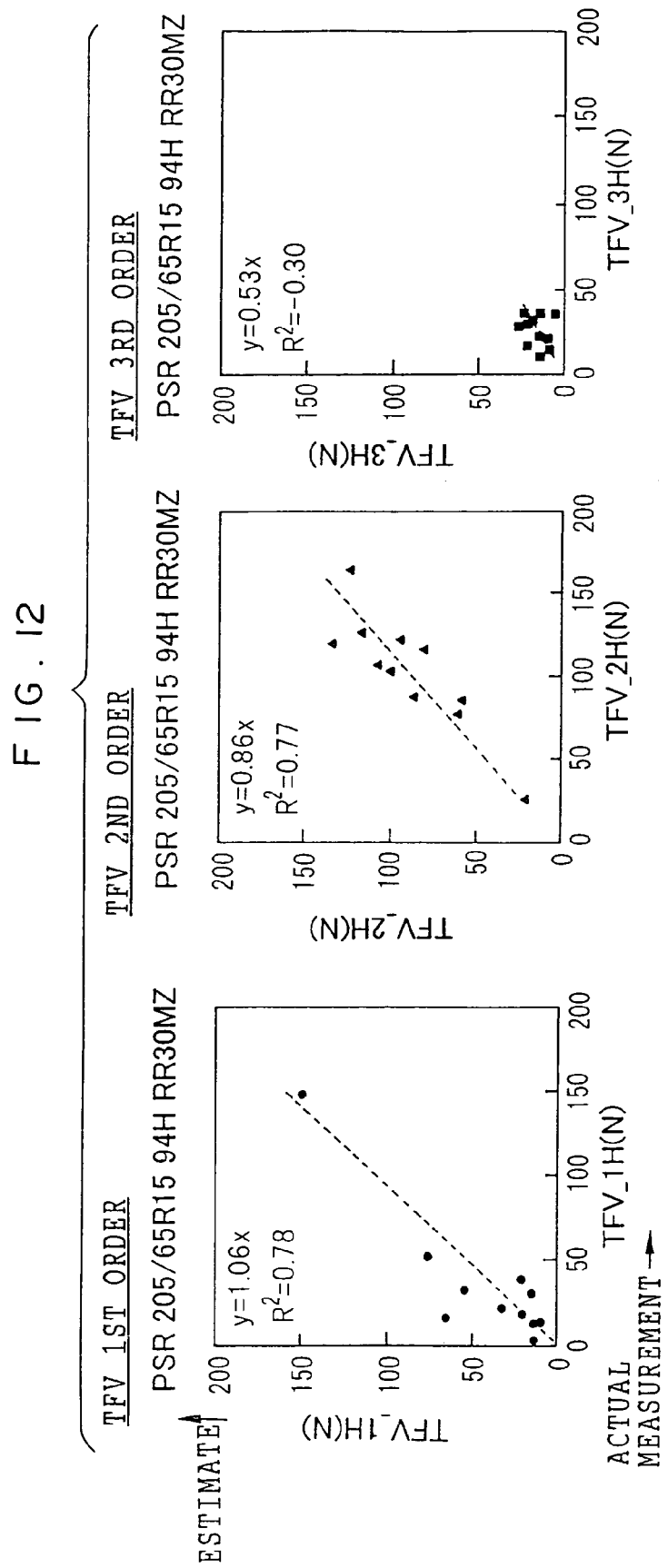
FIG. 12 is diagrams which each show a correlation between actually measured values and predicted values for each of the first-order, second-order and third-order components of TFV.
Figure 17:
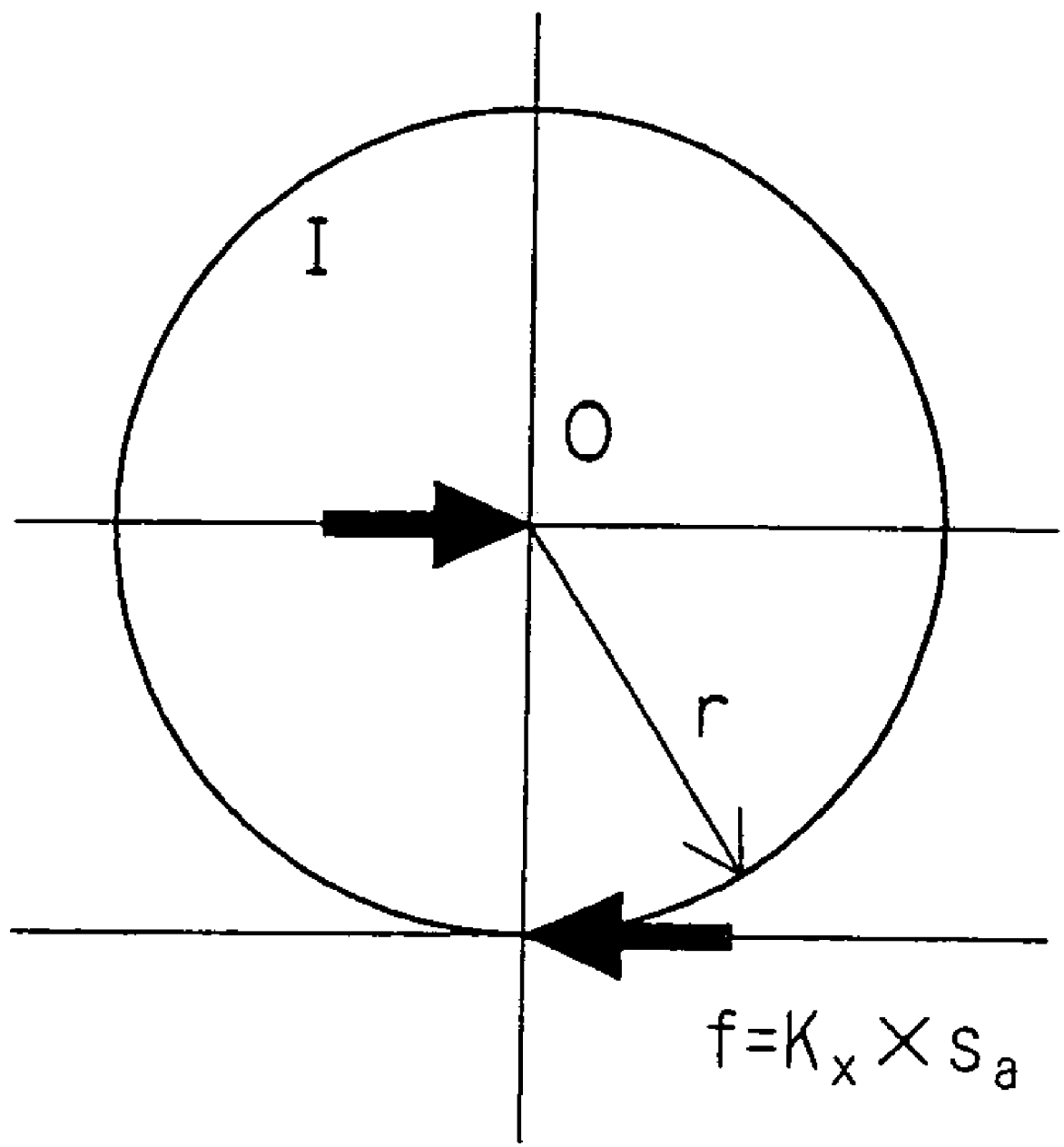
FIG. 17 is a diagram which shows a solid tire model having one degree of freedom.

FIG. 9 shows predicted values and actually measured values of each of the first-order to third-order components of the high-speed RFV predicted from the actually measured values of RFV at a low speed (15 km/h). FIG. 10 shows predicted values and actually measured values of each of the first-order to third-order components of the high-speed TFV. Further, FIG. 11 shows a correlation between the actually measured values and the predicted values of each of the first-order to third-order components of RFV. FIG. 12 shows a correlation between the actually measured values and the predicted values of each of the first-order to third-order components of TFV.

In the same manner as in the third invention, predicted value $TFV_O$ may also be predicted in accordance with the expression (6).

In step 108, the predicted target speed RFV and target speed TFV are each compared with a reference value, and a tire in which the target speed RFV and the target speed TFV are each greater than the reference value is selected. In the tire in which the target speed RFV and the target speed TFV are each greater than the reference value, for example, radial run out (RRO) thereof is corrected before shipment. A tire in which higher-order components of the target speed RFV and the target speed TFV are each smaller than the reference value is determined as that properly manufactured, and shipped without being corrected.

In step 110, it is determined whether the selection of tires has been completed or not. If the selection has been completed, this method is terminated.

The upper and lower natural angular frequency $\omega nz$ and the attenuation ratio $\zeta_z$ may be obtained from measurement values from the protrusion run-over testing machine shown in FIG. 13. The protrusion run-over testing machine is, as shown in FIG. 13, comprised of a drum 10 having a cleat 12 made of fiber reinforced plastic (FRP) mounted on the surface thereof, and a sensor 16 mounted at an end of a stand 14 designed therefor.

The sensor 16 includes an axial force sensor (a three-way axial force sensor) 16A formed by a load cell which detects the vertical axial force Fz of a tire, and a displacement sensor 16B formed by a laser displacement meter which detects displacement of a tire axis with respect to a drum surface.

The axial force sensor 16A and the displacement sensor 16B are each connected to a personal computer 20 which serves as a predicting apparatus to which a CRT 18 provided as a display device for displaying measured data and the like is connected.

When the vertical transfer characteristic of a tire at the time of rolling is to be measured, the tire is made to contact the drum 10 with a load being applied thereto, and input is applied to the tire axis in the vertical direction by rotating the drum. At this time, the vertical axial force Fz of the tire is measured by the axial force sensor 16A, and the vertical displacement X of the tire axis with respect to the drum surface is measured by the displacement sensor 16B.

In the personal computer 20, the transfer characteristic Fz/X of the vertical axial force Fz of the tire with respect to the vertical displacement X of the tire axis is calculated.

When the front and back transfer characteristic of the tire at the time of rolling is to be measured, the tire is made to contact the drum with a load being applied thereto in the protrusion run-over testing machine shown in FIG. 13, and input is applied to the tire in the longitudinal direction by rotating the drum. At this time, the fore and aft axial force Fx of the tire is measured by the axial force sensor 16A. Further, at this time, the vertical displacement X of the drum surface is measured by the displacement sensor 16B. Thus, the transfer characteristic Fx/X is predicted.

The vertical natural angular frequency and the attenuation ratio are predicted so that a sum of squares of the difference between the predicted result of the vertical transfer characteristic obtained as described above, and transfer characteristic $kz(\omega)$ obtained by the following expression becomes a minimum.

$$k_z(\omega) = K_{st} \cdot \sqrt{\frac{1 + \{2\zeta_z(\omega/\omega_{nz})\}^2}{\{1 - (\omega/\omega_{nz})^2\}^2 + \{2\zeta_z(\omega/\omega_{nz})\}^2}}$$

FIG. 14 shows actually measured values at the time of run-over of a cleat in the protrusion run-over testing machine, and natural frequency and attenuation ratio which are calculated by being transformed from the actually measured values based on the above-described expression. FIG. 15 shows natural frequency and attenuation ratio which are calculated by being transformed by the following expression.

$$k_{x(\omega)} = a + b(\omega/\omega_{nx})^2 \sqrt{\frac{1 + \{2\zeta_x(\omega/\omega_{nx})\}^2}{\{1 - (\omega/\omega_{nx})^2\}^2 + \{2\zeta_x(\omega/\omega_{nx})\}^2}}$$

wherein a and b are coefficients.

Although accuracy of prediction becomes worse, the target speed RFV and the target speed TFV can be also predicted only from the RRO at the time of idling of the tire.

As described above, the present embodiment has an effect in that, by measuring low-speed RRO and AAV, and RRO at the time of idling (two speed levels) using a simple method to predict the target speed TFV and the target speed TFV, selection of tires according to the high-speed RFV and the high-speed TFV becomes possible with lower investments in equipment compared with a case in which a high-speed uniformity testing machine is introduced.

In the foregoing, the case in which the high-speed RRO is measured was described. However, as described above, the high-speed RRO may be predicted from the low-speed RRO. FIG. 16 shows, by comparison, estimated results of the first-order to third-order components of RRO in the range of speed up to 140 km/h and actually measured results of the first-order to third-order components of RRO, using data at the speeds of 30 km/h, 50 km/h, and 70 km/h. As can be seen from this diagram, RRO at the speed of 120 km/h can be obtained, with the maximum error of 0.02 mm or thereabouts, from the data obtained in a low speed range to the speed of 30 km/h.

Next, a second embodiment of the present invention will be described in detail. As described in the expressions (9) and (16) above, when radial force variation (RFV) at a target speed and tangential force variation (TFV) at a target speed are to be predicted, radial run out (RRO) of a tire tread portion at the target speed, and RRO of the tire tread portion at the time of measuring RFV at a low speed and AAV at a low speed are required.

In this embodiment, in order to prevent the effect of backlash of a tire bearing, and the effect of slight vibration of the reference plane of the rim to a tire bearing on the prediction accuracy of RFV and TFV, a predicted value of RRO of a tire single unit at the target speed is used as RRO of a tire tread portion at the target speed. This predicted value is given by the above-described expression (2).

Further, as RRO of the tire tread portion at the time of measuring the RFV at a low speed and measuring the AAV at a low speed, a value is used which is obtained by adding radial run out of a hub portion, that is, the concentric circle portion of the rim, which is measured at the time of measurement of the RFV and measurement of the AAV to RRO of the tire single unit at a low speed.

First, the measurement apparatus used in the present embodiment is the same as those used in the above-described first embodiment (see FIGS. 1 and 2), and therefore, a description thereof will be omitted. In the AAV measurement apparatus shown in FIG. 2, AAV is measured from frequency variation rate $FVR_R$ and frequency variation rate $FVR_N$.

Figure 18:
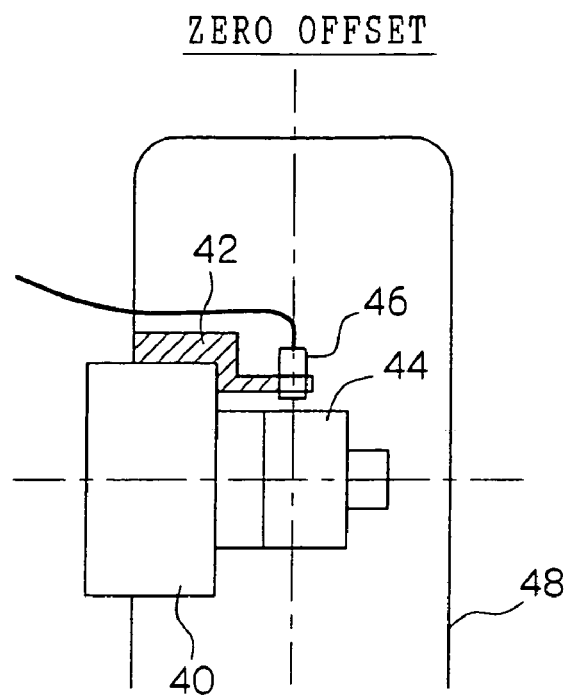
FIG. 18 is a schematic diagram of a measurement apparatus for measuring RRO of a concentric-circle portion of a rim.

FIG. 18 shows a measurement apparatus for measuring RRO of a concentric circle portion of the rim. A displacement sensor 46 is mounted in a tire bearing fixing portion 40 via a sensor-mounting stay 42. The displacement sensor 46 measures displacement of a zero offset portion to an outer peripheral surface of a hub (that is, a surface on which a rim-fitted tire is mounted) 44. Reference numeral 48 designates a tire.

This measurement apparatus is used to measure the displacement of the zero offset portion of the hub which is the concentric circle portion of the rim, thereby making it possible to measure RRO of the concentric circle portion of the rim.

Figure 19:
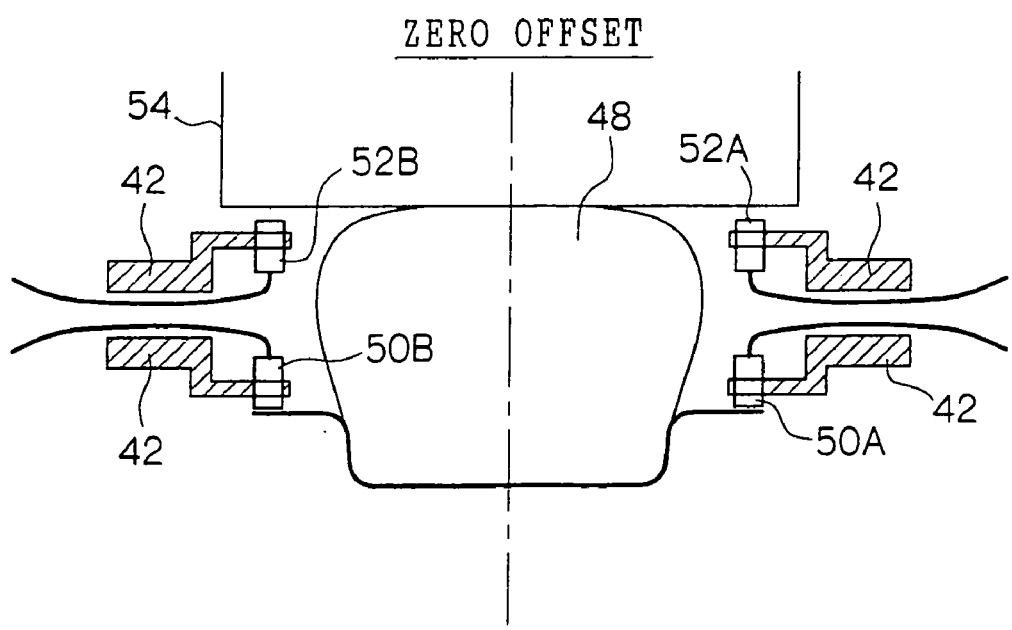
FIG. 19 is a schematic diagram of a measurement apparatus for measuring both RRO of a concentric-circle portion of a rim and RRO of a drum.

FIG. 19 shows a measurement apparatus which measures both RRO of the concentric circle portion of the rim and RRO of the drum. This measurement apparatus is equipped with a pair of displacement sensors 50A and 50B for a rim, which measure the displacement of the concentric circle portion of the rim from the reference position, and a pair of displacement sensors 52A and 52B for a drum, which measure the displacement of the concentric circle portion of drum from the reference position. These displacement sensors 50A, 50B, 52A and 52B are each fixed via the mounting stay 42 to a stationary portion of the measurement apparatus.

Further, this measurement apparatus is provided with a drum 54 which is made to contact the tire to measure RRO and the like.

The displacement sensors 50A and 50B for a rim are fixed so as to measure respective displacement of symmetric positions of a rim flange with the zero offset portion interposed therebetween. The displacement sensors 52A and 52B for a drum are fixed so as to measure positions, respectively, opposite to those which are measured by the displacement sensors for a rim with the zero offset portion interposed therebetween.

According to this measurement apparatus, the displacement of the zero offset portion of the concentric circle portion of the rim, that is, RRO of the concentric circle portion of the rim can be calculated by averaging displacement measured by the displacement sensors for a rim, and the displacement of the zero offset portion of the concentric circle portion of drum, that is, RRO of the concentric circle portion of the rim can be calculated by averaging the displacement measured by the displacement sensors for a drum.

Figure 20:
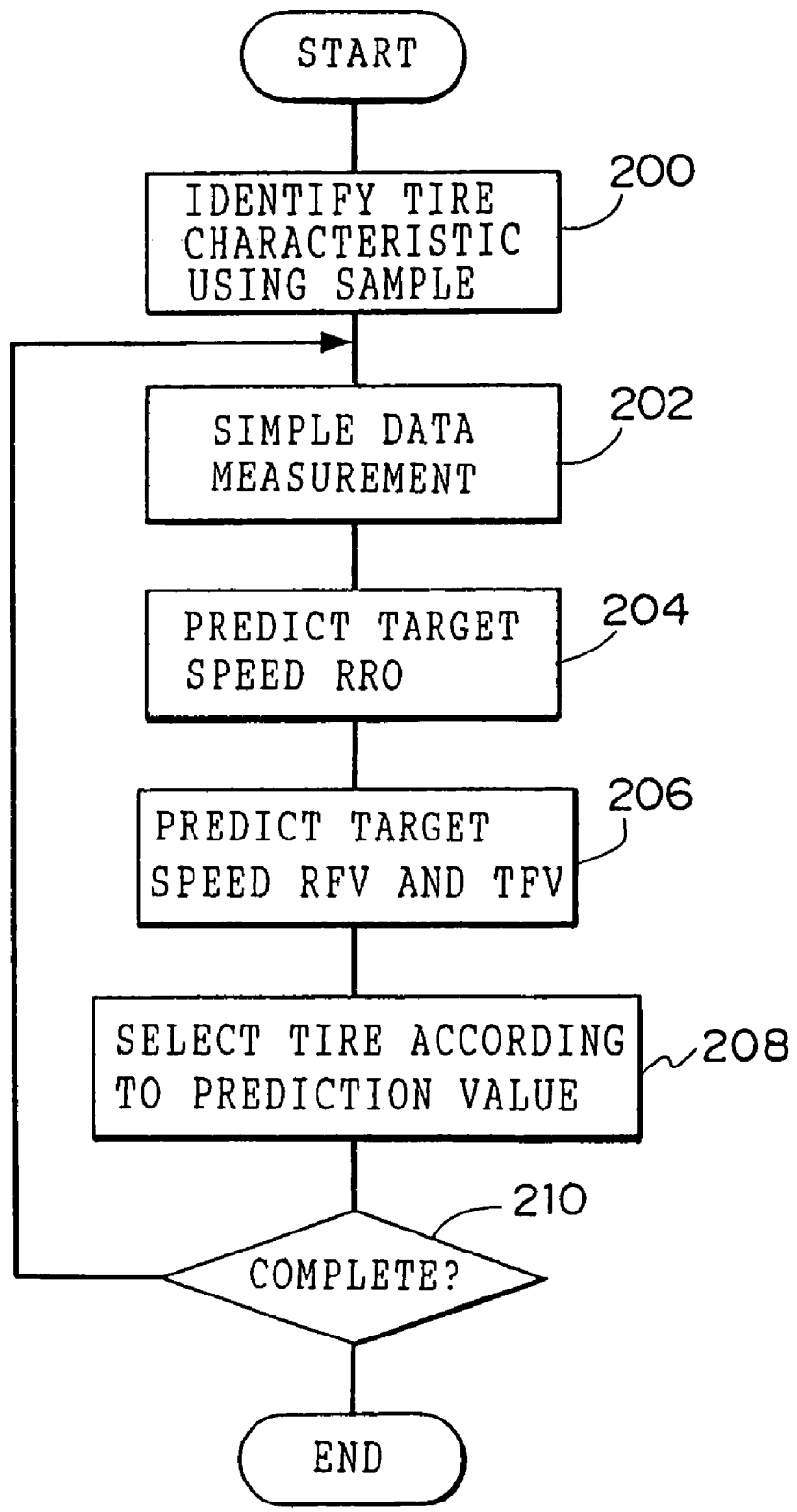
FIG. 20 is a flow chart which shows a tire production method in which based on predicted values of high-speed RFV and high-speed TFV, manufactured tires are selected and separated, and RRO of these tires is corrected, if required, before shipment of the tires.

Next, a description will be given of an embodiment of a tire production method with reference to the flow chart of FIG. 20, in which target speed RFV and target speed TFV are predicted, and manufactured tires are selected and separated based on predicted values of the target speed RFV and the target speed TFV, and RRO is corrected, if required, before shipment of the tires.

Each of various coefficients such as natural angular frequency, attenuation ratio, upper and lower spring constant, and rolling radius of a rim-fitted tire does not vary depending on each rim-fitted tire, and varies depending on the type (size or specification) of rim-fitted tire. These coefficients do not vary for the same type of rim-fitted tire. Therefore, in order to predict the target speed RFV, the natural angular frequency, the attenuation ratio and the like are predicted from characteristic values of a plurality of rim-fitted tires in the same lot, and are stored in the database.

In other words, in step 200, three or more sample tires are extracted from the same lot, and RRO and RFV at the speed level of three or more (1 to M) are measured at the same time. The least-square method is used to predict the various coefficients such as the upper and lower and front and back natural angular frequency, the attenuation ratio, the upper and lower spring constant, and rolling radius so that a sum of squares of the difference between the first-order to N-order components, $RFV_1$ to $RFV_N$, of RFV obtained by Fourier transformation, and the first-order to N-order components, $RFV_1$ to $RFV_N$, of RFV calculated from the following expression becomes minimum. The predicted coefficients are stored in the database.

$$RFV_M = \{RFV_1/T_{1Z} + K_{st}(RRO_M - RRO_1)\}T_{MZ} \tag{23}$$

wherein M is 1, 2, 3, ... N, and $T_{1Z}$ and $TM_Z$ are represented by the following expressions, respectively.

$$T_{1Z} = \sqrt{\frac{1 + \{2\zeta_Z(nV_1/R_e\omega_{nz})\}^2}{\{1 - (nV_1/R_e\omega_{nz})^2\}^2 + \{2\zeta_Z(nV_1/R_e\omega_{nz})\}^2}} \tag{24}$$

$$T_{MZ} = \sqrt{\frac{1 + \{2\zeta_Z(nV_M/R_e\omega_{nz})\}^2}{\{1 - (nV_M/R_e\omega_{nz})^2\}^2 + \{2\zeta_Z(nV_M/R_e\omega_{nz})\}^2}}$$

wherein V is speed, n is the order of Fourier transformation, ωnz is the natural angular frequency, Re is the rolling radius of a tire, Kst is the upper and lower spring constant, and ζz is the attenuation ratio.

A uniformity value of a tire varies depending on each tire, irrespective of the same type of rim-fitted tires. In step 202, simple data measurement is carried out to measure RFV at a low speed of a rim-fitted tire to be measured, and RRO of a concentric circle portion of a rim at the same time, and also measure RRO of the tire tread and of the concentric circle portion of the rim each at a low speed and at a high speed. The RFV at a low speed can be measured using a conventionally-known RFV measurement apparatus, and the RRO of the concentric circle portion of the rim can be measured using the measurement apparatus shown in FIG. 18 or FIG. 19.

Further, the above-described respective RRO of the tire tread and the concentric circle portion of the rim each at a low speed and at a high speed can be obtained by measuring, with the RRO measurement apparatus shown in FIG. 2, radial run out $TreRRO_H$, $TreRRO_L$ of the tread and radial run out $RimRRO_H$, $RimRRO_L$ of the concentric circle portion of the rim, respectively at the tire angular speed $\omega_H$, $\omega_L$ of the two speed levels (the high speed H and the low speed L) at the time of idling.

Moreover, an actually measured value $AAV_L$ of angular acceleration fluctuation at a low speed is measured using the AAV measurement apparatus shown in FIG. 2. At this time, as well as the AAV at a low speed is measured, RRO at the concentric circle portion of the rim is measured using the measurement apparatus shown in FIG. 18 or FIG. 19.

In the next step 204, based on the radial run out $TreRRO_H$, $TreRRO_L$ of the tread and the radial run out $RimRRO_H$, $RimRRO_L$ of the concentric circle portion of the rim, respectively at the tire angular speed $\omega_H$, $\omega_L$, which are measured in step 202, radial run out $RRO_O$ of a tire single unit at the target speed is measured in accordance with the following expression.

$$RRO_0 = RRO_L + (RRO_H - RRO_L) \times \left(\frac{\omega_0^2 - \omega_L^2}{\omega_H^2 - \omega_L^2}\right) \tag{25}$$

wherein $RRO_L = TreRRO_L - RimRRO_L$ $RRO_H = TreRRO_H - RimRRO_H \tag{26}$

Figure 21A:
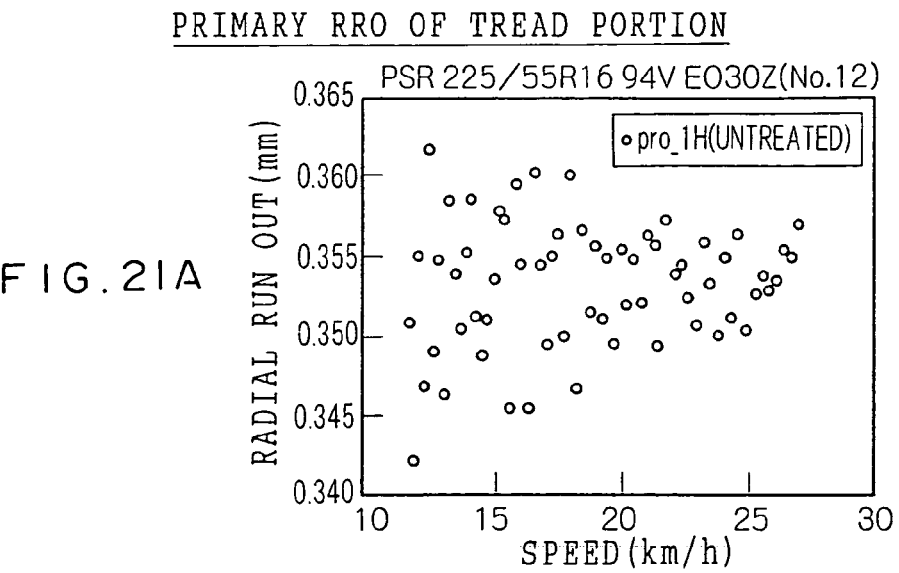
FIGS. 21(A), 21(B) and 21(C) are diagrams.
Figure 21B:
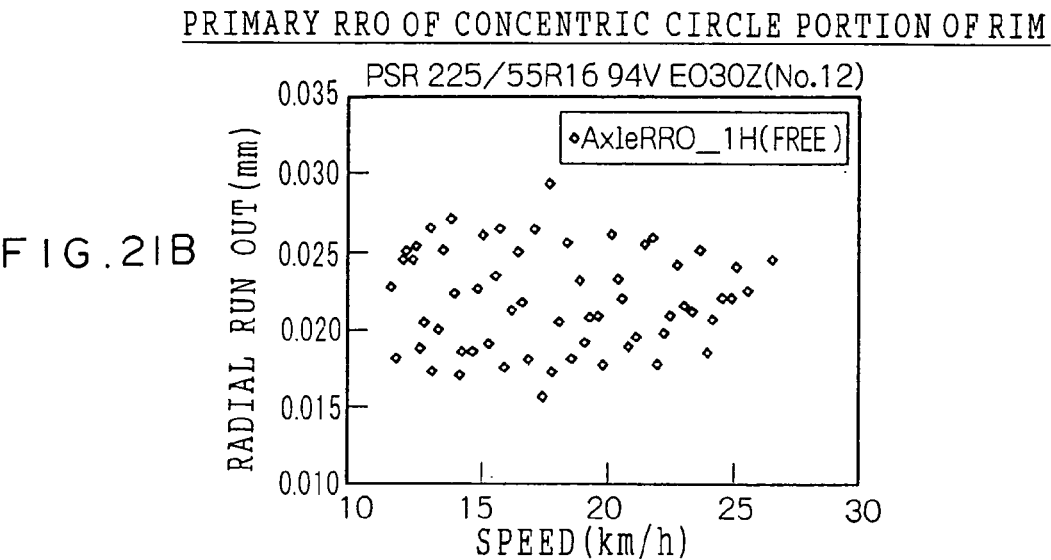
Figure 21C:
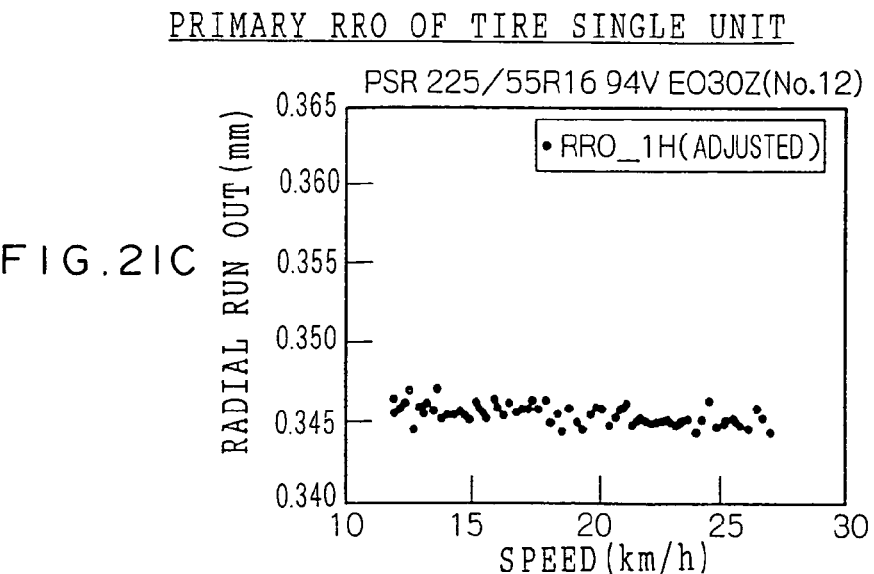

FIG. 21(A) shows primary radial run out of the tire tread. FIG. 21(B) shows primary radial run out of the concentric circle portion of the rim. FIG. 21(C) shows primary radial run out of the tire single unit obtained by subtracting the primary radial run out of the concentric circle portion of the rim from the primary radial run out of the tire tread. As can be seen from these drawings, the primary radial run out of the tire single unit obtained by the above-described subtraction is obtained so that fluctuation thereof becomes diminished.

Figure 24:
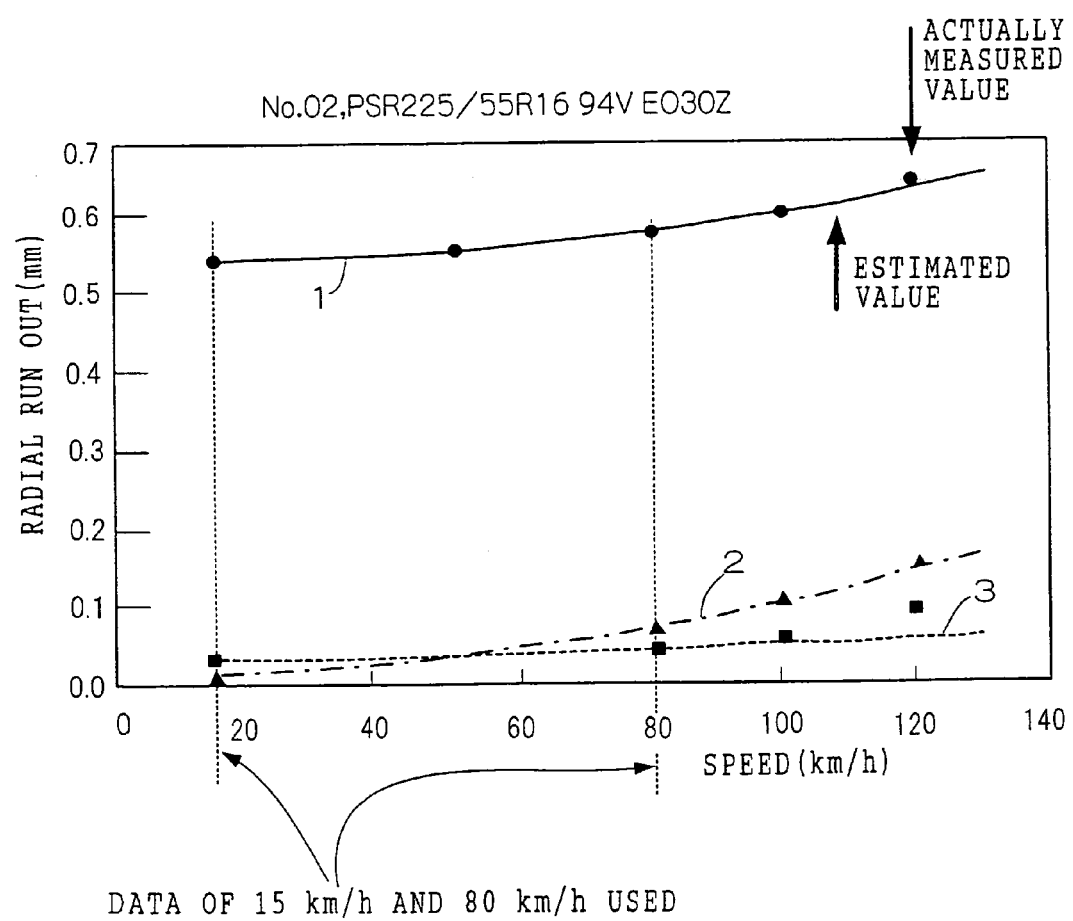
FIG. 24 is a diagram which shows predicted values of radial run out (RROo) of a tire single unit at a high speed, which values are predicted using an actually measured value at the speed of 15 km/h and an actually measured value at the speed of 80 km/h, and actually measured values of radial run out (RRO) of a tire single unit.

Further, in FIG. 24, predicted values of radial run out RROo of the tire single unit at the target speed, which values are predicted using an actually measured value of 15 km/h and an actually measured value of 80 km/h, are indicated by a solid line, and actually measured values of radial run out RRO of the tire single unit (in the speed range of 15, 50, 80, 100 and 120 km/h) are indicated by dots. As can be seen from this drawing, a tendency of radial run out RRO of the tire single unit at the speed of 80 km/h or higher to increase can be predicted even from two measurement data at the speed of 80 km/h or less.

Figure 22A:
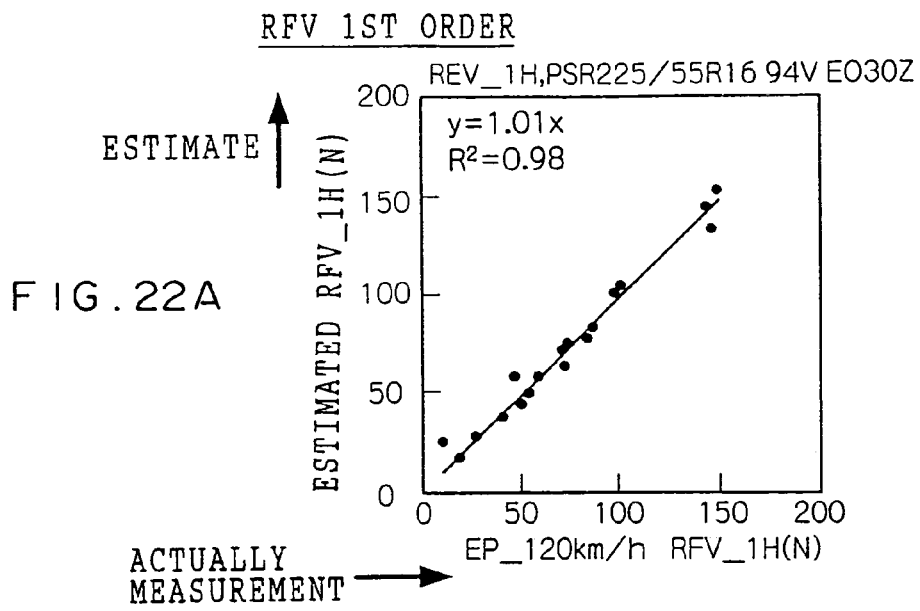
FIGS. 22(A), 22(B) and 22(C) are diagrams which each show a correlation between actually measured values of each of the first-order, second-order and third-order components of RFV at a high speed (120 km/h), and predicted values of each of the first-order, second-order and third-order components of the high-speed RFV.
Figure 22B:
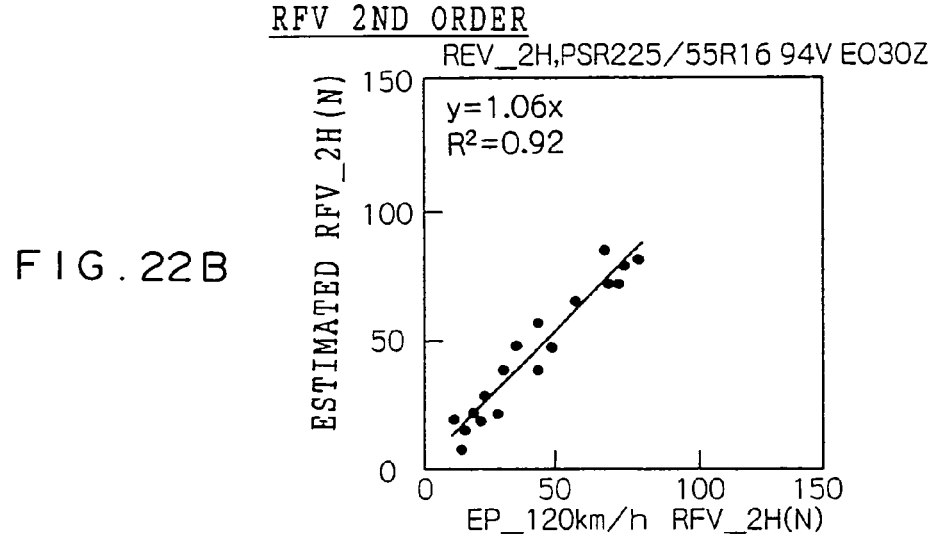
Figure 22C:
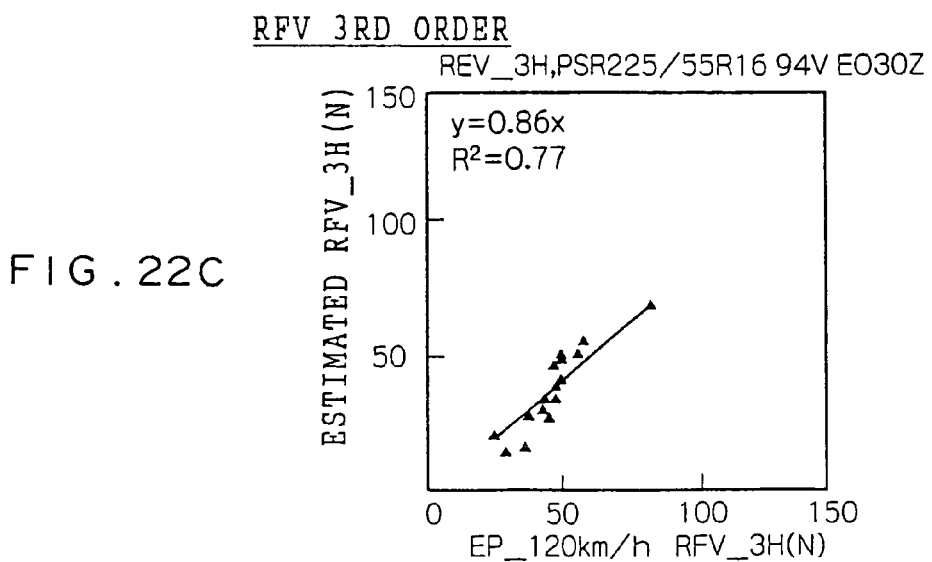
Figure 23A:
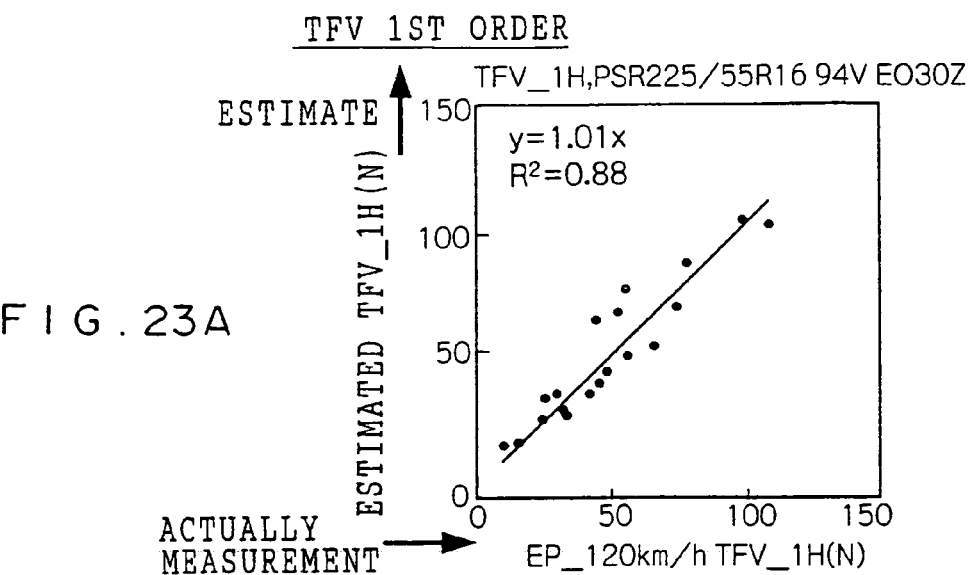
FIGS. 23(A), 23(B) and 23(C) are diagrams which each show a correlation between actually measured values of each of the first-order, second-order and third-order components of TFV at a high speed (120 km/h), and predicted values of each of the first-order, second-order and third-order components of the high-speed TFV.
Figure 23B:
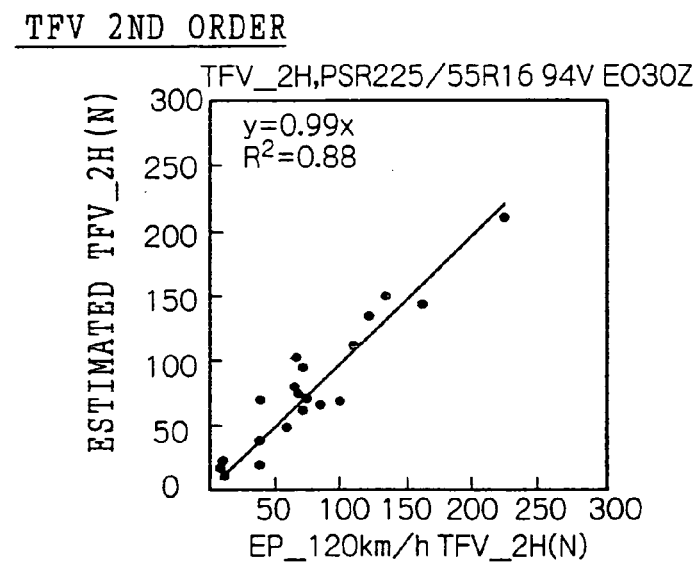
Figure 23C:
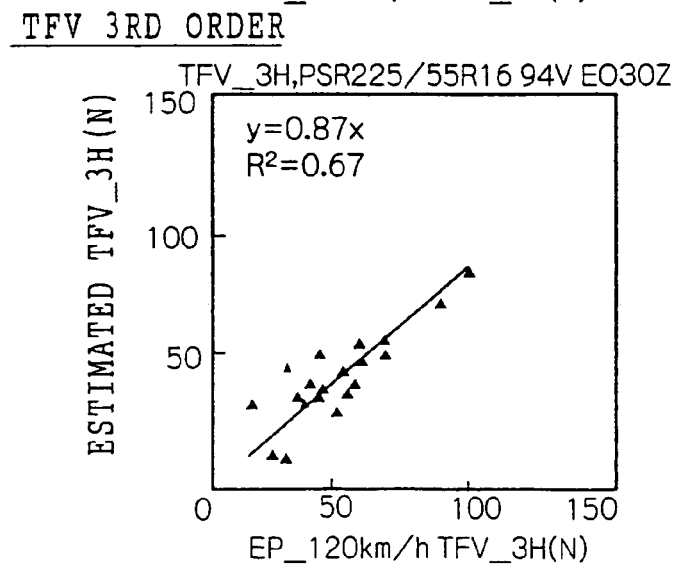

In step 206, the high-speed RFV is predicted in accordance with the above-described expression (9), and the high-speed TFV is predicted for each rim-fitted tire in accordance with the above-described expression (16). FIGS. 22(A) to 22(C) each show a correlation between actually measured values of each of the first-order to third-order components of RFV at a high speed (120 km/h), and predicted values of each of the first-order to third-order components of the high-speed RFV. FIGS. 23(A) to 23(C) each show a correlation between actually measured values of each of the first-order to third-order components of TFV at a high speed (120 km/h), and predicted values of each of the first-order to third-order components of the high-speed RFV.

In the step 208, the predicted target speed RFV and target speed TFV are each compared with a reference value, and rim-fitted tires in which the target speed RFV and the target speed TFV are each greater than the reference value is selected. In the rim-fitted tires in which the target speed RFV and the target speed TFV are each greater than the reference value, for example, the radial run out (RRO) thereof is corrected before shipment thereof. Rim-fitted tires in which higher-order components of the target speed RFV and the target speed TFV are greater than the reference value are considered as those properly manufactured, and are shipped without being corrected.

In step 210, it is determined whether or not the selection of tires has been completed. When the selection has been completed, this method is terminated.

Figure 25:
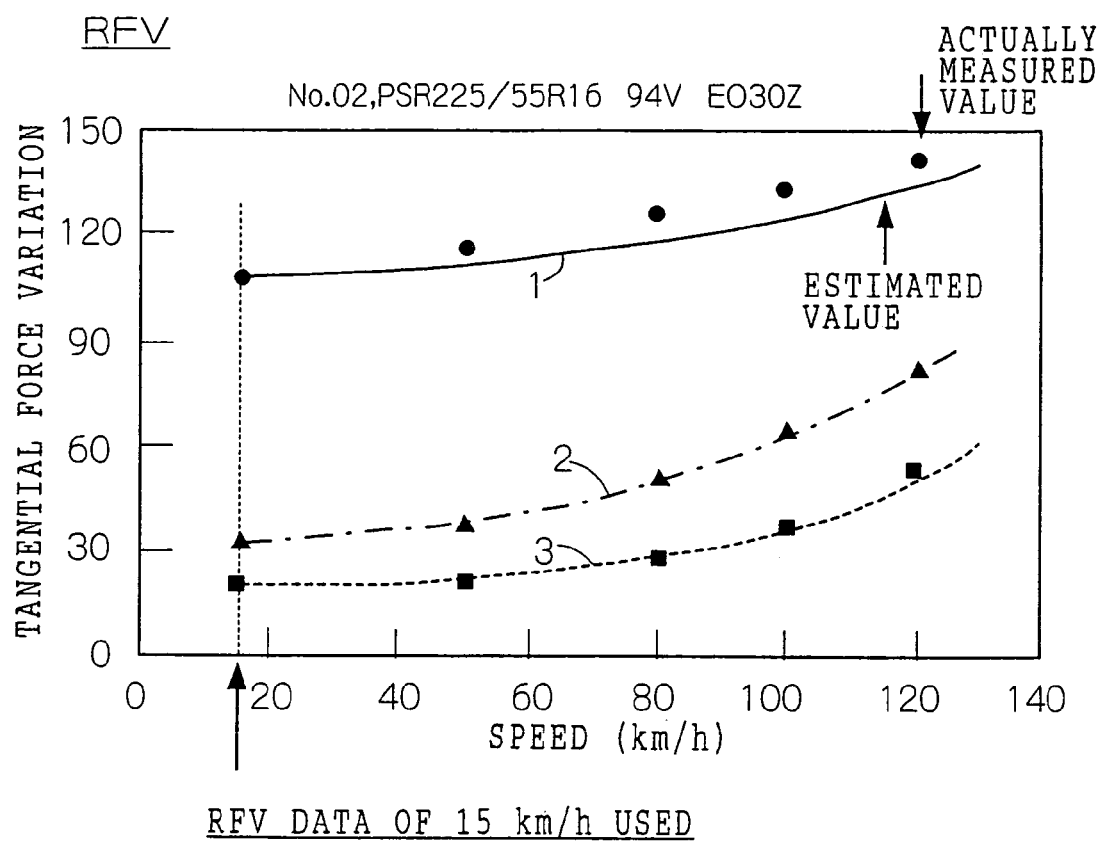
FIG. 25 is a diagram which shows actually measured values and predicted values of RFV.
Figure 26:
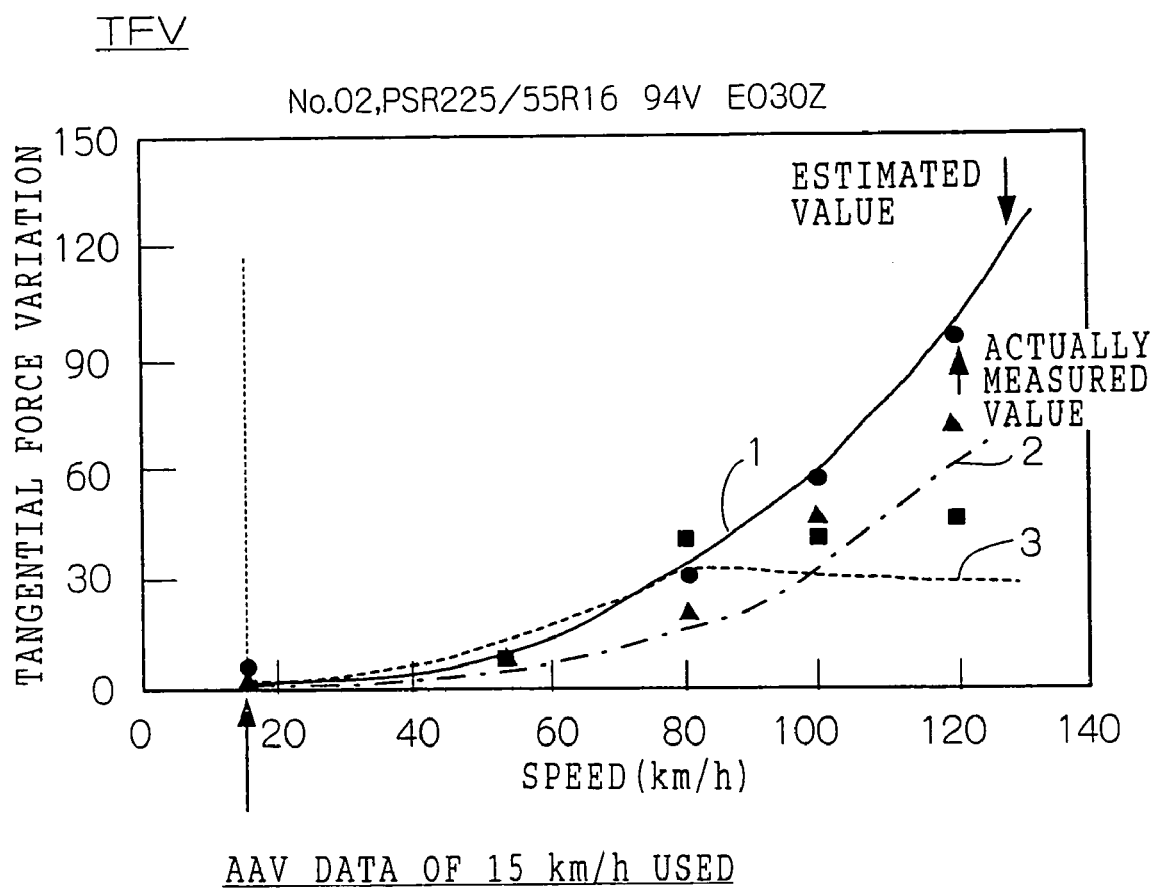
FIG. 26 is a diagram which shows actually measured values and predicted values of TFV.

In FIGS. 25 and 26, actually measured values of RFV and TFV (at the speed of 15, 50, 80, 100, and 120 km/h) are represented by dots, and predicted values of RFV and TFV (obtained using RRO of the tire single unit at a high speed, and RFV and AAV at the speed of 15 km/h, which are obtained in the foregoing) are represented by lines.

As can be seen from the drawings, the tendency of increase in the RFV and the TFV at the speed of 50 km/h or higher can be predicted even from one point of measurement data at the speed of 15 km/h or less.

In the present embodiment as well, the vertical natural angular frequency $\omega nz$ and the attenuation ratio $\zeta Z$ may also be, as described above, obtained from the measured values by the protrusion run-over testing machine (see FIG. 13) in the above-described first embodiment.

As described above, the present embodiment has an effect in that RRO of the concentric circle portion of the rim and RRO of the tire tread portion are measured at the same time, and the RRO of the concentric circle portion of the rim is subtracted from RRO of the tire tread portion to thereby predict RRO of the tire single unit at a high speed, and the predicted RRO of the tire single unit at a high speed is used to predict RFV and TFV at a high speed, thereby making it possible to prevent the effect of backlash of a tire bearing.

Further, as the RRO at the time of measurement of the low speed RFV and the low speed AAV, RFV and TFV of a tire single unit at a high speed are predicted using the predicted RRO of the tire single unit at a high speed, thereby making it possible to reduce the effect caused by deterioration of the rim mounting accuracy.

Still further, the RRO of the tire tread at the time of measurement of the low speed RFV and the low speed AAV is corrected in consideration of RRO of a drum which is made to contact a tire at the time of measurement of RFV, and the like, thereby making it possible to more accurately predict the high speed RFV and the high speed TFV.

Additionally, the effect can be obtained in that, in consideration of rotational irregularity which is caused by rim-fitted tires being accelerated and decelerated via driving stiffness from the road surface, if angular acceleration fluctuation, which is a principal factor of TFV generated at a high speed, is corrected by newly providing a term of driving stiffness, the difference between a predicted value of the high speed TFV and an actually measured value thereof can be reduced using a simple method while reducing the number of parameters.

Next, various modified examples of the first and second embodiments will be described. These modified examples each have the substantially same structure as that of the first and second embodiments, and therefore, descriptions of the same parts will be omitted, and only different parts will be described.

FIRST MODIFIED EXAMPLE
(CORRESPONDING TO THE FIRST ASPECT OF THE TENTH INVENTION)

Figure 27:
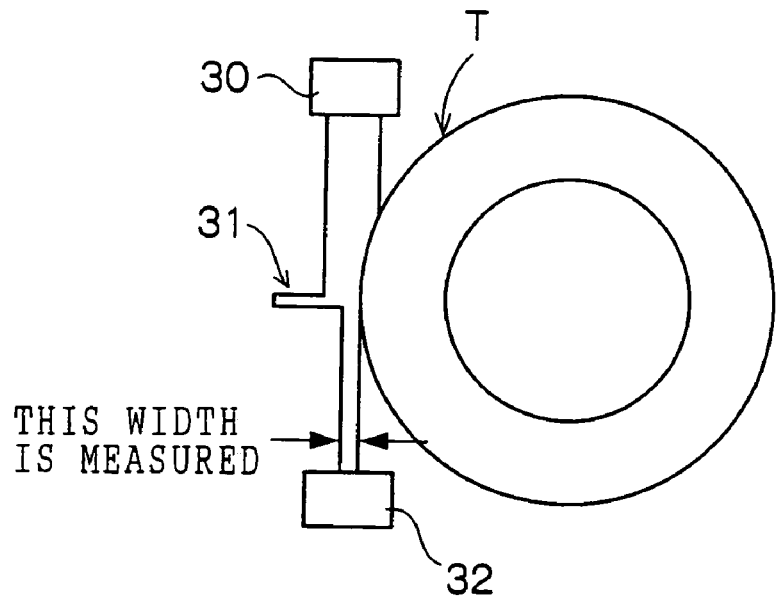
FIG. 27 is a schematic diagram showing an RRO measurement apparatus according to a first modified example.

As shown in FIG. 27, an RRO measurement apparatus according to this modified example includes a light irradiation section 30 formed by light emitting diodes (LED) which serve as light emitting means to irradiate light and located so that emitted light is made to contact an outer periphery of a tire disposed in a rotatable manner, and a light receiving section 32 formed by a charge coupled device (CCD) which serves as light receiving means for receiving light irradiated from the light irradiation section 30. This structure of the apparatus is the same as that of the RRO measurement apparatus (see FIG. 1). The RRO measurement apparatus according to this modified example also includes a reference edge 31 disposed fixedly between the light irradiation section 30 and the light receiving section 32 and formed by a flat plate or the like, which serves as interrupting means for cutting off a part of light irradiated from the light irradiation section 30.

This modified example is provided so as to correct swinging caused by rotation of a tire at positions where the light irradiation section 30 and the light receiving section 32 are disposed. That is, even if the light irradiation section 30 and the light receiving section 32 swing, the reference edge 31 is disposed fixedly between the light irradiation section 30 and the light receiving section 32, and the light receiving section 32 receives light which has been interrupted by the reference edge 31. As a result, fluctuation of received light is almost caused by RRO of the tire.

Accordingly, the RRO can be measured with a higher degree of accuracy.

SECOND MODIFIED EXAMPLE
(CORRESPONDING TO THE SECOND ASPECT OF THE TENTH INVENTION)

Figure 28:
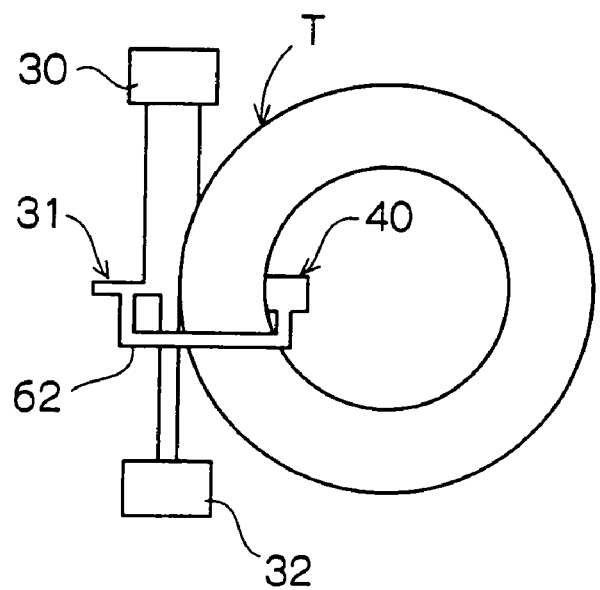
FIG. 28 is a schematic diagram showing an RRO measurement apparatus according to a second modified example.

As shown in FIG. 28, an RRO measurement apparatus according to this modified example is substantially the same as the RRO measurement apparatus according to the first modified example except that the displacement sensor 46 (see FIG. 18) and the reference edge 31 are connected by a connecting member 62 so as to correct swinging of the reference edge 31 with respect to a tire axis. The displacement sensor 46 is, as described above, mounted at the tire bearing fixing portion 40 via the stay 42 for mounting a sensor. As a result, the reference edge 31 is connected to the tire bearing fixing portion 40 via the displacement sensor 46 and the stay 42. Accordingly, swinging of the reference edge 31 with respect to the tire axis can be corrected.

As a result, compared with the first modified example, the RRO can be measured with a higher degree of accuracy.

THIRD MODIFIED EXAMPLE
(CORRESPONDING TO THE THIRD ASPECT OF THE TENTH INVENTION)

Figure 29:
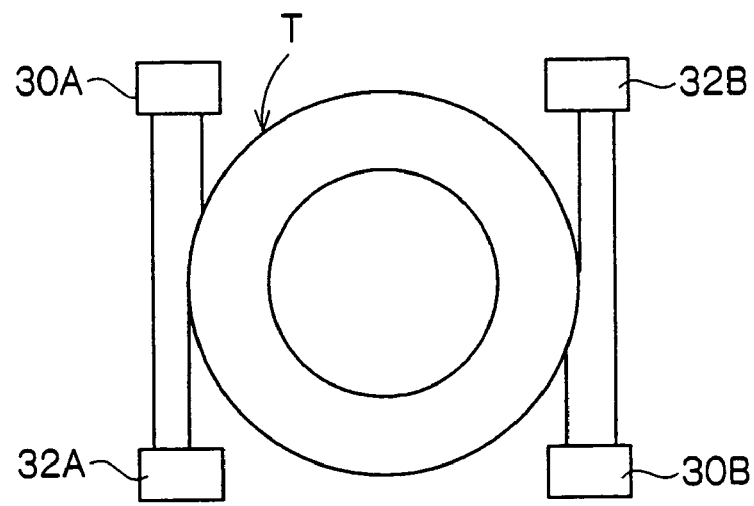
FIG. 29 is a schematic diagram showing an RRO measurement apparatus according to a third modified example.

As shown in FIG. 29, in this modified example, plural pairs of light irradiation sections 30 and the light receiving sections 32 are disposed around the tire. FIG. 29 shows, as an example, two pairs, but the present invention is not limited to the same.

In the above-described first and second embodiments and first and second modified examples, in order to predict the RRO, it is necessary that a tire should make at least one rotation. On the other hand, in the third modified example, the plural pairs of light irradiation sections 30 and light receiving sections 32 are disposed around the tire, and therefore, the RRO can be measured only by rotating the tire by an amount less than one rotation. More specifically, for example, if N pairs of light irradiation section 30 and light receiving section 32 (N is an integer of 2 or more) are disposed at regular intervals, the RRO can be measured only by rotating the tire by an amount of 1/N rotation.

In this modified example as well, the reference edge 31 may also be provided as in the first modified example. Further, the displacement sensor 46 and the reference edge 31 may be connected with each other as in the second modified example.

FOURTH MODIFIED EXAMPLE
(CORRESPONDING TO THE FOURTH ASPECT OF THE TENTH INVENTION)

Figure 30:
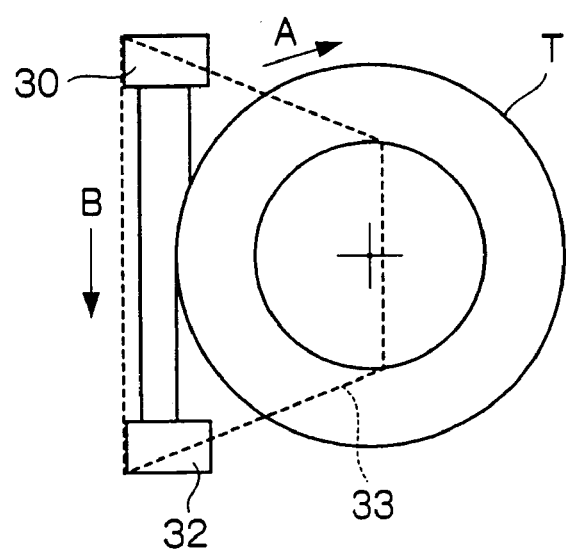
FIG. 30 is a schematic diagram showing an RRO measurement apparatus according to a fourth modified example.

As shown in FIG. 30, this modified example has a structure in which the light irradiation section 30 and the light receiving section 32 are made rotatable around the tire axis. That is, this modified example further includes a supporting plate 33 which serves as supporting means for supporting the light irradiation section 30 and the light receiving section 32 and is mounted on the tire axis in a rotatable manner. By rotating the supporting plate 33 around the tire axis, the light irradiation section 30 and the light receiving section 32 can be rotated around the tire axis.

When the light irradiation section 30 and the light receiving section 32 are rotated in a direction opposite to the direction in which the tire rotates, it is possible to reduce a measuring time of RRO in a region near a position where the rotational speed of the tire is zero.

On the other hand, even when, though the measuring time of RRO cannot be reduced, the light irradiation section 30 and the light receiving section 32 are rotated in the same direction as the direction in which the tire rotates, the RRO can be measured.

Further, even if the rotational speed of the tire is zero and the light irradiation section 30 and the light receiving section 32 are rotated around the tire, unevenness in the circumferential dimension of the tire can be measured.

In this modified example as well, the reference edge 31 may be provided in the same manner as in the first modified example. Further, the displacement sensor 46 and the reference edge 31 are connected together via the supporting plate 33 as in the second modified example. Moreover, plural pairs of light irradiation sections 30 and light receiving sections 32 may be located around the tire, for example, at regular intervals as in the third modified example.

FIFTH MODIFIED EXAMPLE
(CORRESPONDING TO THE ELEVENTH INVENTION)

Figure 31:
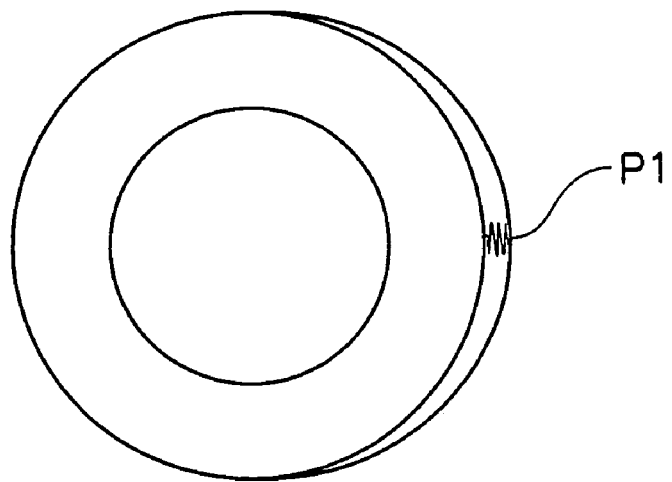
FIG. 31 is a conceptual diagram showing mass unbalance of a tire.
Figure 32:
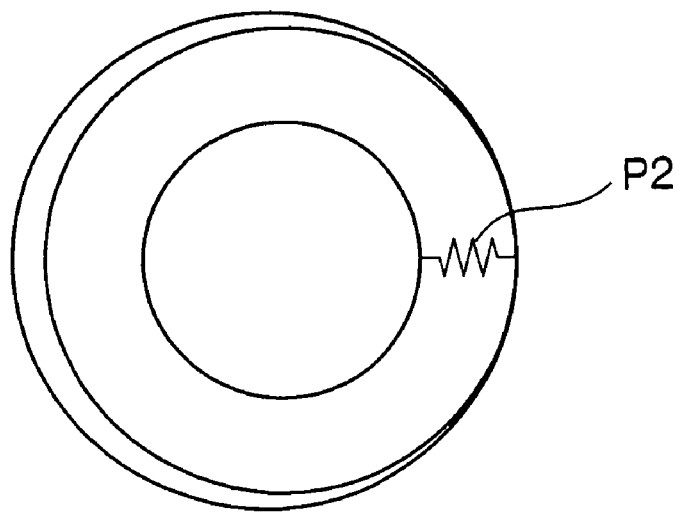
FIG. 32 is a conceptual diagram showing rigidity variation of a tire.

In the above-described first and second embodiments (also including the first to fourth modified examples), the RRO measurement apparatus shown in FIG. 1 is used to predict radial run out RROo at the target speed in accordance with the above-described predetermined expressions. However, in this case, mass non-uniformity (unbalance) of a tire caused by the presence of portion P1 having a relatively large mass (see FIG. 31) or rigidity variation of a tire caused by the presence of portion P2 having a relatively high rigidity (see FIG. 32) are not considered. That is, the portion P1 having a relatively large mass is apt to protrude as shown in FIG. 31, and the portion P2 having a relatively high rigidity is not apt to protrude as shown in FIG. 32. These portions have effects, as an error, on the RRO.

Accordingly, in this modified example, radial run out RROo at the target speed is predicted in consideration of mass non-uniformity of the tire and rigidity variation of the tire. Further, the radial run out RROo can also be predicted in consideration of any one of the above-described factors, but in the following concrete example of this modified example, the radial run out RROo is predicted in consideration of both factors.

Specifically, in a sample tire, radial run out RRO at the target speed and radial run out RRO at a low speed are measured.

Subsequently, based on the measured radial run out of a sample tire at low speed (low speed RRO), the measured radial run out of a sample tire at the target speed, an estimated value of radial run out of a sample tire at the target speed obtained from the following expression (target-speed RRO estimate), and the following expression, coefficients 1 and 2 in the following expression are each identified in accordance with the following expression so that a sum of squares of the difference between the measured radial run out of a sample tire at the target speed, and an estimated value of radial run out of a sample tire at the target tire obtained from the following expression becomes a minimum.

Target-speed $RRO$ estimate=low-speed $RRO$+coefficient 1×$RMV$−coefficient 2×$RSV$ Further, mass unbalance of the tire (RMV) and rigidity variation RSV are measured in advance. The rigidity variation RSV is obtained using the expression, RSV=RFV−(spring constant)×RRO, that is, by subtracting a value given by multiplication of spring constant of the tire and the measured radial run out RRO at the target speed, from the measured RFV at the target speed.

Furthermore, the radial run out RRO of the tire at a low speed is obtained.

When the radial run out RRO at a low speed is obtained as described above, based on the mass unbalance RMV of the tire and the rigidity variation RSV of the tire obtained as above, the measured radial run out of the tire at a low speed, and the above-described expression with the coefficients 1 and 2 identified, the radial run out RRO of the tire at the target speed is estimated.

SIXTH MODIFIED EXAMPLE (CORRESPONDING TO THE TWELFTH INVENTION)

In the above-described first and second embodiments (also including the first to fifth modified examples), based on the radial run out $RRO_H$, $RRO_L$ at tire angular speeds $\omega_H$, $\omega_L$ of the two speed levels (at the high speed H and at the low speed L) at the time of idling, the radial run out RRO at the target speed is predicted using the RRO measurement apparatus in accordance with the above-described predetermined expression (the index is 2). However, in this modified example, the radial run out RRO at the target speed is predicted as described below.

That is, three or more sample tires are used, and index (x) in the following expression is identified from RRO measured data $RRO_{LS}$ and $RRO_{HS}$ at the time when the tires are rotated at angular speeds of the two speed levels, that is, at a low speed and at a high speed so that a sum of squares of the difference between the predetermined speed RRO estimated in accordance with the following expression and the actually measured predetermined speed RRO becomes a minimum.

$$RRO_{EST} = RRO_{LS} + (RRO_{HS} - RRO_{LS}) \times \left( \frac{\omega_{EST}^X - \omega_{LS}^X}{\omega_{HS}^X - \omega_{LS}^X} \right)$$

Then, the radial run out RRO at the target speed is predicted using the RRO measurement apparatus by inserting, in the expression with the index (x) being identified as described above, the radial run out $RRO_H$, $RRO_L$ at the tire angular speeds $\omega_H$, $\omega_L$ of the two speed levels (at the high speed H and at the low speed L) at the time of idling.

Figure 33A:
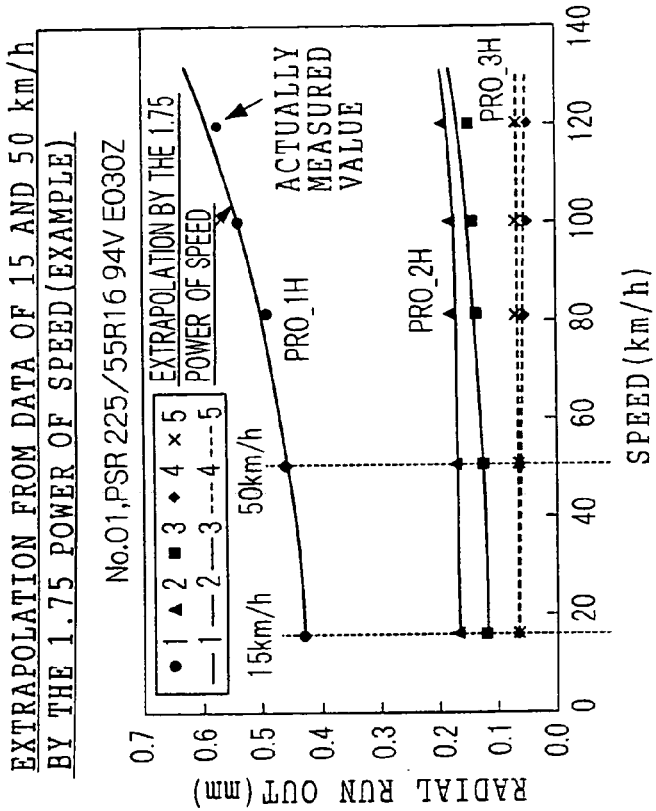
FIG. 33(A) is a graph which shows a relationship between RRO obtained using a fixed index, and actually measured values of RRO.
Figure 33B:
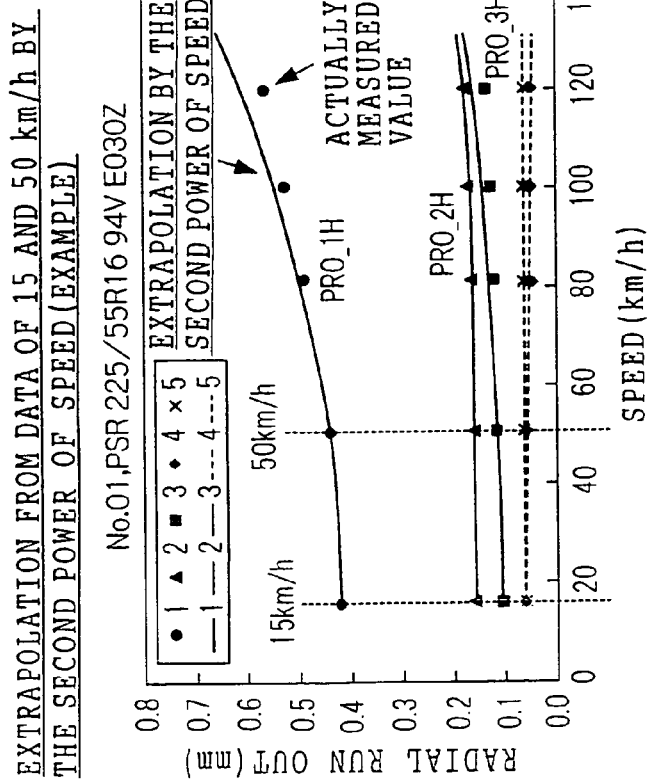
FIG. 33(B) is a graph which shows a relationship between RRO obtained using an identified index, and actually measured values of RRO.

In the graphs of FIGS. 33(A) and 33(B), respective results of the radial run out RRO at the target speed which is predicted at the speed of 80 km/h, 100 km/h and 120 km/h using the expression in which the index is 2, and the radial run out RRO at the target speed which is predicted using the expression in which the index is identified, are shown. The predicted RRO is indicated by solid lines and the actually measured values are indicated by dots. As can be seen from FIGS. 33(A) and 33(B), compared with the radial run out RRO at the target speed which is predicted using the expression in which the index is 2, the predicted values of the radial run out RRO at the target speed which is predicted using the expression in which the index is identified approximates to the actually measured values of the RRO. That is, this modified example allows more accurate prediction of the RRO. The index is identified at 1.75.

FIGS. 34(A), 34(B) and 34(C) each show the relationship between RFV (vertical axis) predicted based on the radial run out RRO at the target speed predicted at the speeds of 15 km/h and 50 km/h using the expression in which the index is 2, and the actually measured RFV (horizontal axis) for each of the first-order, second-order and third-order components of RFV. FIGS. 34(D), 34(E) and 34(F) each show the relationship between RFV (vertical axis) predicted based on the radial run out RRO at the target speed predicted at the speeds of 15 km/h and 80 km/h using the expression in which the index is identified as described above, and the actually measured RFV (horizontal axis) for each of the first-order, second-order and third-order components of RFV. The index is identified at 1.75.

Furthermore, FIGS. 35(A), 35(B) and 35(C) each show the relationship between TFV (vertical axis) predicted based on the radial run out RRO at the target speed predicted at the speeds of 15 km/h and 50 km/h using the expression in which the index is 2, and the actually measured TFV (horizontal axis) for each of the first-order, second-order and third-order components of TFV. FIGS. 35(D), 35(E) and 35(F) each show the relationship between TFV (vertical axis) predicted based on the radial run out RRO at the target speed predicted at the speeds of 15 km/h and 80 km/h using the expression in which the index is identified as described above, and the actually measured TFV (horizontal axis) for each of the first-order, second-order and third-order components of TFV. The index is identified at 1.75.

SEVENTH MODIFIED EXAMPLE (CORRESPONDING TO THE THIRTEENTH INVENTION)

In the above-described first and second embodiments (also including the first to sixth modified examples), in order to obtain RRO, angular acceleration fluctuation, and the like, a tire is rotated by constantly applying driving force from a tire driving motor to a tire axis. In this case, if rotating force applied from the tire driving motor to the tire axis becomes uneven, the uneven rotating force causes irregularity in the rotational speed of a tire and the obtained values are affected by this rotational irregularity.

Accordingly, this modified example reduces the effect of unevenness of rotating force applied by the tire driving motor to the tire axis on the values of RRO or angular acceleration fluctuation.

Figure 36:
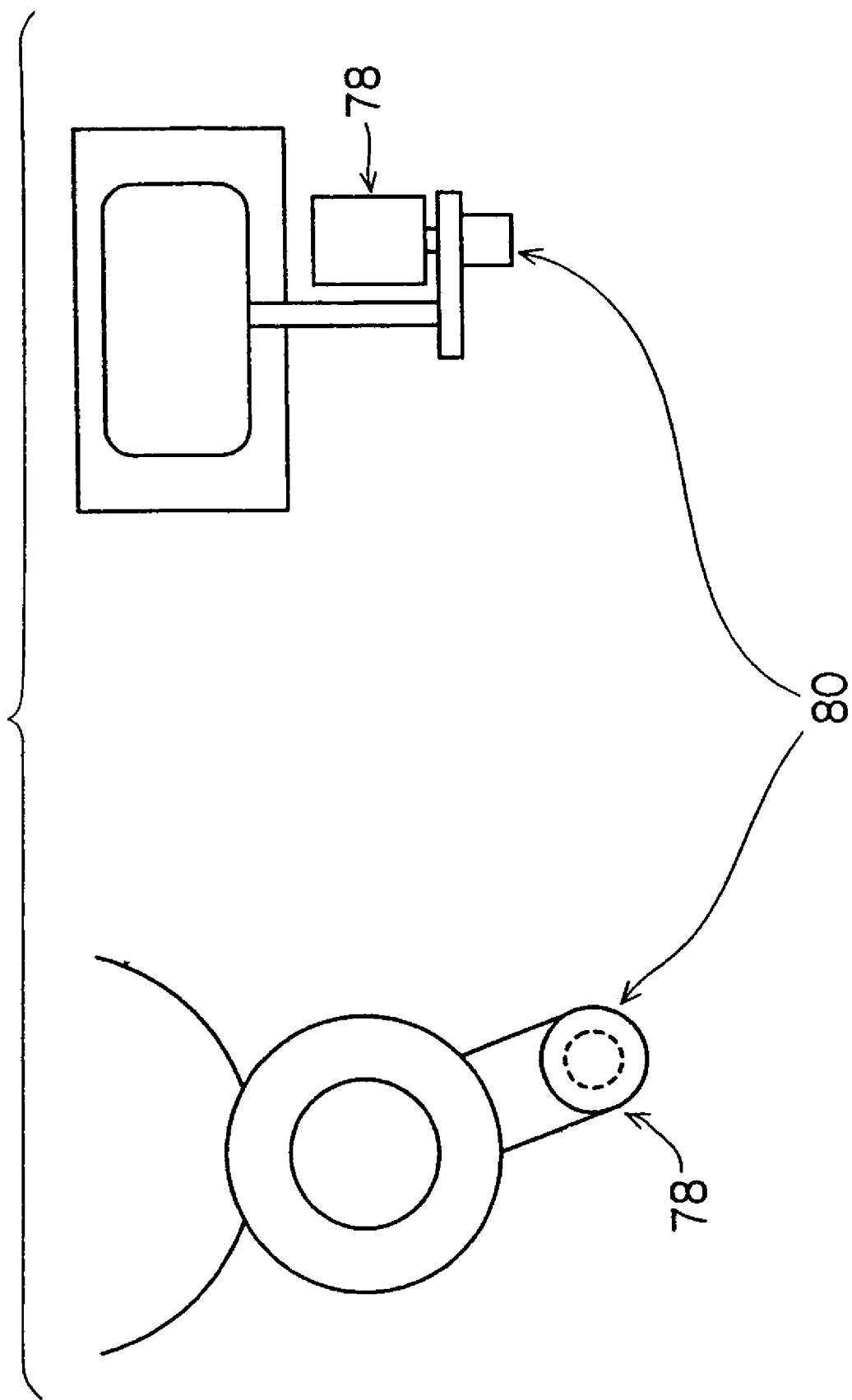
FIG. 36 is a schematic diagram which shows a tire driving system including an electromagnetic clutch which connects and disconnects tire rotating force to and from a tire axis.

Specifically, as shown in FIG. 36, this modified example has a structure in which an electromagnetic clutch 80 which serves as connecting/disconnecting means is provided between the tire axis and a tire rotating motor 78 which serves as tire rotating means for applying rotating force to the tire axis to thereby rotate the tire. That is, the tire axis and the tire rotating motor 78 are connected by the electromagnetic clutch 80, and rotating force from the tire rotating motor 78 is applied to the tire axis to allow rotation of the tire. Subsequently, the electromagnetic clutch 80 disconnects the tire axis and the tire rotating motor 78 from each other so that no rotating force from the tire rotating motor 78 is applied to the tire axis, and the tire is brought into a state of rotating due to inertia. In this state, necessary values such as RRO, rotational speed of the tire, and the like should be obtained.

EIGHTH MODIFIED EXAMPLE (CORRESPONDING TO THE FOURTEENTH INVENTION)

This modified example is constructed such that necessary data can be obtained at plural positions in a transverse direction of a tire. For example, in the RRO measurement apparatus shown in FIG. 1, plural pairs of light irradiation sections 30 and light receiving sections 32 are located at positions in the transverse direction of the tire, and RRO can be measured at the plural positions in the transverse direction of the tire.

In this modified example, the RFV at a high speed is measured using three or more sample tires. Further, the RRO at a predetermined speed is obtained from the three or more sample tires at plural positions in the transverse direction of each tire. The RFV at the predetermined speed is calculated from a weighted average value of the RRO obtained at the predetermined speed at the plural positions, which average value is obtained from the following expression. Coefficients (the following coefficient 1, coefficient 2, and the like) of the weighted average value at each position of measurement are identified so that a sum of squares of the difference between the calculated RFV at the predetermined speed and the measured RFV at the predetermined speed becomes a minimum.

RRO average value=coefficient 1×RRO(1)+coefficient 2×RRO(2)+ . . . (1−coefficient 1−coefficient 2− . . . coefficient N−1)×RRO(N)

In step 104 and step 204 of the above-described first and second embodiments, radial run out RROo at the target speed is obtained in such a manner as described below. That is, the tire angular speeds $\omega_L$, $\omega_L$ at a high speed and at a low speed, and the radial run out $RRO_H$, $RRO_L$ at these angular speeds are measured, and based on the following expression, the radial run out RROo at the target speed is predicted at each position of measurement. Subsequently, the average value of radial run out is obtained from the radial run out RROo at the target speed which is predicted at each position of measurement, and the above-described expression in which each weighted average coefficient is identified.

$$RRO_0 = RRO_L + (RRO_H - RRO_L) \cdot \frac{\omega_0^2 - \omega_L^2}{\omega_H^2 - \omega_L^2}$$

The RFV at the target speed is predicted from the obtained average value of radial run out.

The TFV at the target speed is also predicted in the same manner as described above.

Thus, the RFV and the TFV are each predicted from the weighted average value of RRO at plural position of measurement in the transverse direction of the tire, thereby allowing improvement in the accuracy of prediction.

NINTH MODIFIED EXAMPLE
(CORRESPONDING TO THE FIFTEENTH INVENTION)

In this modified example, an amount of non-uniformity of a tire size at a certain interval of rotation angle is measured.

Conventionally, the amount of non-uniformity of a tire size is sampled in accordance with a pulse of a rotary encoder disposed on a tire axis. Since sampling is carried out according to the pulse of the rotary encoder, if the tire speed changes, frequency setting of a low pass filter for reducing noise needs to be changed sequentially.

Accordingly, in this modified example, even if the speed changes, one type of noise-reduction low pass filter is provided to obtain an amount of non-uniformity of a tire size.

Figure 37:
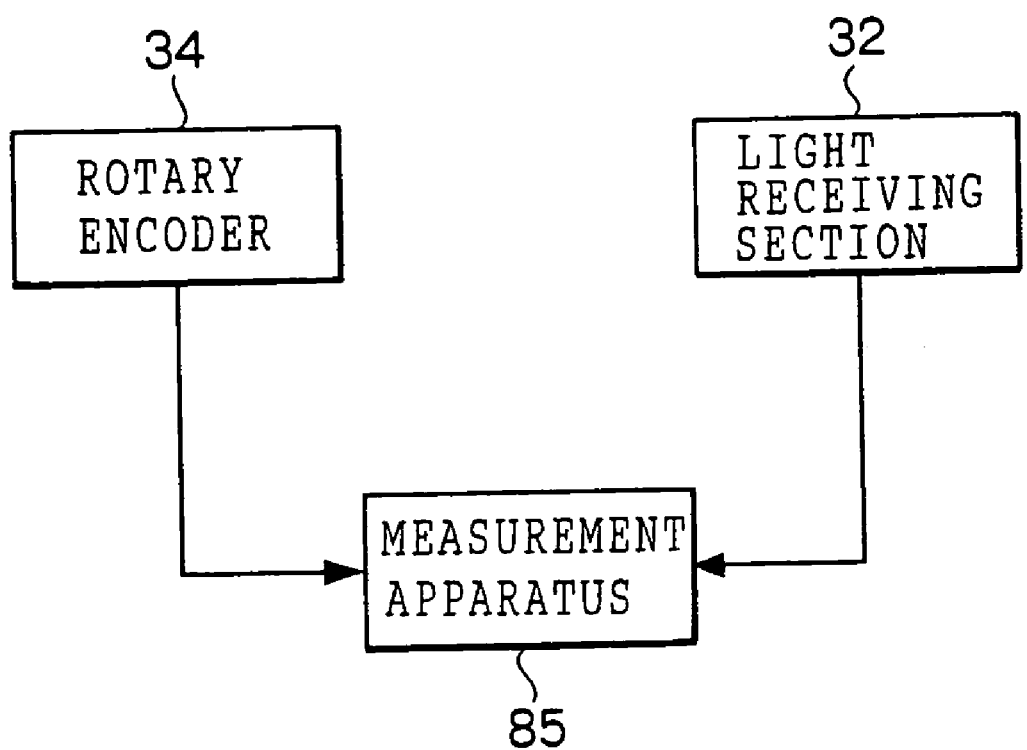
FIG. 37 is a schematic diagram of a measurement apparatus according to a ninth modified example, for measuring an amount of non-uniformity of a tire size.

Specifically, as shown in FIG. 37, a measurement apparatus 85 connected to the above-described light receiving section 32 and the rotary encoder 34 is provided. The measurement apparatus 85 includes a CPU, an ROM, an RAM and memory, which are all not shown.

Figure 38:
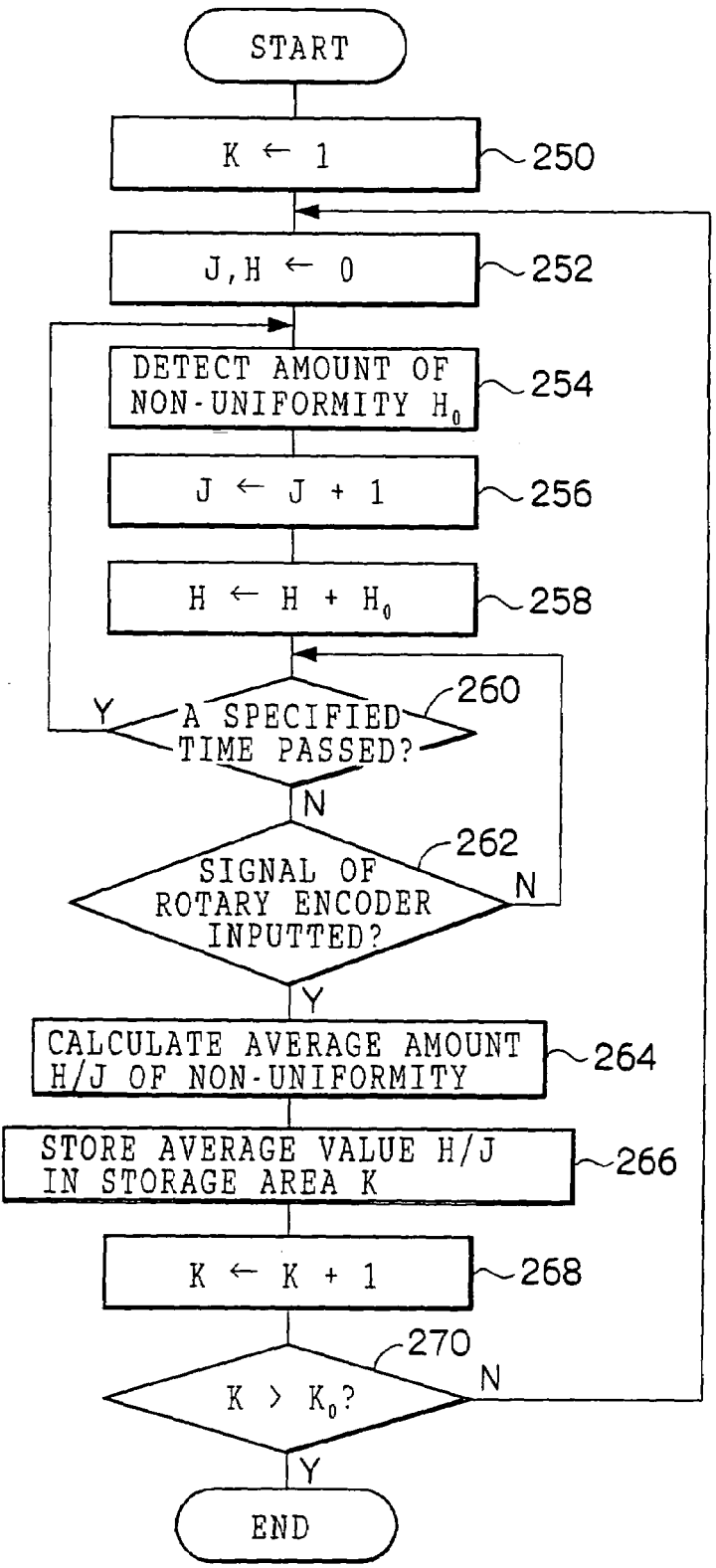
FIG. 38 is a flow chart which shows a processing routine for measuring an amount of non-uniformity of a circumferential dimension of a tire, which routine is carried out by the measurement apparatus according to the ninth modified example, for measuring an amount of non-uniformity of a tire size.

Next, the operation of this modified example will be described with reference to the flow chart (see FIG. 38) which shows a processing routine for measuring an amount of non-uniformity in the circumferential dimension of a tire, which routine is executed by the measurement apparatus 85.

The processing routine for measuring an amount of non-uniformity in the circumferential dimension of a tire starts when the tire is brought into a state of rotating at a predetermined speed. When the tire rotates, as described above, a pulse signal is generated from the rotary encoder 34 in accordance with the rotation angle of the tire. A timing at which the pulse signal is generated from the rotary encoder 34 corresponds to the rotation angle of the tire, and the pulse signal is generated the predetermined number of times K0 for each one rotation of the tire. In this modified example, the number of storage region provided in the memory corresponds to the number of times the pulse signal is generated, and each storage region is identified as K. When the processing routine for measuring an amount of non-uniformity in the circumferential dimension of a tire starts, in step 250, variable K used to identify a storage area is set at 1.

Further, in this modified example, the amount of non-uniformity of a tire size is detected from a signal obtained from the light receiving section 32 at regular time intervals. The variable which indicates the number of times of detection is represented by J, and the interval at which a pulse signal is generated from the rotary encoder 34, that is, the sum of amounts of non-uniformity of a tire size within a certain rotation angle is represented by H. In step 252, J and H are each reset at 0.

In step 254, the amount of non-uniformity H of a tire size is detected from a signal generated from the light receiving section 32. In step 256, the variable J is incremented by one, and in step 258, the detected amount of non-uniformity H0 of a tire size is added to the previously-detected additional value H of the amount of non-uniformity of a tire size and the obtained additional value is set to be a new additional value H of the amount of non-uniformity of a tire size.

In step 260, it is determined whether a certain period of time has passed or not from the time when the amount of non-uniformity H0 of a tire size is detected (step 254). When the certain period of time has passed, the process returns to step 254 and the above-described processing (step 254 to step 260) is carried out.

Further, in step 260, when it is determined that the certain period of time has not passed, a determination is made as to whether or not a signal is inputted from the rotary encoder 34. When it is determined that the signal is not inputted from the rotary encoder 34, the process returns to step 260.

According to the above-described processing, a total value H of the amount of non-uniformity of a tire size within a time interval in which the pulse signal is generated from the rotary encoder 34 is obtained.

In step 262, when it is determined that the signal is inputted from the rotary encoder 34, it is determined at this time that the process proceeds to a stage in which a subsequent pulse signal is generated. Therefore, in step 264, an average value of the amounts of non-uniformity of a tire size within the time interval, in which a preceding pulse signal is generated, is calculated. That is, a total value of amounts of non-uniformity of a tire size is H and the number of times of detection is J. Therefore, the average value can be calculated by H/J.

In step 266, the average value H/J of amounts of non-uniformity of a tire size within a time interval, in which a pulse signal is generated, is stored in the storage region K which corresponds to the time interval of generation.

In step 268, the variable K is incremented by one. In step 270, it is determined whether or not the incremented variable is larger than the number of times, K0, in which the pulse signal is generated for each one rotation of a tire. When it is determined that K is not larger than K0, the process returns to step 252 and the above-described processing (step 252 to step 270) is carried out. When it is determined that K is larger than K0, all of average values H/J of amounts of non-uniformity of a tire size within a time interval, in which the pulse signal is generated for each one rotation of the tire, is stored in the storage region K which corresponds to the time interval of generation. Therefore, this routine is terminated.

As described above, in this modified example, the amount of non-uniformity of a tire size is detected at certain time intervals, and the average value of amounts of non-uniformity of a tire size is obtained within a time interval in which a pulse signal is generated from the rotary encoder in accordance with a rotation angle of the tire.

At a low speed and at a high speed of the tire, in this modified example, as shown in FIG. 39(A) and FIG. 39(B), the interval $T_L$, in which the pulse signal is generated at the time of a low speed, is longer than the interval $T_H$, in which the pulse signal is generated at the time of a high speed. In this modified example, the amount of non-uniformity of a tire size is detected at certain time intervals, and therefore, the number of times at which the amount of non-uniformity of a tire size is detected at a high speed is less than that at a low speed.

In this way, in this modified example, only the number of times at which the amount of non-uniformity of a tire size being detected irrespective of speed changes, and the amount of non-uniformity of a tire size can be measured for each fixed rotation angle of the tire from the amount of non-uniformity of a tire size detected at certain time intervals. Accordingly, this modified example allows the amount of non-uniformity of a tire size to be measured for each fixed rotation angle without sequentially varying frequency setting of a low pass filter for reducing noise.

In the above-described first and second embodiment, and first to ninth modified examples, the target speed is higher than the above-described low speed, but may also be lower or higher than the above-described high speed.

Further, the above-described predetermined speed may be equal to or different from the target speed, but it is higher than the above-described low speed.

EFFECTS OF THE INVENTION

As described above, the present invention has an effect in that RFV is predicted using actually measured values or predicted values of the high-speed RRO, thereby making it possible to substantially reduce a prediction error of high-speed RFV in a tire having a large RRO growth amount at a high speed.

Further, proper angular acceleration fluctuation obtained by utilizing actually measured values or predicted values of AAV is used, and therefore, a prediction error of high-speed TFV can be substantially reduced.

Still further, radial run out or tire angular acceleration fluctuation can be predicted using a simple method.

As described above, the present invention also has an effect in that high-speed radial force variation or tangential force variation is predicted using high-speed radial run out of a tire single unit obtained from radial run out of a concentric circle portion of a rim, radial force variation or tangential force variation at a high speed can be predicted without being affected by backlash of a tire bearing, or slight vibration of a reference surface of a rim.

As described above, in the present invention, interrupting means for cutting off a part of light emitted from light emitting means is disposed fixedly between light emitting means and light receiving means. Therefore, even if the light emitting means and the light receiving means swing, the light receiving means receives light which has been interrupted by the interrupting means. As a result, most fluctuation of received light can result from the RRO of a tire, and the radial run out can thereby be accurately measured.

Further, according to the present invention, it is possible to estimate radial run out at a target speed in which mass unbalance of a tire and rigidity variation of a tire are taken into consideration.

Still further, in the present invention, the index in the above-described expression is identified so that a sum of squares of the difference between radial run out RRO at a target speed, which is estimated based on an expression used to obtain radial run out at a target speed, and actually measured radial run out RRO at the target speed becomes minimum, and radial run out at the target speed is estimated from measured radial run out at a low speed and an expression in which an index is specified. As a result, the accuracy of estimation can be further improved compared with a case in which the index is fixed.

Moreover, according to the present invention, necessary information is acquired when a tire is rotating due to inertia. Therefore, even when rotating force used to rotate a tire becomes irregular, the acquired information can be prevented from being influenced by the rotational irregularity.

Furthermore, according to the present invention, RFV and TFV are predicted from a weighted average value of RRO at plural positions of measurement in a transverse direction of a tire, thereby allowing improvement in accuracy of prediction.

Additionally, in the present invention, the average of a state of an outer peripheral surface of a tire detected at certain time intervals within an interval in which a signal is generated in accordance with the rotation angle of the tire is calculated, while rotating the tire, across one rotation of the tire. Therefore, it is possible to obtain the state of the outer peripheral surface of the tire each time the tire rotates by a fixed rotation angle without sequentially changing frequency setting of a low pass filter for reducing noise.

What is claimed is:

1. A radial force variation prediction method comprises the steps of:
    obtaining the relationship between a speed and a radial run-out in each tire and obtaining a vertical spring constant, a vertical natural angular frequency, and a damping ratio in each type of tire;
    measuring a radial run-out at a low speed of each tire;
    calculating a radial run-out at a target speed from the measured radial run-out at a low speed and said relationship corresponding to the type of tire whose radial run-out is measured;
    based on the radial run-out at the target speed, the vertical spring constant, the vertical natural angular frequency, and the damping ratio, predicting radial force variation at the target speed; and
    using the predicted radial force variation to generate a signal indicative of a condition of a tire.

2. A radial force variation prediction method comprising the steps of:
- obtaining the relationship between a speed and a radial run-out in each tire and obtaining a vertical spring constant, a vertical natural angular frequency, and a damping ratio in each type of tire;
- measuring radial run-out and radial force variation at a low speed of each tire;
- calculating a radial-run out at a target speed from the measured radial run-out at a low speed and said relationship corresponding to the type of tire whose radial run-out is measured;
- based on the vertical spring constant, the vertical natural angular frequency, the damping ratio, the measured radial run-out and radial force variation at a low speed, and the radial run-out at the target speed, predicting radial force variation at the target speed; and
- using the predicted radial force variation to generate a signal indicative of a condition of a tire.

3. An information acquisition method comprising the steps of:
- rotating a tire by connecting a rotating force from tire rotating means to an axis of the tire using connecting/disconnecting means;
- disconnecting the rotating force from the tire rotating means using the connecting/disconnecting means after the tire has been rotated by the tire rotating means;
- acquiring at least one of radial run-out information and radial force variation information when the tire is rotating due to inertia after the rotating force from the tire rotating means is disconnected; and
- using the at least one of the radial run-out information and the radial force variation information to generate a signal indicative of at least one of radial run-out and radial force variation of the tire.

4. A tire outer periphery condition calculation apparatus comprising:
- tire condition detecting means which detects a condition of an outer peripheral surface of a tire;
- signal generating means which generates a signal corresponding to a rotation angle of the rotating tire; and
- calculation means which calculates, across one rotation of the tire, an average of the condition of the outer peripheral surface of the tire, which condition is detected by said tire condition detecting means at certain time intervals, within an interval in which a signal is generated by said signal generating means together with rotation of the tire.

5. The tire outer periphery condition calculation apparatus of claim 4, wherein the detection of the condition of the outer peripheral surface is a measurement of a non-uniformity of the outer peripheral surface of the tire.

6. The tire outer periphery condition calculation apparatus of claim 4, wherein the certain time interval for detecting the condition of the outer peripheral surface of the tire is constant regardless of rotational speed of the tire.

* * * * *